US012808754B2

(12) United States Patent
Sakamoto

(10) Patent No.: US 12,808,754 B2
(45) Date of Patent: Nov. 24, 2026

(54) INSPECTION ASSISTANCE SYSTEM, INSPECTION ASSISTANCE METHOD, AND RECORDING MEDIUM

(71) Applicant: Evident Corporation, Tatsuno-machi (JP)

(72) Inventor: Yohei Sakamoto, Kamiina-gun (JP)

(73) Assignee: Evident Corporation, Kamiina-gun (JP)

( * ) Notice: Subject to any disclaimer, the term of this patent is extended or adjusted under 35 U.S.C. 154(b) by 0 days.

(21) Appl. No.: 19/253,371

(22) Filed: Jun. 27, 2025

(65) Prior Publication Data

US 2025/0321160 A1 Oct. 16, 2025

Related U.S. Application Data

(63) Continuation of application No. PCT/JP2024/008661, filed on Mar. 7, 2024.

(30) Foreign Application Priority Data

Apr. 13, 2023 (JP) ................................ 2023-065387

(51) Int. Cl.
*G01M 15/14* (2006.01)
*F01D 21/00* (2006.01)
*G01N 21/88* (2006.01)

(52) U.S. Cl.
CPC ........... *G01M 15/14* (2013.01); *F01D 21/003* (2013.01); *G01N 21/8851* (2013.01); *F05D 2260/79* (2013.01); *F05D 2260/83* (2013.01)

(58) Field of Classification Search
CPC .. G01M 15/14; F01D 21/003; G01N 21/8851; G01N 21/9515; G01N 21/954;
(Continued)

(56) References Cited

U.S. PATENT DOCUMENTS 12,055,053 B1 * 8/2024 Goyette ................ F01D 21/003
2004/0225185 A1 11/2004 Obata et al.
(Continued)

FOREIGN PATENT DOCUMENTS

JP 2004191911 A 7/2004
JP 2011161019 A 8/2011
(Continued)

OTHER PUBLICATIONS

International Search Report (ISR) (and English language translation thereof) dated May 14, 2024, issued in International Application No. PCT/JP2024/008661.

*Primary Examiner* — Girumsew Wendmagegn
(74) *Attorney, Agent, or Firm* — K&L Gates LLP

(57) ABSTRACT

An inspection assistance system includes an image sensor and a processor. The processor acquires two or more first images from the image sensor in accordance with rotation of a rotor. The processor adds observation information indicating that observation is necessary to at least one first image of the two or more first images. The processor outputs a control signal to a turning tool such that an insertion unit captures an object that is visible in the at least one first image in a field of view. The processor acquires at least one second image from the image sensor after the turning tool has rotated the rotor.

23 Claims, 28 Drawing Sheets

(58) Field of Classification Search
CPC . G01N 21/84; F05D 2260/79; F05D 2260/83; G02B 23/24
See application file for complete search history.

(56) References Cited

U.S. PATENT DOCUMENTS

| | | | |
|---|---|---|---|
| 2015/0036150 | A1 | 2/2015 | Kobayashi et al. |
| 2015/0341600 | A1 | 11/2015 | Hatcher et al. |

FOREIGN PATENT DOCUMENTS

| | | | |
|---|---|---|---|
| JP | 2015028542 | A | 2/2015 |
| JP | 2016209460 | A | 12/2016 |

* cited by examiner

FIG. 7

MNG10

| BLADE NUMBER | IMAGE NUMBER | STATE INFORMATION | RELIABILITY | ABNORMALITY TYPE | SEVERITY | ROTATION INFORMATION | ORDER OF DETAILED OBSERVATION |
|---|---|---|---|---|---|---|---|
| 001 | 001. JPG | NO DEFECT | 90% | – | – | P1 | – |
| 002 | 002. JPG | ABNORMAL | 95% | NICK | LOW | P2 | – |
| 003 | 003. JPG, 004. JPG | OBSERVATION IS NECESSARY | 50% | ? | ? | P3 | 1 |
| 004 | 005. JPG | NO DEFECT | 80% | – | – | P4 | – |
| 005 | 006. JPG | NO DEFECT | 85% | – | – | P5 | – |
| 006 | 007. JPG, 008. JPG | NO DEFECT | 95% | – | – | P6 | – |
| 007 | 009. JPG | OBSERVATION IS NECESSARY | 40% | ? | ? | P7 | 2 |

⋮

FIG. 25

MR10

| MRmin<br>MEASUREMENT RESULT (MINIMUM) | MRmax<br>MEASUREMENT RESULT (MAXIMUM) | MRave<br>MEASUREMENT RESULT (AVERAGE) |
|---|---|---|
| Lmin001 | Lmax001 | Lave001 |
| Lmin002 | Lmax002 | Lave002 |
| Lmin003 | Lmax003 | Lave003 |
| Lmin004 | Lmax004 | Lave004 |
| Lmin005 | Lmax005 | Lave005 |
| Lmin006 | Lmax006 | Lave006 |
| Lmin007 | Lmax007 | Lave007 |

INSPECTION ASSISTANCE SYSTEM, INSPECTION ASSISTANCE METHOD, AND RECORDING MEDIUM

The present application claims priority to Japanese Patent Application No. 2023-065387, filed Apr. 13, 2023 and is a continuation application based on PCT Patent Application No. PCT/JP2024/008661, filed Mar. 7, 2024, and the content of both the Japanese patent application and the PCT patent application is incorporated herein by reference.

BACKGROUND OF THE INVENTION

Field of the Invention

The present invention relates to an inspection assistance system, an inspection assistance method, and a recording medium.

Description of Related Art

An industrial endoscope device has been used to inspect an abnormality (such as a crack and corrosion) of industrial equipment such as boilers, turbines, engines, and pipes. Various subjects are to be inspected using an industrial endoscope device. An industrial endoscope device is particularly convenient in inspection of turbines used in aircraft and power generation facilities.

Turbines are used for aircraft engines and power generators. Rotor blades of a turbine are principal inspection targets of inspection using an industrial endoscope device. In the following description, rotor blades are referred to as blades. A turbine includes a compressor section and a turbine section. In each of the compressor section and the turbine section, two or more stages are disposed along a rotation shaft in the turbine. In each stage, two or more blades are disposed on a circumference of a disk.

In general, in inspection of blades, the blades rotate and an abnormality on the blades is searched for. When observation of all the blades disposed on the circumference ends, the inspection ends. This inspection is performed in each stage.

Since the above-mentioned inspection is performed at very many positions, the inspection takes time. In order to improve inspection efficiency, a turning tool for efficiently and smoothly rotating the blades may be used.

For example, Japanese Unexamined Patent Application, First Publication No. 2016-209460 discloses a method of sequentially inspecting blades disposed on a rotor. According to this method, a controller of an endoscope calculates the amount of rotation (the amount of movement) required for observation of the blades based on the total number of blades. The controller causes a turning tool to rotate the rotor in accordance with the amount of rotation. When each blade is located at the center of an image, the controller causes the turning tool to stop rotation of the rotor. A user observes the image and inspects the corresponding blade. After inspection of the blade has been ended, the controller causes the turning tool to rotate the rotor in order to inspect a next blade. The rotor rotates by one turn, and the above-mentioned processing is repeated until all the blades are inspected.

SUMMARY OF THE INVENTION

According to a first aspect of the present invention, an inspection assistance system assists with inspection of a subject including therein a rotor in which two or more objects are disposed. The inspection assistance system includes an image sensor and a processor. The image sensor generates an image based on an optical image of an object captured in a field of view of an insertion unit inserted into the subject. The processor acquires two or more first images from the image sensor in accordance with rotation of the rotor. The processor adds observation information indicating that observation is necessary to at least one first image of the two or more first images. The processor outputs a control signal to a turning tool configured to rotate the rotor based on the control signal such that the insertion unit captures, in the field of view, an object that is visible in the at least one first image after the observation information is added to the at least one first image. The processor acquires at least one second image from the image sensor after the turning tool has rotated the rotor.

According to a second aspect of the present invention, in the first aspect, the processor may output the control signal to the turning tool before acquiring each of the two or more first images.

According to a third aspect of the present invention, in the second aspect, the processor may acquire rotation information indicating the amount of rotation of the rotor from the turning tool when the turning tool rotates the rotor. The processor may add the rotation information to each of the two or more first images. The processor may output the control signal generated based on the rotation information added to the at least one first image to the turning tool.

According to a fourth aspect of the present invention, in the first aspect, the processor may add state information indicating the state of an object that is visible in the at least one second image to the at least one second image.

According to a fifth aspect of the present invention, in the first aspect, the processor may add state information indicating the state of an object that is visible in the two or more first images to the two or more first images.

According to a sixth aspect of the present invention, in the first aspect, the image sensor may be disposed in the distal end of the insertion unit. The processor may set a first imaging condition before the image sensor generates the two or more first images. The processor may set a second imaging condition different from the first imaging condition before the image sensor generates the at least one second image. The first imaging condition and the second imaging condition may be one or more of the following: a position of the image sensor; an orientation of the image sensor; a relative position of the image sensor with respect to an object captured in the field of view; a relative orientation of the image sensor with respect to the object captured in the field of view; an imaging parameter of the image sensor; the state of illumination light emitted inside the subject; a parameter of image processing performed on an image generated by the image sensor; and the state of a lens disposed in the insertion unit.

According to a seventh aspect of the present invention, in the sixth aspect, before the image sensor generates the at least one second image, the processor may control one or more of the following: a bending portion included in the insertion unit; an insertion device configured to move the insertion unit in the longitudinal direction of the insertion unit inside the subject or twists the insertion unit inside the subject; the turning tool; the image sensor; a light source configured to generate the illumination light; an image-processing circuit configured to execute the image processing; and the lens such that the second imaging condition is different from the first imaging condition.

According to an eighth aspect of the present invention, in the first aspect, the processor may acquire a reference image recorded in advance in a recording medium. At least one object of the two or more objects may be visible in the reference image. The processor may output the control signal to the turning tool in accordance with the composition of the object that is visible in the reference image.

According to a ninth aspect of the present invention, in the first aspect, the processor may acquire a reference image recorded in advance in a recording medium. An abnormality may be visible in the reference image. The processor may add the observation information to the at least one first image based on a result of comparison between a first image included in the at least one first image and the reference image.

According to a tenth aspect of the present invention, in the first aspect, the processor may acquire feature information recorded in advance in a recording medium. The feature information may be generated based on a feature of an image in which at least one object of the two or more objects is visible. The processor may add the observation information to the at least one first image based on the feature information.

According to an eleventh aspect of the present invention, in the first aspect, the processor may add the observation information to at least two first images of the two or more first images. The processor may acquire at least two second images including the at least one second image from the image sensor.

According to a twelfth aspect of the present invention, in the first aspect, the two or more first images may include at least two first images in which the same object is visible.

According to a thirteenth aspect of the present invention, in the first aspect, the turning tool may stop the rotor after having rotated the rotor. The processor may acquire the at least one second image from the image sensor when the rotor stops.

According to a fourteenth aspect of the present invention, in the first aspect, the processor may display the at least one first image and the observation information on a display.

According to a fifteenth aspect of the present invention, the inspection assistance system in the first aspect may further include an imaging apparatus including the image sensor and the processor.

According to a sixteenth aspect of the present invention, the inspection assistance system in the first aspect may further include an imaging apparatus including the image sensor. The processor may be included in a device other than the imaging apparatus.

According to a seventeenth aspect of the present invention, in the first aspect, the subject may be a turbine. The two or more objects may be blades.

According to an eighteenth aspect of the present invention, the inspection assistance system in the first aspect may further include a storage medium storing inspection management information associated with the two or more objects.

According to a nineteenth aspect of the present invention, in the eighteenth aspect, the processor may compare the inspection management information with a preset determination criterion and output a result of comparison between the inspection management information and the determination criterion.

According to a twentieth aspect of the present invention, in the nineteenth aspect, the processor may measure the size of an object that is visible in the at least one first image by using the at least one first image. The inspection management information may include a measurement result of the size. The determination criterion may be related to the size.

According to a twenty-first aspect of the present invention, in the nineteenth aspect, the processor may measure the size of an object that is visible in the at least one second image by using the at least one second image. The inspection management information may include a measurement result of the size. The determination criterion may be related to the size.

According to a twenty-second aspect of the present invention, an inspection assistance method assists with inspection of a subject including therein a rotor in which two or more objects are disposed. The inspection assistance method executes the following steps. A processor acquires two or more first images from an image sensor configured to generate an image based on an optical image of an object captured in a field of view of an insertion unit inserted into the subject in accordance with rotation of the rotor. The processor adds observation information indicating that observation is necessary to at least one first image of the two or more first images. The processor outputs a control signal to a turning tool configured to rotate the rotor based on the control signal such that the insertion unit captures, in the field of view, an object that is visible in the at least one first image after the observation information is added to the at least one first image. The processor acquires at least one second image from the image sensor after the turning tool has rotated the rotor.

According to a twenty-third aspect of the present invention, a non-transitory computer-readable recording medium stores a program causing a computer to execute the following steps. Two or more first images are acquired from an image sensor configured to generate an image based on an optical image of an object captured in a field of view of an insertion unit inserted into a subject including therein a rotor in which two or more objects are disposed in accordance with rotation of the rotor. Observation information indicating that observation is necessary is added to at least one first image of the two or more first images. A control signal is output to a turning tool configured to rotate the rotor based on the control signal such that the insertion unit captures, in the field of view, an object that is visible in the at least one first image after the observation information is added to the at least one first image. At least one second image is acquired from the image sensor after the turning tool has rotated the rotor.

BRIEF DESCRIPTION OF THE DRAWINGS

FIG. 7 is a diagram showing an example of inspection management information in the first embodiment of the present invention.

FIG. 25 is a diagram showing an example of information displayed on the display unit included in the endoscope device according to the fourth embodiment of the present invention.

DETAILED DESCRIPTION OF THE INVENTION

Hereinafter, embodiments of the present invention will be described with reference to the accompanying drawings. In this specification, an abnormal region on a blade is simply referred to as an abnormality.

First Embodiment

Figure 1:
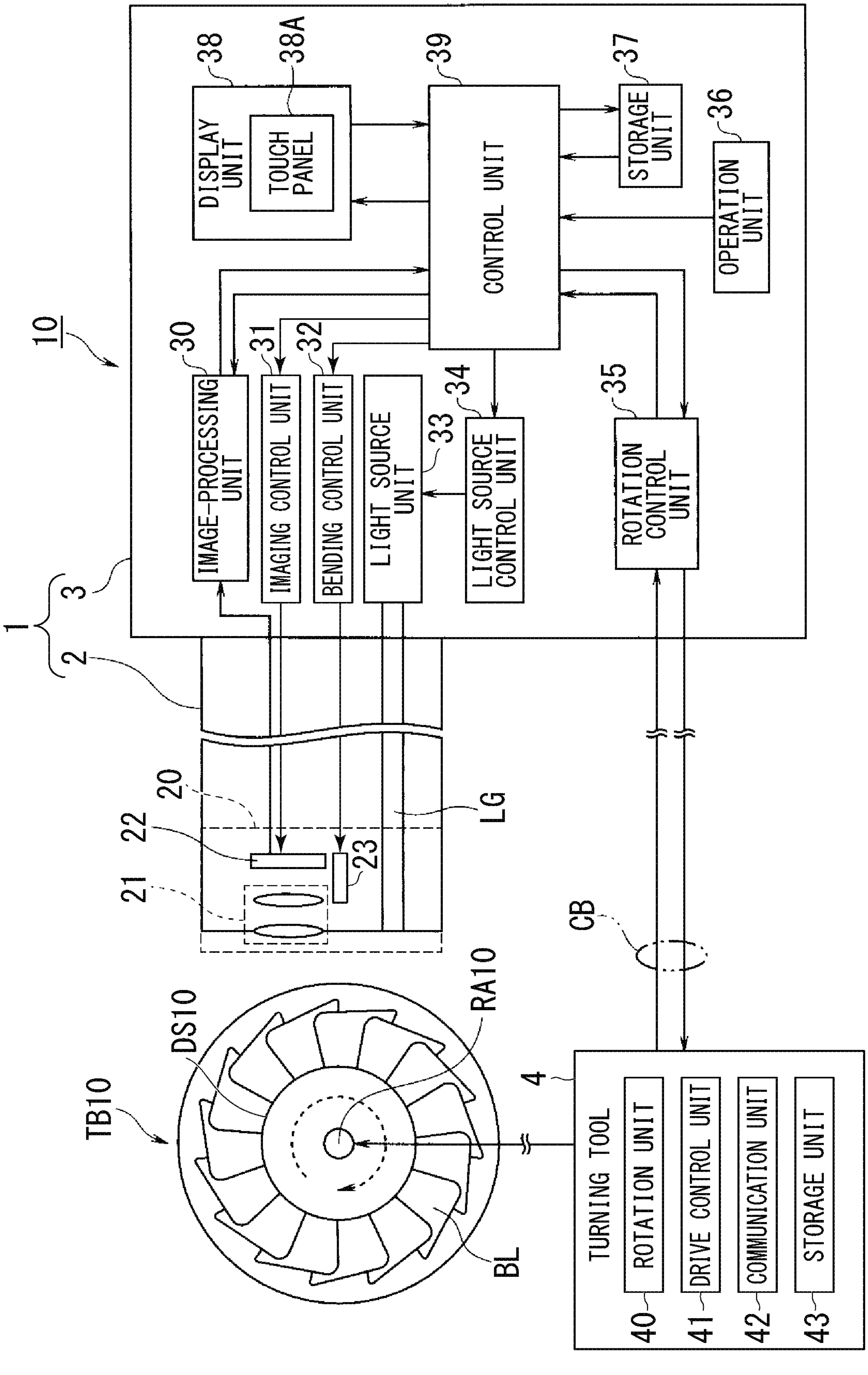
FIG. 1 is a block diagram showing the configuration of an inspection assistance system according to a first embodiment of the present invention.

A first embodiment of the present invention will be described below. FIG. 1 shows the configuration of an inspection assistance system 10. The inspection assistance system 10 assists with inspection of a turbine TB10 which is a subject. The inspection assistance system 10 includes an endoscope device 1 and a turning tool 4. The turbine TB10 includes a disk DS10 and two or more blades BL disposed on the circumference of the disk DS10. The disk DS10 and the two or more blades BL rotate around a rotation axis RA10.

The endoscope device 1 images each blade and generates an image. The turning tool 4 rotates the two or more blades BL by rotating the disk DS10 around the rotation axis RA10.

The endoscope device 1 includes an insertion unit 2 and a main body unit 3. The insertion unit 2 is to be inserted into the turbine TB10. The insertion unit 2 has a long and thin bendable tube shape from a distal end 20 to a proximal end. The insertion unit 2 has a field of view and acquires an optical image of an object in the field of view. The object is, for example, a blade BL. The insertion unit 2 generates an image based on the optical image and outputs the image to the main body unit 3. An optical adaptor is attached to the distal end 20. For example, a monocular optical adaptor is attached to the distal end 20.

The insertion unit 2 includes a lens unit 21, an imaging device 22, and a bending portion 23. The lens unit 21, the imaging device 22, and the bending portion 23 are disposed in the distal end 20.

The lens unit 21 is an observation optical system. The lens unit 21 includes one or more lenses. The lens unit 21 captures an optical image formed by an optical adaptor.

The imaging device 22 is an image sensor such as a charge-coupled device (CCD) sensor or a complementary metal-oxide-semiconductor (CMOS) sensor. The imaging device 22 photoelectrically converts the optical image captured by the lens unit 21 and generates an image. For example, the imaging device 22 sequentially generates two or more images (live images). The two or more images constitute a video. The lens unit 21 and the imaging device 22 constitute a monocular camera having a single viewpoint.

The bending portion 23 bends the insertion unit 2 upward, downward, leftward, or rightward.

The main body unit 3 is a control device including a housing unit that houses the insertion unit 2. The main body unit 3 includes an image-processing unit 30, an imaging control unit 31, a bending control unit 32, a light source unit 33, a light source control unit 34, a rotation control unit 35, an operation unit 36, a storage unit 37, a display unit 38, and a control unit 39.

The image-processing unit 30 performs image processing on an image output from the imaging device 22. For example, the image processing is color reproduction, gradation correction, noise reduction, contour enhancement, and the like. The imaging control unit 31 controls the imaging device 22.

The bending control unit 32 controls a bending state of the insertion unit 2. The bending control unit 32 controls a UD motor and an LR motor that are not shown in FIG. 1. The UD motor is connected to a UD bending wire used for bending the bending portion 23 upward or downward. The UD motor bends the bending portion 23 upward or downward by pulling the UD bending wire. The LR motor is connected to an LR bending wire used for bending the bending portion 23 leftward or rightward. The LR motor bends the bending portion 23 leftward or rightward by pulling the LR bending wire.

The light source unit 33 includes a light source such as light-emitting diode (LED) and generates illumination light. The illumination light is lead to the distal end 20 via a light guide LG disposed in the insertion unit 2. The illumination light is emitted into the turbine TB10 from the distal end 20. The light source control unit 34 controls the light source unit 33.

The rotation control unit 35 generates a rotation control signal for controlling the turning tool 4 and transmits the rotation control signal to the turning tool 4. The rotation control unit 35 receives rotation information transmitted from the turning tool 4 and outputs the rotation information to the control unit 39. The rotation information indicates the amount of rotation (a rotation angle) of the disk DS10. The amount of rotation is not limited to the rotation angle and has only to be information indicating a degree of rotation. For example, the amount of rotation may be the number of steps of the motor or the number of blades from a reference blade described later.

The operation unit 36 is a user interface. For example, the operation unit 36 is at least one of a button, a switch, a key, a mouse, a joystick, a touch pad, a track ball, and a touch panel. The operation unit 36 receives an operation for the endoscope device 1 from a user. The user can input various kinds of information to the endoscope device 1 by operating the operation unit 36.

The storage unit 37 is a volatile or nonvolatile recording medium. For example, the storage unit 37 is at least one of a random-access memory (RAM), a dynamic random access memory (DRAM), a static random-access memory (SRAM), a read only memory (ROM), an erasable programmable read-only memory (EPROM), an electrically erasable programmable read-only memory (EEPROM), a flash memory, a hard disk drive (HDD), and a solid state drive (SSD). The storage unit 37 stores an image or the like. The storage unit 37 may be attachable to and detachable from the endoscope device 1. The storage unit 37 may be a recording medium included in an external device such as a cloud server.

The display unit 38 is a monitor (display) such as a liquid crystal display (LCD). The display unit 38 includes a display screen and displays an image, an operation menu, and the like on the display screen.

The display unit 38 includes a touch panel 38A. A user can input various kinds of information to the endoscope device 1 by touching the touch panel 38A.

The control unit 39 controls operations of the endoscope device 1 based on a program built in the endoscope device 1. The program executed by the control unit 39 may be recorded on a computer-readable recording medium. The program recorded on this recording medium may be read and executed by a computer other than the endoscope device 1.

At least one of the image-processing unit 30, the imaging control unit 31, the bending control unit 32, the light source control unit 34, the rotation control unit 35, and the control unit 39 may be constituted by at least one of a processor and a logic circuit. For example, the processor is at least one of a central processing unit (CPU), a digital signal processor (DSP), and a graphics-processing unit (GPU). For example, the logic circuit is at least one of an application-specific integrated circuit (ASIC) and a field-programmable gate array (FPGA). At least one of the image-processing unit 30, the imaging control unit 31, the bending control unit 32, the light source control unit 34, the rotation control unit 35, and the control unit 39 may include one or more processors. At least one of the image-processing unit 30, the imaging control unit 31, the bending control unit 32, the light source control unit 34, the rotation control unit 35, and the control unit 39 may include one or more logic circuits.

A computer of the endoscope device 1 may read a program and execute the read program. The program includes commands defining the operations of at least one of the image-processing unit 30, the imaging control unit 31, the bending control unit 32, the light source control unit 34, the rotation control unit 35, and the control unit 39. In other words, the functions of at least one of the image-processing unit 30, the imaging control unit 31, the bending control unit 32, the light source control unit 34, the rotation control unit 35, and the control unit 39 may be realized by software.

The program described above, for example, may be provided by using a "computer-readable recording medium" such as a flash memory. The program may be transmitted from a computer storing the program to the endoscope device 1 via a transmission medium or transmission waves in a transmission medium. The "transmission medium" transmitting the program is a medium having a function of transmitting information. The medium having the function of transmitting information includes a network (a communication network) such as the Internet and a communication circuit line (a communication line) such as a telephone line. The program described above may realize some of the functions described above. In addition, the program described above may be a differential file (a differential program). The functions described above may be realized by a combination of a program that has already been recorded in a computer and a differential program.

The turning tool 4 is connected to the rotation control unit 35 of the main body unit 3 via a cable CB. The turning tool 4 includes a rotation unit 40, a drive control unit 41, a communication unit 42, and a storage unit 43.

The rotation unit 40 includes a motor and generates a driving force to rotate the disk DS10 of the turbine TB10.

The drive control unit 41 controls the rotation unit 40 in accordance with the rotation control signal transmitted by the rotation control unit 35. In addition, the drive control unit 41 monitors the state of the rotation unit 40 and generates rotation information indicating the amount of rotation (a rotation angle) of the disk DS10. The communication unit 42 executes communication with the rotation control unit 35 and receives the rotation control signal from the rotation control unit 35. In addition, the communication unit 42 transmits the rotation information to the rotation control unit 35.

The storage unit 43 is a recording medium such as a memory card. The storage unit 43 may be attachable to and detachable from the turning tool 4. The storage unit 43 stores subject information including the number of blades disposed on the disk DS10. The communication unit 42 reads the subject information from the storage unit 43 and transmits the subject information to the rotation control unit 35.

A remote controller may be used in order to control the turning tool 4. A user may control the turning tool 4 by operating the remote controller.

Hereinafter, an example in which the endoscope device 1 controls the turning tool 4 will be described. A device other than the endoscope device 1 may execute communication with the endoscope device 1 and the turning tool 4 and may control the endoscope device 1 and the turning tool 4. Such an example will be described later in a fifth embodiment of the present invention.

The insertion unit 2 and the control unit 39 constitute an imaging apparatus (a camera). The imaging device 22 may be disposed in the main body unit 3, and an optical fiber may be disposed in the insertion unit 2. Light incident on the lens unit 21 may reach the imaging device 22 via the optical fiber. A borescope may be used as a camera.

Turbines are used for aircraft engines or power generators. Gas turbines, steam turbines, and the like are known. Hereinafter, a structure of a gas turbine will be described. Hereinafter, a gas turbine is referred to as a turbine.

A turbine includes a compressor section, a combustion chamber, and a turbine section. In the compressor section, air is compressed. The compressed air is sent to the combustion chamber. Fuel is continuously combusted in the combustion chamber, and gas of a high temperature and a high pressure is generated. The gas is expanded in the turbine section to generate energy. A compressor rotates by using the energy, and the remaining energy is extracted. In the compressor section and the turbine section, rotor blades fixed to a rotation shaft of an engine and stator blades fixed to a casing are alternately disposed.

Figure 2:
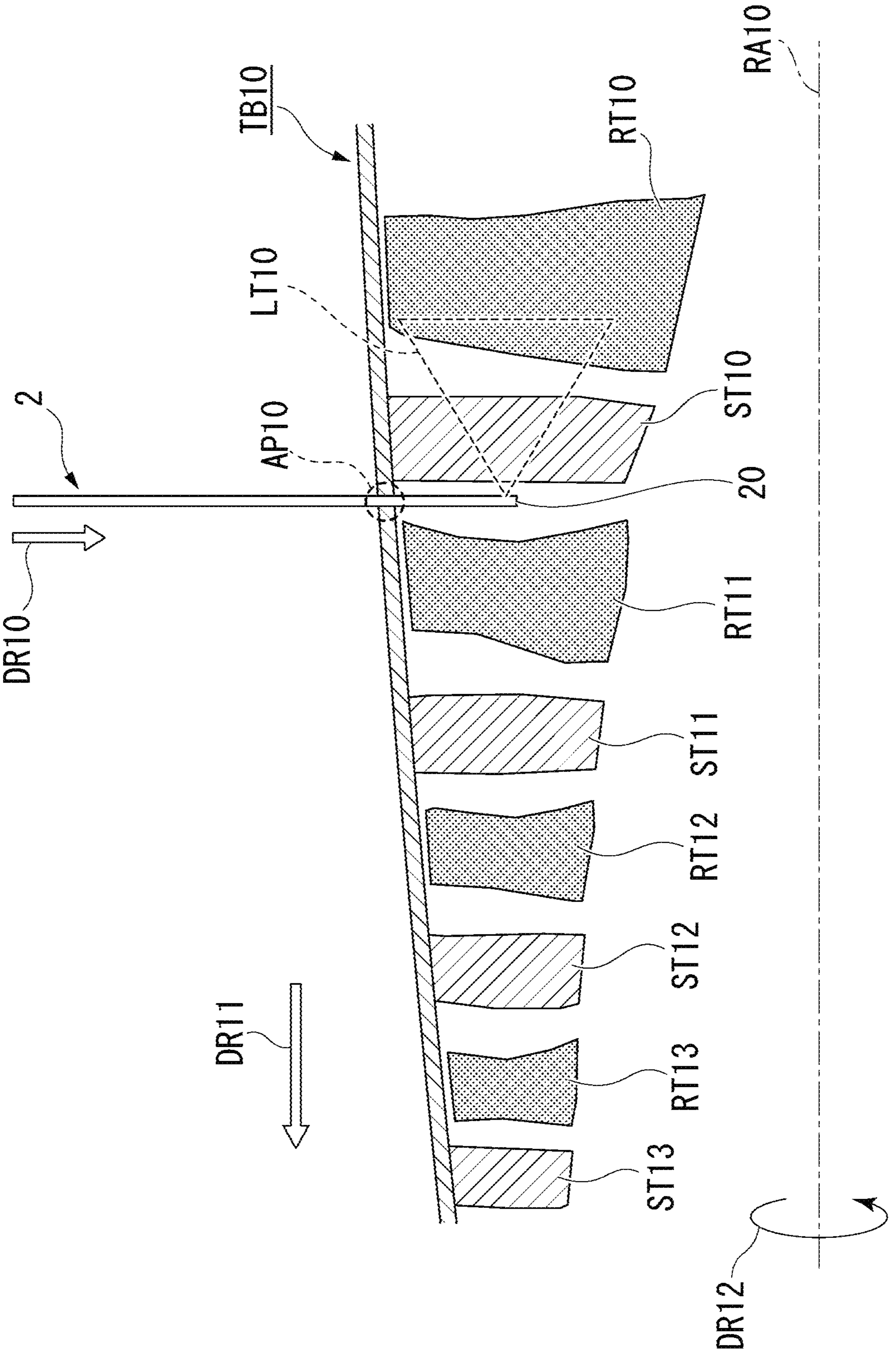
FIG. 2 is a diagram schematically showing the arrangement of rotor blades and stator blades in a turbine according to the first embodiment of the present invention.

FIG. 2 schematically shows the arrangement of rotor blades and stator blades in the compressor section of the turbine TB10. FIG. 2 shows part of a cross-section of the turbine TB10 passing through the rotation axis RA10. The turbine TB10 includes a rotor blade RT10, a stator blade ST10, a rotor blade RT11, a stator blade ST11, a rotor blade RT12, a stator blade ST12, a rotor blade RT13, and a stator blade ST13 in the compressor section. These rotor blades rotate in a direction DR12 around the rotation axis RA10.

Air introduced into the turbine TB10 flows in a direction DR11. The rotor blade RT10 is disposed in a low-pressure section that introduces air. The rotor blade RT13 is disposed in a high-pressure section that expels air.

An access port AP10 is formed to enable internal inspection of the turbine TB10 without disassembling the turbine TB10. The turbine TB10 includes two or more access ports, and one of the two or more access ports is shown as the access port AP10 in FIG. 2. The access port AP10 is a hole formed in the turbine TB10.

The insertion unit 2 constitutes an endoscope. The insertion unit 2 is inserted into the turbine TB10 via the access port AP10. When the insertion unit 2 is inserted into the turbine TB10, the insertion unit 2 moves in the direction DR10. When the insertion unit 2 is pulled out from the turbine TB10, the insertion unit 2 moves in an opposite direction to the direction DR10. The direction DR10 is different from the direction DR12. The direction DR10 extends in the longitudinal direction of the insertion unit 2. Illumination light LT10 is emitted from the distal end 20 of the insertion unit 2.

Figure 3:
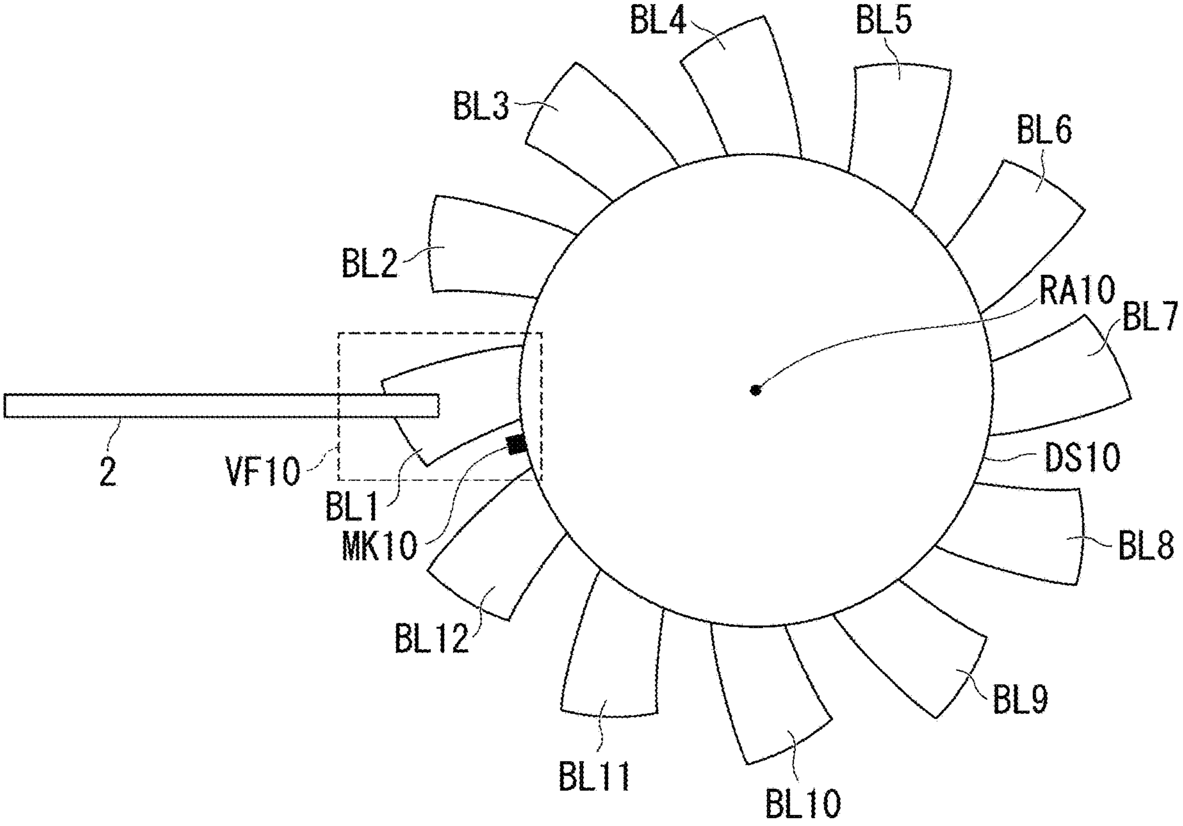
FIG. 3 is a diagram schematically showing the arrangement of rotor blades in a turbine according to the first embodiment of the present invention.

FIG. 3 schematically shows the arrangement of the two or more blades BL seen in a direction parallel to the rotation axis RA10. In FIG. 3, twelve blades BL1 to BL12 are disposed on the disk DS10. The rotation axis RA10 passes through the center of the disk DS10. When the disk DS10 rotates, the blades BL1 to BL12 rotate.

Actually, several tens to several hundreds of blades are disposed on one disk. The number of blades on one disk depends on the type of engine and also depends on stages (the number of stages) in regions from a low-pressure section to a high-pressure section.

The turning tool 4 rotates the disk DS10 or a user manually rotates the disk DS10. The user performs inspection of the blades BL1 to BL12 and determines whether each blade has an abnormality. This inspection is one of major inspection items in inspection of a turbine.

The insertion unit 2 is inserted into the turbine TB10 via the access port AP10. The insertion unit 2 acquires an optical image in a field of view VF10 and generates an image. First, in order to capture a reference blade in the field of view VF10, the turning tool 4 rotates the disk DS10 or a user manually rotates the disk DS10. For example, the reference blade is the blade BL1.

In some cases, a mark MK10 is formed in the vicinity of the reference blade. For example, in some cases, an inspection procedure stipulates that the blade BL1 closest to the mark MK10 is set as the reference blade. A user can determine that the blade BL1 located near the mark MK10 is the reference blade. When the insertion unit 2 captures the reference blade in the field of view VF10, the turning tool 4 or the user stops the rotation of the disk DS10. The user adjusts the position and the orientation of the distal end 20 in order to appropriately observe the blade BL1.

An insertion device may be disposed in the access port AP10. The insertion device moves the insertion unit 2 in the direction DR10 shown in FIG. 2 or in an opposite direction to the direction DR10. In addition to this, the insertion device can also rotate the insertion unit 2 around an axis extending in the longitudinal direction of the insertion unit 2. In other words, the insertion device can twist the insertion unit 2. A user may input a bending instruction to the endoscope device 1 by operating the operation unit 36 or the touch panel 38A. The control unit 39 may control the bending control unit 32 in accordance with the bending instruction. The bending control unit 32 may control the bending state of the insertion unit 2 in accordance with the processing executed by the control unit 39 so as to adjust the position and the orientation of the distal end 20.

After the position and the orientation of the distal end 20 have been adjusted, the distal end 20 is fixed. Thereafter, inspection is started.

In inspection that uses an endoscope device of the prior art, a turning tool rotates a disk so that an insertion unit can acquire an optical image of a blade. When a blade is located at the center of the field of view of the insertion unit, the turning tool stops the rotation of the disk. A user adjusts the position and the orientation of the insertion unit, the state of illumination light, the state of an optical system, and the like, if necessary.

After this adjustment is performed, the user observes an image of the blade generated by the insertion unit in detail and performs inspection of the blade. The above-described operations and processing are repeated, and two or more blades are sequentially inspected.

On the other hand, in each embodiment of the present invention, the disk DS10 rotates so that the insertion unit 2 can capture a blade in the field of view. After the rotation of the disk DS10 has stopped, the insertion unit 2 generates a first image of the blade. After the insertion unit 2 generates first images of all the two or more blades BL, simple inspection (screening) of all the two or more blades BL is performed by using the first images. In the screening, it is determined whether observation (detailed observation) of each blade is necessary.

Thereafter, the disk DS10 rotates so that the insertion unit 2 can capture a blade of which detailed observation is necessary in the field of view. After the rotation of the disk DS10 has stopped, the insertion unit 2 generates a second image of the blade. Detailed inspection of the blade is performed by using the second image.

Figure 4:
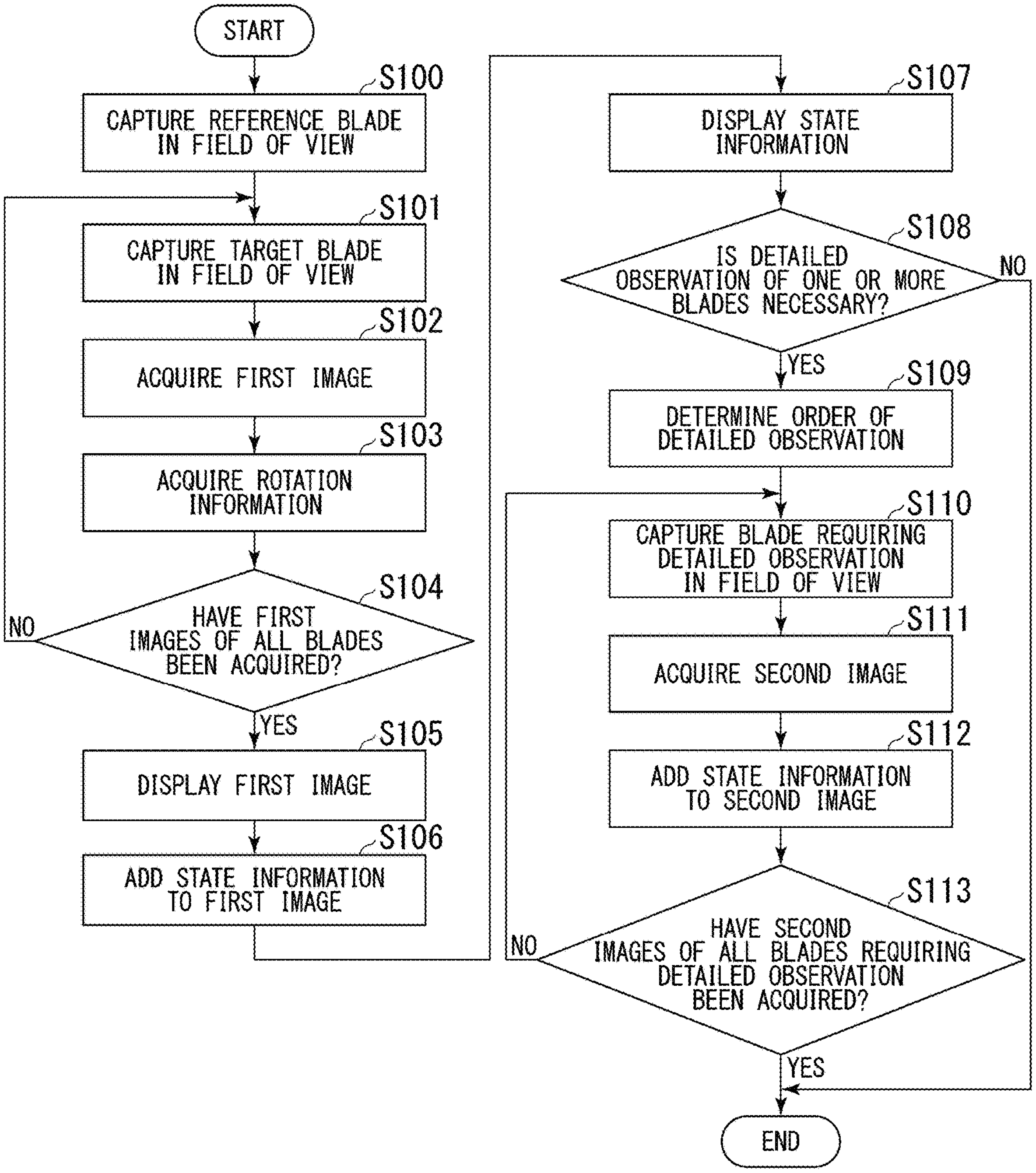
FIG. 4 is a flowchart showing a procedure of processing executed by an endoscope device according to the first embodiment of the present invention.

Processing executed by the endoscope device 1 will be described by using FIG. 4. FIG. 4 shows a procedure of the processing executed by the endoscope device 1.

Before the endoscope device 1 starts the processing shown in FIG. 4, a user completes an operation for starting inspection. For example, the user opens the access port AP10, inserts the insertion unit 2 from the access port AP10 into the turbine TB10, and moves the distal end 20 to a destination at which the inspection is started.

While the processing shown in FIG. 4 is executed, the imaging device 22 sequentially generates two or more images (live images). The image-processing unit 30 performs image processing on each image. The control unit 39 acquires the image processed by the image-processing unit 30 and displays the image on the display unit 38. Each time the imaging device 22 generates a new image, the control unit 39 displays the image on the display unit 38.

After the endoscope device 1 has started the processing shown in FIG. 4, the control unit 39 executes the following processing in order to capture a reference blade in the field of view of the insertion unit 2 (Step S100).

The control unit 39 outputs rotation control information used for rotating the disk DS10 to the rotation control unit 35. The rotation control unit 35 generates a rotation control signal in accordance with the rotation control information and transmits the rotation control signal to the turning tool 4. The communication unit 42 of the turning tool 4 receives the rotation control signal. The drive control unit 41 controls the rotation unit 40 in accordance with the rotation control signal. The rotation unit 40 rotates the disk DS10.

After the insertion unit 2 has captured the reference blade in the field of view, the rotation unit 40 stops the rotation of the disk DS10. The disk DS10 stops. For example, the reference blade is located at the center of the field of view.

A manufacturer of a specific turbine defines a reference blade. Alternatively, a reference blade is defined in a specific type of turbine. In such a case, an easily visible mark is formed in a turbine. Therefore, a user can easily find a reference blade.

In a case in which a reference blade is not defined, the turbine does not include a clear mark. Therefore, a specific blade having characteristic patterns on the surface or the edge is set as a reference blade. For example, a user sets a specific blade as a reference blade. Alternatively, the image-processing unit 30 processes an image generated by the imaging device 22 and detects characteristic patterns. The control unit 39 sets a blade having the patterns as a reference blade. In addition, the control unit 39 displays information indicating that a blade appropriate for the reference blade has been found on the display unit 38. Any method may be used in order to set a reference blade.

In a case in which a reference blade is defined, a user observes an image displayed on the display unit 38 and finds the reference blade. At this time, the user inputs an instruction to stop the rotation of the disk DS10 to the endoscope device 1 by operating the operation unit 36 or the touch panel 38A. The control unit 39 outputs rotation control information used for stopping rotation of the disk DS10 to the rotation control unit 35. Similar processing to that described above is executed, and the drive control unit 41 controls the rotation unit 40 in accordance with the rotation control signal. The rotation unit 40 stops the rotation of the disk DS10. The disk DS10 stops.

In a case in which a reference blade is not defined, the control unit 39 outputs the rotation control information used for stopping the rotation of the disk DS10 to the rotation control unit 35 regardless of an instruction from a user. Specifically, the control unit 39 outputs the rotation control information to the rotation control unit 35 at a timing at which characteristic patterns are detected. Similar processing to that described above is executed, and the drive control unit 41 controls the rotation unit 40 in accordance with the rotation control signal. The rotation unit 40 stops the rotation of the disk DS10. The disk DS10 stops.

After Step S100, the control unit 39 executes the following processing in order to capture a target blade that is an observation target in the field of view of the insertion unit 2 (Step S101).

The rotation control unit 35 receives the subject information transmitted from the turning tool 4 and outputs the subject information to the control unit 39. The subject information includes the number of blades disposed on the disk DS10. The control unit 39 calculates an angle between two adjacent blades based on the number of blades. The control unit 39 outputs the rotation control information used for rotating the disk DS10 by the angle to the rotation control unit 35. Similar processing to that described above is executed, and the drive control unit 41 controls the rotation unit 40 in accordance with the rotation control signal. The rotation unit 40 rotates the disk DS10 by the angle.

After the disk DS10 has rotated by the angle between two adjacent blades, the rotation unit 40 stops rotation of the disk DS10. The disk DS10 stops. The insertion unit 2 captures the target blade in the field of view and acquires an optical image of the target blade. For example, the target blade is located at the center of the field of view. Immediately after Step S100 is executed, the target blade is the reference blade and Step S101 is not executed. Therefore, the insertion unit 2 acquires an optical image of the reference blade.

A user may manually rotate the disk DS10. Alternatively, the user may rotate the disk DS10 by operating the remote controller. The user may observe an image displayed on the display unit 38 and may stop the rotation of the disk DS10 in a state in which the target blade is captured in the field of view of the insertion unit 2.

The control unit 39 includes a counter therein. An initial value of the counter is 0. After Step S101, the control unit 39 increases the value of the counter by 1. The value indicates a blade number.

The storage unit 37 stores inspection management information including various kinds of information related to inspection. The control unit 39 adds the blade number to the inspection management information. Details of the inspection management information will be described later with reference to FIG. 7.

After Step S101, the control unit 39 acquires an image processed by the image-processing unit 30 and stores the image as a first image in the storage unit 37. In addition, the control unit 39 adds the number (a file name) given to the first image to the inspection management information (Step S102).

Due to a phenomenon called backlash, there is a possibility that the target blade does not stop at a target position. Therefore, the control unit 39 may execute feedback control for minute adjustment of the rotation of the disk DS10 and may stop the target blade at the target position.

The control unit 39 may execute the following feedback control. The control unit 39 extracts a region of a blade in the first image and determines whether the region is visible at the center of the first image. When the region is shifted from the center of the first image, the control unit 39 outputs rotation control information used for slightly rotating the disk DS10 to the rotation control unit 35. Similar processing to that described above is executed, and the drive control unit 41 controls the rotation unit 40 in accordance with the rotation control signal. The rotation unit 40 slightly rotates the disk DS10.

It may take time to accurately stop the target blade at the target position. Therefore, a threshold value set to stop rotation of the disk DS10 may have a wide range. Even when the target blade exceeds the target position, the control unit 39 may execute similar processing to the above-described feedback control.

After the feedback control has been executed, similar processing to that described above is executed and the control unit 39 acquires an image processed by the image-processing unit 30 as a first image. The control unit 39 stores the first image in the storage unit 37. Through the feedback control, the relative position or orientation of a blade with respect to the insertion unit 2 changes.

Before the imaging device 22 generates an image acquired as a first image, the control unit 39 sets a first imaging condition. For example, the control unit 39 executes the following processing.

The control unit 39 sets the bending state of the insertion unit 2 as the first imaging condition. Specifically, the control unit 39 outputs bending control information used for controlling the bending state of the insertion unit 2 to the bending control unit 32. The bending control unit 32 bends the bending portion 23 in accordance with the bending control information and sets the position of the imaging device 22 and the orientation of the imaging device 22 to a predetermined position and a predetermined orientation, respectively.

In a case in which the insertion device is disposed at the access port AP10, the control unit 39 sets the position of the insertion unit 2 as the first imaging condition. Specifically, the control unit 39 outputs control information used for controlling the position of the insertion unit 2 to the insertion device. The insertion device moves the insertion unit 2 and sets the position of the insertion unit 2 to a predetermined position. By doing this, the insertion device sets the position of the imaging device 22 to a predetermined position.

In addition, in a case in which the insertion device is disposed in the access port AP10, the control unit 39 sets the orientation of the insertion unit 2 as the first imaging condition. Specifically, the control unit 39 outputs control information used for controlling the rotation angle of the insertion unit 2 around the axis extending in the longitudinal direction of the insertion unit 2 to the insertion device. The insertion device twists the insertion unit 2 and sets the rotation angle of the insertion unit 2 to a predetermined angle. By doing this, the insertion device sets the orientation of the imaging device 22 to a predetermined orientation.

The control unit 39 sets the position and the orientation of the blade captured in the field of view of the insertion unit 2 as the first imaging condition. Specifically, the control unit 39 controls the turning tool 4 by executing similar control to the feedback control described above. The turning tool 4 rotates the disk DS10 and sets the position of the blade captured in the field of view of the insertion unit 2 to a predetermined position. In other words, the turning tool 4 sets the relative position of the imaging device 22 with respect to the blade to a predetermined position.

If a blade rotates, the orientation of the blade changes. The turning tool 4 rotates the disk DS10 and sets the orientation of the blade captured in the field of view of the insertion unit 2 to a predetermined orientation. In other words, the turning tool 4 sets the relative orientation of the imaging device 22 with respect to the blade to a predetermined orientation.

The control unit 39 sets the imaging parameter of the imaging device 22 as the first imaging condition. Specifically, the control unit 39 outputs imaging control information used for setting the imaging parameter of the imaging device 22 to the imaging control unit 31. The imaging control unit 31 controls the imaging device 22 in accordance with the imaging control information. For example, the imaging control unit 31 sets an exposure time of the imaging device 22 to a predetermined value or sets the gain of the imaging device 22 to a predetermined value.

The control unit 39 sets the state of illumination light generated by the light source unit 33 as the first imaging condition. Specifically, the control unit 39 outputs light source control information used for controlling the state of the illumination light to the light source control unit 34. The light source control unit 34 controls the light source unit 33 in accordance with the light source control information and sets the brightness of the illumination light to predetermined brightness.

The control unit 39 sets the parameter of image processing executed by the image-processing unit 30 as the first imaging condition. Specifically, the control unit 39 sets the amount of strength of the noise reduction or the contour enhancement to a predetermined amount.

The control unit 39 sets the state of the lens unit 21 as the first imaging condition. Specifically, the control unit 39 sets the zoom state of the lens unit 21 to a wide state or sets the focal state of the lens unit 21 to a far point.

The control unit 39 sets one or more of the following: the position of the imaging device 22; the orientation of the imaging device 22; the relative position of the imaging device 22 with respect to a blade captured in the field of view of the insertion unit 2; the relative orientation of the imaging device 22 with respect to the blade; the imaging parameter of the imaging device 22; the state of the illumination light; the parameter of the image processing; and the state of the lens unit 21. A user may input an instruction to set the first imaging condition to the endoscope device 1 by operating the operation unit 36 or the touch panel 38A. The instruction is a bending instruction or the like. The control unit 39 may set the first imaging condition in accordance with the instruction. The control unit 39 may add the first imaging condition to the inspection management information.

A user may manually move the insertion unit 2 in the longitudinal direction (the axial direction) of the insertion unit 2 in order to set the first imaging condition. Alternatively, the user may manually twist the insertion unit 2.

While the imaging device 22 generates two or more images acquired as first images, the first imaging condition may be fixed.

After Step S102, the control unit 39 acquires the rotation information and stores the rotation information in the storage unit 37 (Step S103).

Details of Step S103 will be described. The control unit 39 outputs control information used for acquiring the rotation information to the rotation control unit 35. The rotation control unit 35 generates an information acquisition signal in accordance with the control information and transmits the information acquisition signal to the turning tool 4. The communication unit 42 of the turning tool 4 receives the information acquisition signal. The drive control unit 41 generates rotation information indicating the amount of rotation (a rotation angle) required for rotating the disk DS10 from a first position to a second position.

The first position indicates the position of the disk DS10 when the insertion unit 2 acquires an optical image of the reference blade. The second position indicates the position of the disk DS10 after Step S101 is executed. In other words, the rotation information indicates the angle between the reference blade and the target blade.

The communication unit 42 transmits the rotation information to the rotation control unit 35. The rotation control unit 35 receives the rotation information and outputs the rotation information to the control unit 39. The control unit 39 stores the rotation information in the storage unit 37. At this time, the control unit 39 associates the rotation information with the first image acquired in Step S102. The endoscope device 1 can rotate the disk DS10 by using the rotation information so that the insertion unit 2 can acquire an optical image of a specific blade again.

The first image may include the rotation information. For example, the rotation information may be included in an exchangeable image file format (Exif) area of the first image. The rotation information may be included in a file different from that including the first image, and the rotation information and the first image may be associated with each other.

In the following example, the control unit 39 adds the rotation information to the inspection management information. In the inspection management information, the rotation information and the first image are associated with each other.

After Step S103, the control unit 39 determines whether first images of all the blades have been acquired (Step S104).

Details of Step S104 will be described. The control unit 39 acquires the value of the counter. As described above, the value indicates the blade number. As described above, the subject information includes the number of blades disposed on the disk DS10. The control unit 39 determines whether the number indicated by the subject information is the same as the blade number. When the number indicated by the subject information is the same as the blade number, the control unit 39 determines that the first images of all the blades have been acquired. When the number indicated by the subject information is greater than the blade number, the control unit 39 determines that first images of some of the blades disposed on the disk DS10 have not been acquired.

In many cases, a user knows the number of blades disposed on the disk DS10 in advance. The user may input the number to the endoscope device 1 by operating the operation unit 36 or the touch panel 38A.

When the control unit 39 has determined that the first images of some of the blades disposed on the disk DS10 have not been acquired in Step S104, Step S101 is executed. The insertion unit 2 captures, in the field of view, a blade next to the blade captured in the field of view immediately before Step S104 is executed.

The turbine TB10 includes two or more blades BL. Therefore, the storage unit 37 stores two or more first images. In general, several ten to about two hundred blades are disposed on a disk. In other words, Steps S101 to S104 are repeated more than several ten times. The endoscope device 1 may acquire two or more first images of the same blade. Therefore, the number of first images and the number of blades are not necessarily the same.

The control unit 39 may skip acquisition of first images of some of the two or more blades BL.

The control unit 39 may display the blade number on the display unit 38 in Step S104. A user can see what blade is currently observed.

When the control unit 39 has determined that the first images of all the blades have been acquired in Step S104, the control unit 39 displays the two or more first images stored in the storage unit 37 on the display unit 38 (Step S105).

Figure 5:
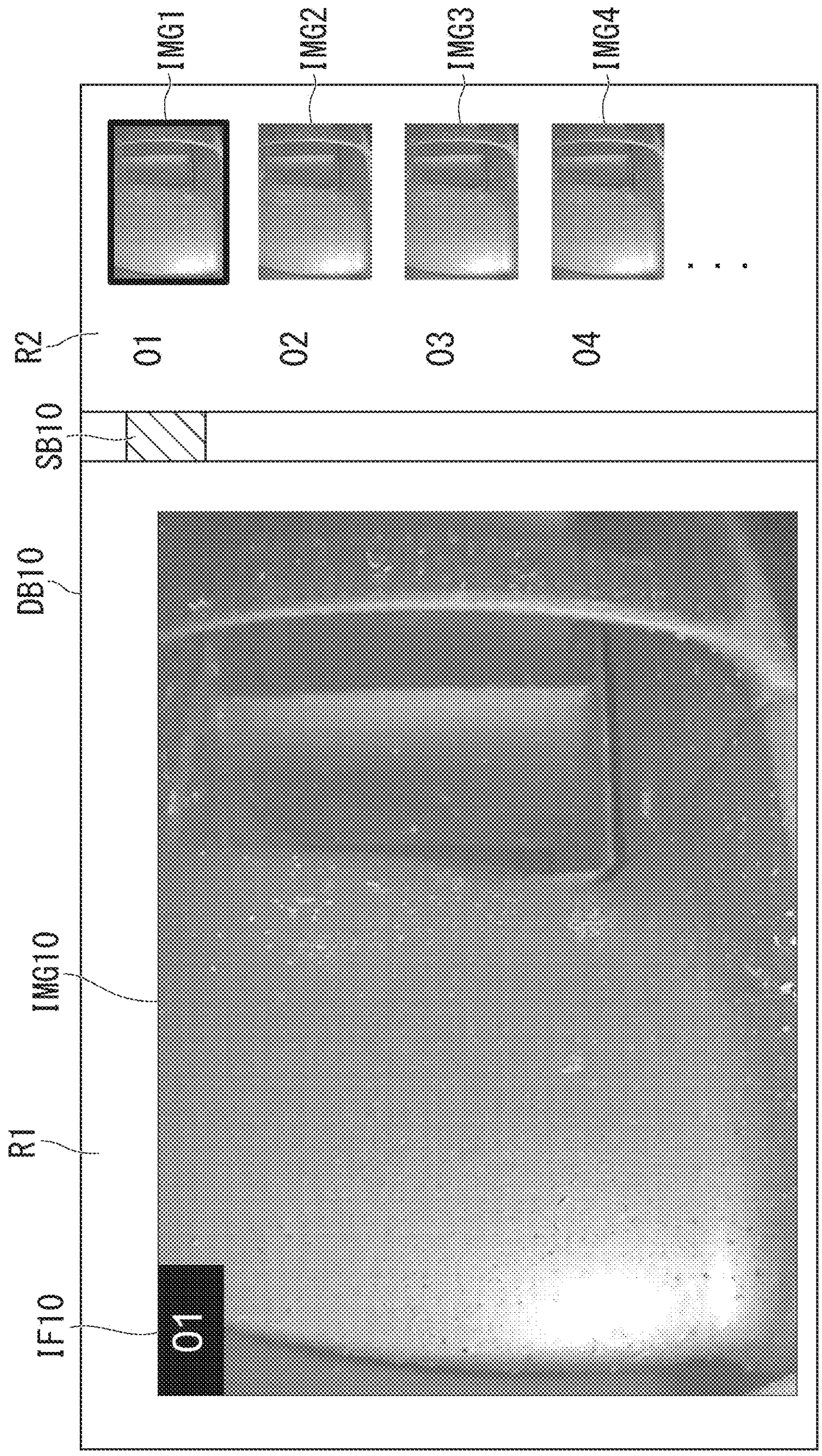
FIG. 5 is a diagram showing an example of information displayed on a display unit included in the endoscope device according to the first embodiment of the present invention.

FIG. 5 shows an example of information displayed on the display unit 38 in Step S105. The control unit 39 displays a dialogue box DB10 shown in FIG. 5 on the display unit 38.

The dialogue box DB10 includes a first region R1 and a second region R2. A first image IMG10 is displayed in the first region R1. The first image IMG10 is highlighted so that a user can easily observe the first image IMG10. For example the first image IMG10 is enlarged.

Additional information IF10 is displayed on the first image IMG10. For example, the additional information IF10 includes a blade number. The additional information IF10 may include a file name of the first image IMG10. Alternatively, the additional information IF10 may include coordinates or a pixel value (RGB value) of a specific pixel of the first image IMG10.

First images IMG1 to IMG4 and blade numbers "01" to "04" are displayed in the second region R2. Each of the first images IMG1 to IMG4 is a thumbnail image of the first image acquired in Step S102. A list of the first images IMG1 to IMG4 may be displayed in the second region R2. A blade that is visible in each of the first images IMG1 to IMG4 has a blade number. For example, a blade that is visible in the first image IMG1 has a blade number "01."

The first image IMG10 in the first region R1 corresponds to the first image IMG1 in the second region R2. In order to notify a user that the first image IMG10 corresponds to the first image IMG1, a frame of the first image IMG1 is highlighted.

First images IMG2 to IMG4 are not displayed in the first region R1. A user can visually recognize the first images IMG2 to IMG4 not displayed in the first region R1 in addition to the first image IMG10 displayed in the first region R1.

A user can select any one of the first images IMG1 to IMG4 by operating the operation unit 36 or the touch panel 38A. When one first image is selected, the first image is displayed in the first region R1.

In a case in which many first images have been acquired, part of the second region R2 is displayed in the dialogue box DB10. The second region R2 outside the dialogue box DB10 is not displayed. A user can move a scroll bar SB10 by operating the operation unit 36 or the touch panel 38A. When the scroll bar SB10 moves, the second region R2 outside the dialogue box DB10 moves into the dialogue box DB10 and is displayed.

The scroll bar SB10 may be used to change the first image displayed in the first region R1. For example, when a user moves the scroll bar SB10, the first image IMG2 instead of the first image IMG10 may be displayed in the first region R1.

The control unit 39 may store a video including two or more images generated by the imaging device 22 as the first image in the storage unit 37. The control unit 39 may display a specific image (frame) included in the video on the display unit 38 in Step S105.

A user observes the two or more first images displayed on the display unit 38. The user determines the state of a blade that is visible in each first image. The user inputs a result of the determination to the endoscope device 1 by operating the operation unit 36 or the touch panel 38A. The control unit 39 generates state information in accordance with the result of the determination. The state information indicates the state of the blade that is visible in each first image. The state information includes observation information indicating whether detailed observation of each blade is necessary. The control unit 39 adds the state information to the first image (Step S106).

In general, abnormality types and inspection pass/fail conditions are described in an inspection manual. For example, the conditions are related to the size of an abnormality. A user determines the state of a blade that is visible in each first image in accordance with details of the inspection manual. The user determines that detailed observation is necessary when a region that is likely to be abnormal is found.

The first image may include the state information. For example, the state information may be included in an Exif area of the first image. The state information may be included in a file different from that including the first image, and the state information and the first image may be associated with each other.

In the following example, the control unit 39 adds the state information to the inspection management information. In the inspection management information, the state information and the first image are associated with each other.

The state information may include information indicating OK or NG in addition to the observation information. When a user has determined that the blade that is visible in the first image has no abnormalities, the user may input information indicating OK to the endoscope device 1, and the state information may include the information indicating OK. The state information may include observation information indicating that detailed observation is unnecessary. When a user has determined that the blade that is visible in the first image has an abnormality, the user may input information indicating NG to the endoscope device 1, and the state information may include the information indicating NG. The state information may include observation information indicating that detailed observation is necessary.

When the user has found a permissible abnormality, the user may input information indicating that there is an abnormality and follow-up observation is necessary to the endoscope device 1 and the state information may include such information. When the user has found a permissible abnormality, the user may input information indicating that there is an abnormality and the severity is low to the endoscope device 1, and the state information may include such information. The state information regarding a permissible abnormality may include observation information indicating that detailed observation is unnecessary.

The observation information or the information indicating OK or NG may be expressed a value (for example, percentage) indicating the reliability or the severity instead of as a binary value (a Boolean value) indicating "true" or "false."

A user taps any one of the first images IMG1 to IMG4 displayed in the dialogue box DB10 shown in FIG. 5 or taps the first image IMG10 in the dialogue box DB10 by operating the operation unit 36 or the touch panel 38A. At this time, the control unit 39 selects the tapped first image and displays a dialogue box different from the dialogue box DB10 on the display unit 38. Two or more candidates for the state information are displayed in the dialogue box.

The user inputs an instruction to select any one of the two or more candidates to the endoscope device 1 by operating the operation unit 36 or the touch panel 38A. The control unit 39 adds the state information corresponding to the candidate indicated by the instruction to the tapped first image. Thereafter, the control unit 39 displays the dialogue box DB10 shown in FIG. 5 again. The user can add the state information to all the two or more first images displayed on the display unit 38 by repeating the above-described operations.

In order to shorten an inspection time, the user may determine states of only some of the two or more blades BL. The control unit 39 may determine that a blade of which the state has not been selected by the user is normal (OK).

After the state information is added to the first image, the user may input an instruction to change the state information to the endoscope device 1 by operating the operation unit 36 or the touch panel 38A. The control unit 39 may change the state information in accordance with the instruction.

In the above-described examples, the user determines the state of each blade. As will be described later, the control unit 39 may process the first image and may determine the state of each blade.

After Step S106, the control unit 39 displays the state information on the display unit 38 (Step S107).

Figure 6:
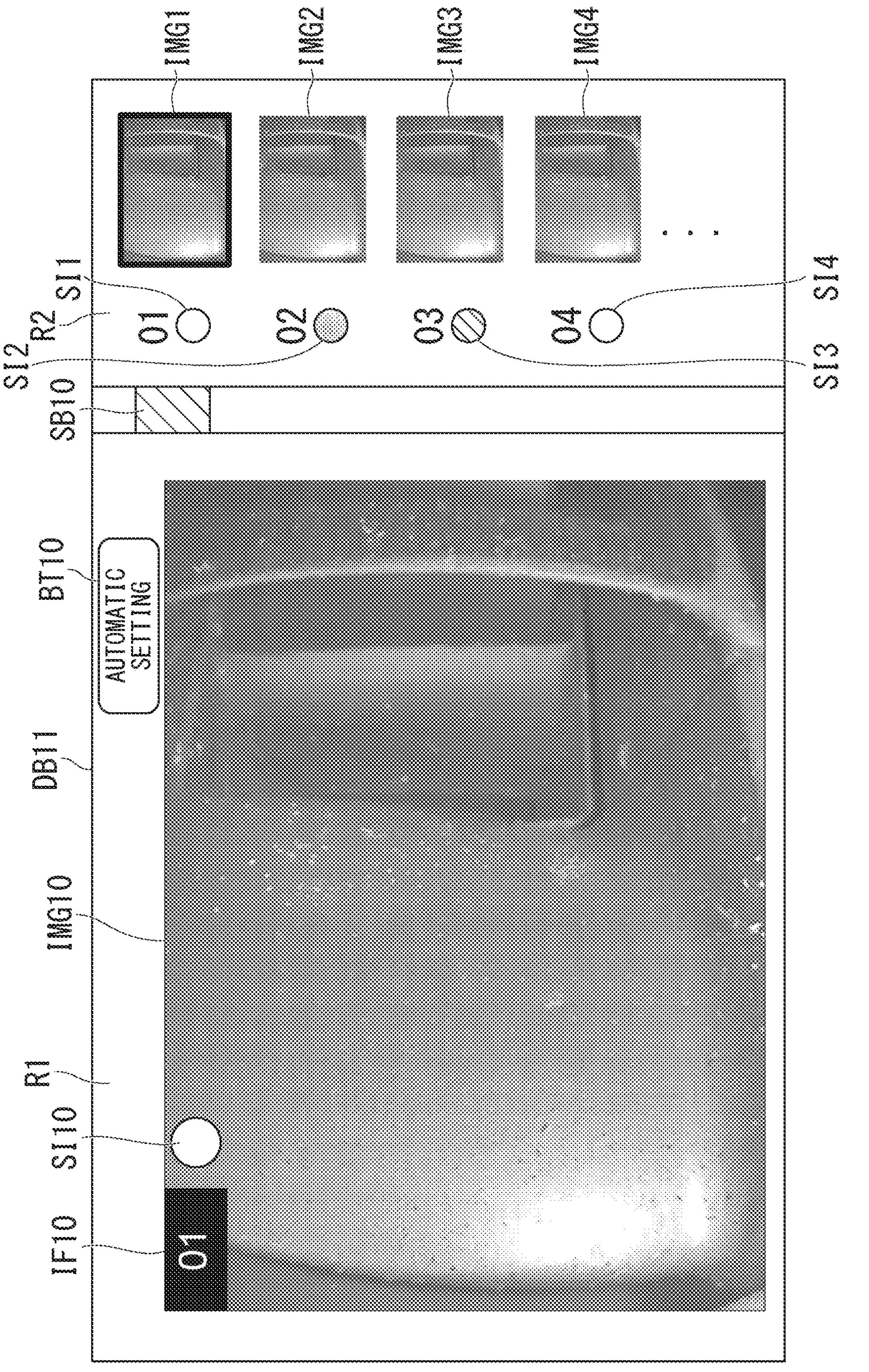
FIG. 6 is a diagram showing an example of information displayed on the display unit included in the endoscope device according to the first embodiment of the present invention.

FIG. 6 shows an example of information displayed on the display unit 38 in Step S107. The control unit 39 displays a dialogue box DB11 shown in FIG. 6 on the display unit 38. Descriptions of the same parts as those shown in FIG. 5 will be omitted.

State information SI10 is displayed on the first image IMG10. The state information SI10 is added to the first image IMG10.

State information SI1 to SI4 is displayed in the second region R2. One of the state information SI1 to SI4 is added to one of the first images IMG1 to IMG4. For example, the state information SI1 is added to the first image IMG1. The first image IMG10 in the first region R1 corresponds to the first image IMG1 in the second region R2. Therefore, the state information SI10 added to the first image IMG10 corresponds to the state information SI1 added to the first image IMG1.

For example, the state information SI10 and the state information SI1 to SI4 are displayed in colors in accordance with the states of the blades. For example, the state information SI10, SI1, and SI4 indicate that the blades that are visible in the first images IMG10, IMG1, and IMG4 have no abnormalities. For example, the state information SI2 indicates that detailed observation of the blade that is visible in the first image IMG2 is necessary. For example, the state information SI3 indicates that the severity of the blade that is visible in the first image IMG3 is high.

The state information SI10 and the state information SI1 to SI4 may be displayed as characters indicating the states of the blades. The state information SI10 and the state information SI1 to SI4 may be displayed as figures with shapes in accordance with the states of the blades. The blade numbers may be displayed in colors in accordance with the states of the blades. Any method may be used to display the state information SI10 and the state information SI1 to SI4 as long as a user can recognize the states of the blades.

A button BT10 is displayed in the first region R1. A user can press the button BT10 by operating the operation unit 36 or the touch panel 38A. When the user has pressed the button BT10, the control unit 39 may process each of the two or more first images displayed on the display unit 38 and may determine the states of the blades that are visible in the first images. The control unit 39 may generate the state information in accordance with a result of the and may add the state information to the first images.

The control unit 39 may generate the state information by using a first image in Step S106. Details of this processing will be described. Hereinafter, a first example and a second example will be described. In these examples, the control unit 39 need not display the first images on the display unit 38 in Step S105.

The first example will be described. The storage unit 37 stores a reference image in which an abnormality is visible in advance. The control unit 39 acquires the reference image from the storage unit 37 and compares the reference image with the first image. Specifically, the control unit 39 executes matching processing and determines whether a blade that is visible in the first image includes a similar region to the abnormality that is visible in the reference image. When the control unit 39 has determined that the blade includes the region, the control unit 39 generates state information including observation information indicating that detailed observation of the blade is necessary. When the control unit 39 has determined that the blade does not include the region, the control unit 39 generates state information including observation information indicating that detailed observation of the blade is unnecessary.

The second example will be then described. The storage unit 37 stores feature information indicating a feature of an abnormality in advance. The feature information is generated by using images acquired in inspection performed in the past. For example, the feature information indicates features such as the color, size, and shape of the abnormality. The control unit 39 determines whether the feature of a blade that is visible in the first image is similar to that of the abnormality indicated by the feature information. When the control unit 39 has determined that the feature of the blade is similar to that of the abnormality indicated by the feature information, the control unit 39 generates state information including observation information indicating that detailed observation of the blade is necessary. When the control unit 39 has determined that the feature of the blade is not similar to the feature of the abnormality indicated by the feature information, the control unit 39 generates state information including observation information indicating that detailed observation of the blade is unnecessary.

In the second example, machine learning may be used. For example, deep learning may be used as machine learning. For example, a user observes an image acquired in inspection performed in the past and determines whether a region that is visible in the image is abnormal or normal. The control unit 39 analyzes the features of the image by using that image and ground truth (training data) indicating a result of determination performed by a user and generates a trained model. The trained model corresponds to the feature information. The storage unit 37 stores the trained model.

After the first image has been acquired, the control unit 39 inputs the first image to the trained model and acquires, as the output, information indicating that the region that is visible in the first image is abnormal or normal. The control unit 39 generates the state information including the observation information based on the acquired information.

A blade that is visible in an image used for generating the feature information is not necessarily the same as that that is visible in the first image. The feature information may be generated from an image of a blade of a turbine different from that including the blade that is visible in the first image.

The control unit 39 may calculate a value indicating the reliability or the severity by using the reference image or the feature information. The control unit 39 may determine whether the blade that is visible in the first image is abnormal based on the value and may generate state information. The range of the value of the reliability or the severity corresponding to an abnormality may be changeable in accordance with the purpose of inspection.

After Step S107, the control unit 39 determines whether detailed observation of one or more blades is necessary (Step S108).

Details of Step S108 will be described. The control unit 39 acquires the state information added to each first image from the storage unit 37. The control unit 39 refers to the observation information included in the state information. When the observation information indicates that detailed observation is necessary, the control unit 39 determines that detailed observation of a blade that is visible in the first image is necessary. When the observation information indicates that detailed observation is unnecessary, the control unit 39 determines that detailed observation of the blade that is visible in the first image is unnecessary. The control unit 39 executes the above-described processing for all the first images to which the state information is added.

When there is no image to which the observation information indicating the necessity of detailed observation is added, the control unit 39 determines that the detailed observation is unnecessary. When there is an image to which the observation information indicating the necessity of detailed observation is added, the control unit 39 determines that the detailed observation is necessary.

When the control unit 39 has determined that the detailed observation is unnecessary in Step S108, the processing shown in FIG. 4 is completed. When the control unit 39 has determined that the detailed observation is necessary in Step S108, the control unit 39 selects all the first images to which the observation information indicating the necessity of the detailed observation is added and determines the order of the detailed observation of blades that are visible in the first images (Step S109).

Details of Step S109 will be described. In a case in which the state information includes a value indicating the reliability or the severity, the control unit 39 determines the order of the detailed observation based on the value. For example, the blades are observed in descending order of the severity in accordance with the determined order of detailed observation. Alternatively, the control unit 39 determines the order of the detailed observation based on the positions of the blades of which the detailed observation is necessary. For example, the blades are observed clockwise or counter-clockwise from the reference blade in accordance with the determined order. A user may input information indicating the order of the detailed observation to the endoscope device 1 by operating the operation unit 36 or the touch panel 38A. Any method may be used in order to determine the order of the detailed observation.

In a case in which the observation information indicating the necessity of the detailed observation is added to only one first image, the control unit 39 determines that the detailed observation of only a blade that is visible in the first image is to be performed. The control unit 39 adds information indicating the order of the detailed observation to the inspection management information.

In the example shown in FIG. 6, the state information SI2 indicates that detailed observation of a blade that is visible in the first image IMG2 is necessary. The blade number of the blade is 2. The state information other than the state information SI2 indicates that detailed observation of a blade that is visible in a first image to which the state information is added is unnecessary. Therefore, the detailed observation of only a blade that is visible in the first image IMG2 is performed. A numeral "1" indicating the order of the detailed observation of the blade is displayed on the first image IMG2 (not shown in the drawing).

FIG. 7 shows an example of the inspection management information stored in the storage unit 37. Inspection management information MNG10 shown in FIG. 7 includes a blade number, an image number, the state information, the reliability, the type of abnormality, the severity, the rotation information, and the order of detailed observation. These are associated with each other.

The control unit 39 adds the blade number to the inspection management information in Step S101. The control unit 39 adds the image number to the inspection management information in Step S102. Two or more first images of the same blade may be acquired. In the example shown in FIG. 7, the control unit 39 acquires two first images of a blade with a blade number "003" and acquires two first images of a blade with a blade number "006."

The control unit 39 adds the rotation information to the inspection management information in Step S103. In the example shown in FIG. 7, the rotation information is expressed as the position of each blade. The control unit 39 adds the state information, the reliability, the type of abnormality, and the severity to the inspection management information in Step S106. The control unit 39 adds the order of detailed observation to the inspection management information in Step S109.

The state information of a blade with a blade number "003" and the state information of a blade with a blade number "007" indicate that detailed observation is necessary. The order of detailed observation indicates that the blade with the blade number "003" and the blade with the blade number "007" are observed in this order.

After Step S109, the control unit 39 executes the following processing in order to capture a blade of which detailed observation is necessary in the field of view of the insertion unit 2 (Step S110).

The control unit 39 selects a target blade in accordance with the order determined in Step S109. The control unit 39 acquires rotation information added to the first image in which the selected target blade is visible from the storage unit 37. In the example shown in FIG. 7, the control unit 39 acquires the rotation information associated with the blade number of the target blade from the inspection management information.

The control unit 39 calculates the amount of rotation (a rotation angle) of the disk DS10 required for capturing the target blade in the field of view of the insertion unit 2. When the current amount of rotation of the disk DS10 is 0 degrees, the reference blade is captured in the field of view of the insertion unit 2. For example, the current amount of rotation of the disk DS10 is N ($0<N<360$) degrees. For example, when the angle indicated by the rotation information is 120 degrees, the disk DS10 needs to be rotated by (120-N) degrees in order to capture the target blade in the field of view of the insertion unit 2.

The control unit 39 outputs rotation control information used for rotating the disk DS10 by the above-described angle to the rotation control unit 35. The similar processing as that described above is executed, and the drive control unit 41 controls the rotation unit 40 in accordance with the rotation control signal. The rotation unit 40 rotates the disk DS10 by the angle. After the disk DS10 has been rotated by the angle, the rotation unit 40 stops the rotation of the disk DS10. The disk DS10 stops. The insertion unit 2 captures the target blade in the field of view and acquires an optical image of the target blade.

The control unit 39 may display the number of all the blades of which detailed observation is necessary and the number of blades of which the detailed observation is completed on the display unit 38 in Step S110. For example, when detailed observation of five blades is necessary and the detailed observation of two blades is completed, the control unit 39 displays "2/5" on the display unit 38.

After Step S110, the control unit 39 acquires an image processed by the image-processing unit 30 as a second image and stores the second image in the storage unit 37 (Step S111).

As described above, the control unit 39 displays two or more live images generated by the imaging device 22 on the display unit 38. The live images include the second image.

Before the imaging device 22 generates an image to be acquired as a second image, the control unit 39 sets a second imaging condition. Similarly to the first imaging condition, the second imaging condition is one or more of the following: the position of the imaging device 22; the orientation of the imaging device 22; the relative position of the imaging device 22 with respect to a blade captured in the field of view of the insertion unit 2; the relative orientation of the imaging device 22 with respect to the blade; the imaging parameter of the imaging device 22; the state of the illumination light; the parameter of the image processing; and the state of the lens unit 21.

In general, in inspection of a blade, a user needs to determine whether the state of the blade is OK or NG. Therefore, the user determines whether the state of the blade is OK or NG in detailed observation. When the second imaging condition is the same as the first imaging condition, the state of the blade that is visible in the second image is similar to the state of the blade that is visible in the first image. In such a case, the user has difficulty in determining that the state of the blade is different from the state in which detailed observation is necessary.

Therefore, the second imaging condition needs to be different from the first imaging condition. For example, the control unit 39 executes the following processing in order to differentiate the second imaging condition from the first imaging condition.

The control unit 39 sets the bending state of the insertion unit 2 as the second imaging condition. The control unit 39 executes similar processing to that of setting the first imaging condition and sets the position of the imaging device 22 and the orientation of the imaging device 22 to a predetermined position and a predetermined orientation, respectively. The position of the imaging device 22 set as the second imaging condition is different from that of the imaging device 22 set as the first imaging condition. The orientation of the imaging device 22 set as the second imaging condition is different from that of the imaging device 22 set as the first imaging condition.

In a case in which the insertion device is disposed in the access port AP10, the control unit 39 sets the position of the insertion unit 2 as the second imaging condition. The control unit 39 executes similar processing to that of setting the first imaging condition and sets the position of the imaging device 22 to a predetermined position. The position of the imaging device 22 set as the second imaging condition is different from that of the imaging device 22 set as the first imaging condition.

In addition, in a case in which the insertion device is disposed at the access port AP10, the control unit 39 sets the orientation of the insertion unit 2 as the second imaging condition. The control unit 39 executes similar processing to that of setting the first imaging condition and sets the orientation of the imaging device 22 to a predetermined orientation. The orientation of the imaging device 22 set as the second imaging condition is different from that of the imaging device 22 set as the first imaging condition.

The control unit 39 sets the position and the orientation of the blade captured in the field of view of the insertion unit 2 as the second imaging condition. The control unit 39 executes similar processing to that of setting the first imaging condition and sets the position of the blade to a predetermined position. In other words, the control unit 39 sets the relative position of the imaging device 22 with respect to the blade to a predetermined position. The relative position of the imaging device 22 set as the second imaging condition is different from that of the imaging device 22 set as the first imaging condition.

In addition, the control unit 39 executes similar processing to that of setting the first imaging condition and sets the orientation of the blade captured in the field of view of the insertion unit 2 to a predetermined orientation. In other words, the control unit 39 sets the relative orientation of the imaging device 22 with respect to the blade to a predetermined orientation. The relative orientation of the imaging device 22 set as the second imaging condition is different from that of the imaging device 22 set as the first imaging condition.

The control unit 39 sets an imaging parameter of the imaging device 22 as the second imaging condition. The control unit 39 executes similar processing to that of setting the first imaging condition and sets an exposure time of the imaging device 22 to a predetermined value. For example, the exposure time set as the second imaging condition is longer than that set as the first imaging condition. Alternatively, the control unit 39 sets the gain of the imaging device 22 to a predetermined value. For example, the gain set as the second imaging condition is greater than that set as the first imaging condition.

The control unit 39 sets the state of illumination light generated by the light source unit 33 as the second imaging condition. The control unit 39 executes similar processing to that of setting the first imaging condition and sets the brightness of the illumination light to predetermined brightness. For example, the illumination light under the second imaging condition is brighter than that under the first imaging condition.

The control unit 39 sets the parameter of image processing executed by the image-processing unit 30 as the second imaging condition. Specifically, the control unit 39 sets the amount of strength of the noise reduction or the contour enhancement to a predetermined amount. For example, the control unit 39 sets the amount of strength of the noise reduction such that the noise in a second image is more strongly suppressed than that in a first image. For example, the control unit 39 sets the amount of strength of the contour enhancement such that the contour of a region in a second image is more strongly highlighted than that of a region in a first image.

The control unit 39 sets the state of the lens unit 21 as the second imaging condition. Specifically, the control unit 39 sets the zoom state of the lens unit 21 to a telescopic state or sets the focal state of the lens unit 21 to a near point.

The control unit 39 sets one or more of the following: the position of the imaging device 22; the orientation of the imaging device 22; the relative position of the imaging device 22 with respect to a blade captured in the field of view of the insertion unit 2; the relative orientation of the imaging device 22 with respect to the blade; the imaging parameter of the imaging device 22; the state of the illumination light; the parameter of the image processing; and the state of the lens unit 21. A user may input an instruction to set the second imaging condition to the endoscope device 1 by operating the operation unit 36 or the touch panel 38A. The instruction is a bending instruction or the like. The control unit 39 may set the second imaging condition in accordance with the instruction.

A user may manually move the insertion unit 2 in the longitudinal direction (the axis direction) of the insertion unit 2 in order to set the second imaging condition. Alternatively, the user may manually twist the insertion unit 2.

Each time the target blade is changed, the user may input an instruction to change the second imaging condition to the endoscope device 1. The control unit 39 may change the second imaging condition in accordance with the instruction.

The control unit 39 may automatically set a second imaging condition different from the first imaging condition included in the inspection management information. Each time the target blade is changed, the control unit 39 may change the second imaging condition.

A user observes the image displayed on the display unit 38. The imaging condition of the image is the same as the second imaging condition of the second image. The user determines the state of a blade that is visible in the image displayed on the display unit 38. The user inputs a result of the determination to the endoscope device 1 by operating the operation unit 36 or the touch panel 38A. The control unit 39 generates state information in accordance with the result of the determination. The state information indicates the state of the blade that is visible in the second image. The state information indicates that the blade is OK or NG. The control unit 39 adds the state information to the second image (Step S112).

The second image serves as an inspection evidence. The second image may be attached to an inspection report.

The second image may include the state information. For example, the state information may be included in an Exif area of the second image. The state information may be included in a file different from that including the second image, and the state information and the second image may be associated with each other. The control unit 39 may add the state information to the inspection management information and may associate the state information and the second image with each other in the inspection management information.

The state information may include the severity of an abnormality in a blade. For example, the severity indicates any one of three ranks, that is, low, middle, and high.

Figure 8:
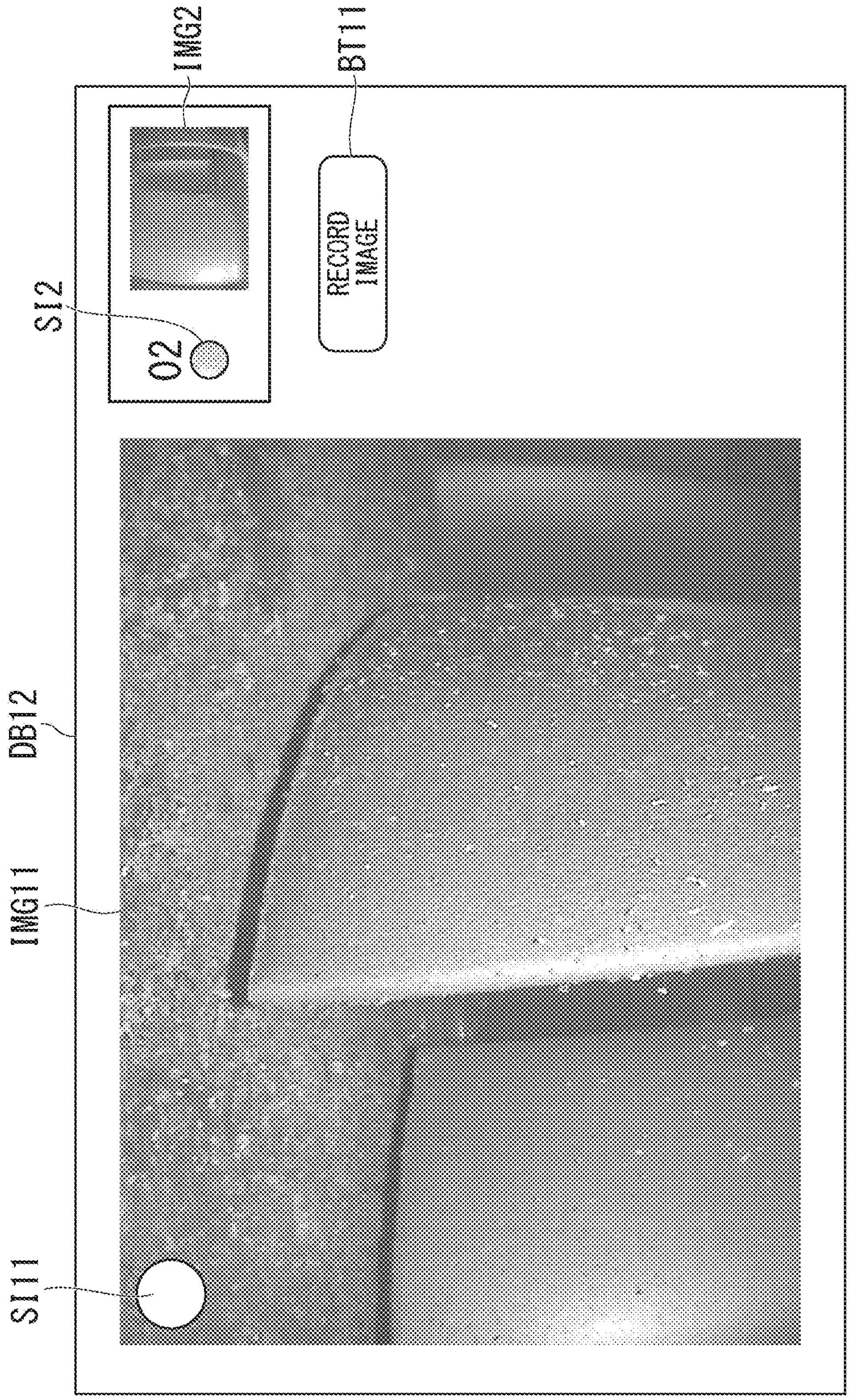
FIG. 8 is a diagram showing an example of information displayed on the display unit included in the endoscope device according to the first embodiment of the present invention.

FIG. 8 shows an example of information displayed on the display unit 38 in Steps S111 and S112. The control unit 39 displays a dialogue box DB12 shown in FIG. 8 on the display unit 38.

A live image IMG11 is displayed in the dialogue box DB12. Each time the imaging device 22 generates an image, the live image IMG11 is updated.

A first image IMG2, a blade number "02," and state information SI2 are displayed in the dialogue box DB12. A blade that is visible in the first image IMG2 has a blade number "02." The state information SI2 is added to the first image IMG2. The state information SI2 indicates that detailed observation of the blade that is visible in the first image IMG2 is necessary. A blade that is visible in the live image IMG11 is the same as that that is visible in the first image IMG2.

The second imaging condition is different from the first imaging condition. Therefore, the composition of the live image IMG11 is different from that of the first image IMG2. The root of the blade with a blade number "02" is visible in the live image IMG11. A user observes the live image IMG11 and determines whether the blade is normal. When an abnormality has been found in the blade, the user determines whether the abnormality is severe.

A button BT11 is displayed in the dialogue box DB12. The user can press the button BT11 by operating the operation unit 36 or the touch panel 38A. When the user has pressed the button BT11, the control unit 39 acquires the second image and stores the second image in the storage unit 37.

The control unit 39 displays a dialogue box used by the user to designate the state of a blade on the display unit 38. Two or more candidates for the state information are displayed in the dialogue box.

The user inputs an instruction to select any one of the two or more candidates to the endoscope device 1 by operating the operation unit 36 or the touch panel 38A. The control unit 39 adds the state information corresponding to the candidate indicated by the instruction to the second image.

State information SI11 is displayed on the live image IMG11. The state information SI11 is added to the second image. The state information SI11 indicates that a blade that is visible in the second image has no abnormalities. The state information SI11 is different from the state information SI2.

In the above-described example, a user determines the state of a blade. The control unit 39 may process the second image and may determine the state of a blade. In such a case, the control unit 39 need not display the second image on the display unit 38.

After Step S112, the control unit 39 determines whether second images of all the blades of which detailed observation is necessary have been acquired (Step S113).

When the control unit 39 has determined that second images of some of the blades of which detailed observation is necessary have not been acquired in Step S113, Step S110 is executed. When the control unit 39 has determined that the second images of all the blades of which detailed observation is necessary have been acquired in Step S113, the processing shown in FIG. 4 is completed.

Figure 9:
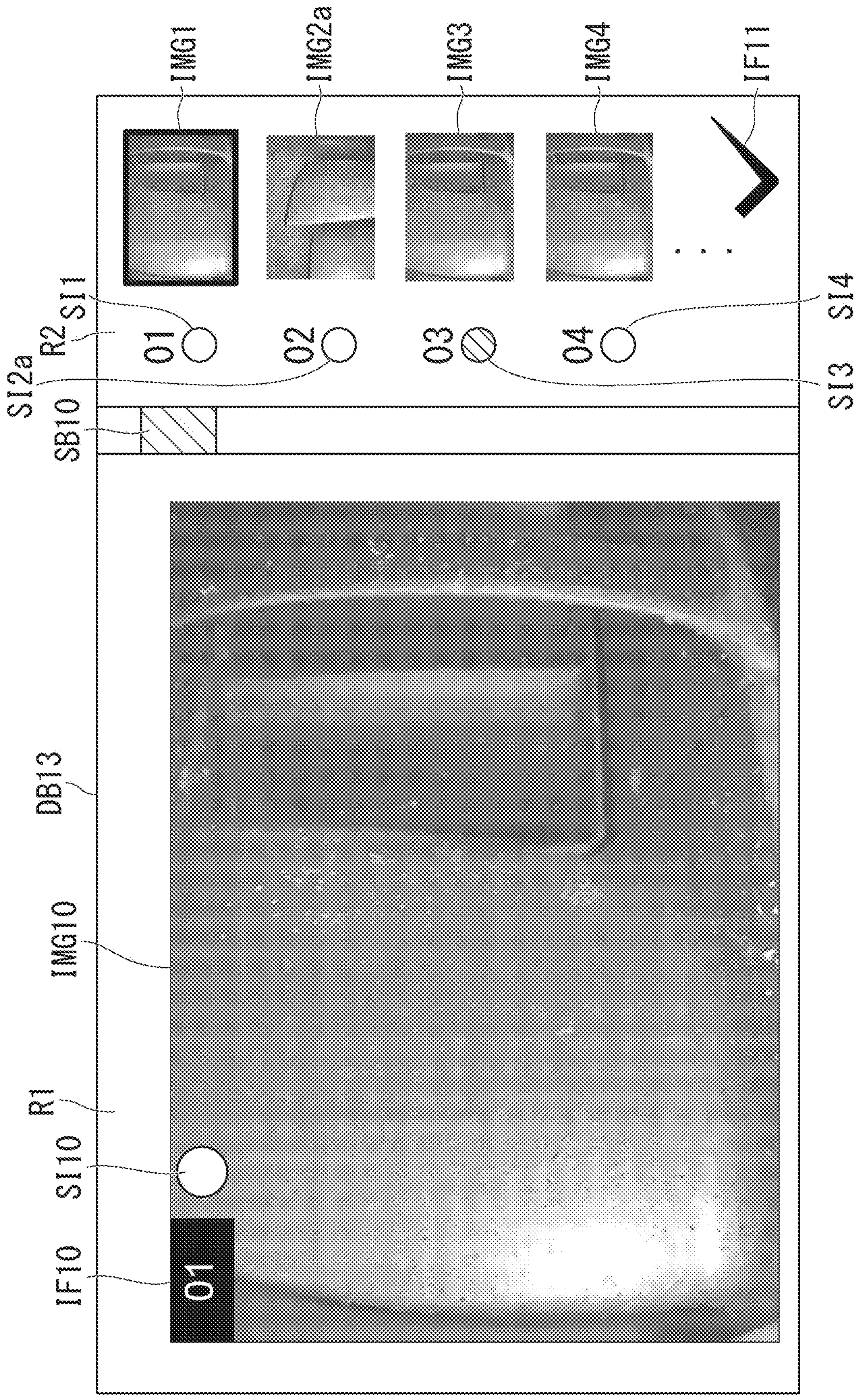
FIG. 9 is a diagram showing an example of information displayed on the display unit included in the endoscope device according to the first embodiment of the present invention.

FIG. 9 shows an example of information displayed on the display unit 38 after the second images of all the blades of which detailed observation is necessary are acquired. The control unit 39 displays a dialogue box DB13 shown in FIG. 9 on the display unit 38. Descriptions of the same parts as those shown in FIG. 6 will be omitted.

The first image IMG2 shown in FIG. 6 is changed to a second image IMG2*a*. The state information SI2 shown in FIG. 6 is changed to state information SI2*a*. The state information SI2*a* indicates that a blade that is visible in the second image IMG2*a* has no abnormalities.

Completion information IF11 is displayed in the second region R2. The completion information IF11 indicates that details of all the state information indicating necessity of detailed observation has been changed. A user may determine to complete inspection based on the completion information IF11.

The first image IMG2 shown in FIG. 6 is not displayed in the dialogue box DB13. A user may input an instruction to switch between the second image IMG2*a* and the first image IMG2 to the endoscope device 1 by operating the operation unit 36 or the touch panel 38A. When the instruction has been input, the control unit 39 may display the first image IMG2 in the dialogue box DB13. The control unit 39 may simultaneously display the second image IMG2*a* and the first image IMG2 in the dialogue box DB13.

After the disk DS10 has stopped in Step S110, the control unit 39 may execute control of slightly rotating the disk DS10 in Step S111. Due to this, the positional relationship between the distal end 20 and a blade changes, and the angle of the illumination emitted to the blade changes. Therefore, the state of a blade that is visible in the second image may change and a user may accurately determine the state of an abnormality.

It may be required to acquire a second image captured in the same composition as that of a reference image. For example, the reference image is an image acquired in inspection performed in the past or an image printed in an inspection guideline. A method of acquiring a second image captured in the same composition as that of the reference image will be described.

The storage unit 37 stores a reference image in advance. The reference image is an image of a blade disposed in a turbine of the same type as the turbine TB10.

After the disk DS10 has stopped in Step S110, a user inputs a bending instruction to the endoscope device 1 by operating the operation unit 36 or the touch panel 38A. The endoscope device 1 adjusts the position and the orientation of the distal end 20 in accordance with the bending instruction. The user may manually move the insertion unit 2 in the longitudinal direction (the axial direction) of the insertion unit 2 or may manually twist the insertion unit 2. The user may input an instruction to adjust various states of the endoscope device 1 to the endoscope device 1, and the endoscope device 1 may adjust the states in accordance with the instruction. The states are the imaging parameter of the imaging device 22, the state of the illumination light, the parameter of the image processing, and the state of the lens unit 21. The user performs the above-described operation and adjusts imaging conditions other than the amount of rotation of the disk DS10.

After the user has performed the above-described operation, the control unit 39 outputs rotation control information used for rotating the disk DS10 to the rotation control unit 35. Similar processing to that described above is executed, and the drive control unit 41 controls the rotation unit 40 in accordance with the rotation control signal. The rotation unit 40 rotates the disk DS10.

While the disk DS10 rotates, the control unit 39 acquires the reference image from the storage unit 37 and compares an image generated by the imaging device 22 with the reference image. When the position of a blade that is visible in the image generated by the imaging device 22 is almost the same as the position of a blade that is visible in the reference image, the control unit 39 outputs rotation control information used for stopping the rotation of the disk DS10 to the rotation control unit 35. For example, the control unit 39 calculates a first center of gravity of the blade that is visible in the image generated by the imaging device 22 and calculates a second center of gravity of the blade that is visible in the reference image. When the distance between the first center of gravity and the second center of gravity is less than a predetermined value, the control unit 39 outputs the rotation control information used for stopping the rotation of the disk DS10 to the rotation control unit 35.

Similar processing to that described above is executed, and the drive control unit 41 controls the rotation unit 40 in accordance with the rotation control signal. The rotation unit 40 stops the rotation of the disk DS10. The disk DS10 stops. After the rotation of the disk DS10 has stopped, the imaging device 22 can generate a second image of the target blade with the same composition as that of the reference image.

In Step S102 or S111, the position of the distal end 20 may be shifted due to an influence of an external force. Therefore, the control unit 39 may execute feedback control to hold the positional relationship between the distal end 20 and a blade.

The control unit 39 may execute the following processing in Step S110 in order to capture a blade of which detailed observation is necessary in the field of view of the insertion unit 2. As described above, the control unit 39 selects a target blade. The control unit 39 outputs rotation control information used for rotating the disk DS10 to the rotation control unit 35. Similar processing to that described above is executed, and the drive control unit 41 controls the rotation unit 40 in accordance with the rotation control signal. The rotation unit 40 rotates the disk DS10.

While the disk DS10 rotates, the control unit 39 compares an image generated by the imaging device 22 with a first image of the target blade. Specifically, the control unit 39 executes matching processing and determines whether a blade that is visible in the image generated by the imaging device 22 is similar to the target blade.

When the control unit 39 has determined that the blade is similar to the target blade, the control unit 39 outputs rotation control information used for stopping the rotation of the disk DS10 to the rotation control unit 35. Similar processing to that described above is executed, and the drive control unit 41 controls the rotation unit 40 in accordance with the rotation control signal. The rotation unit 40 stops the rotation of the disk DS10. The disk DS10 stops. The insertion unit 2 captures the target blade in the field of view and acquires an optical image of the target blade.

In the above-described example, the control unit 39 need not use the rotation information in order to generate the rotation control information. Therefore, the control unit 39 need not acquire the rotation information in Step S103.

The inspection assistance system 10 according to each aspect of the present invention assists with inspection of the turbine TB10 (a subject) including therein the disk DS10 (a rotor) in which the two or more blades BL are disposed. The inspection assistance system 10 includes the imaging device 22 (an image sensor), the control unit 39, and the rotation control unit 35. The imaging device 22 generates an image based on an optical image of a blade captured in the field of view of the insertion unit 2 inserted into the turbine TB10. The control unit 39 acquires two or more first images from the imaging device 22 in accordance with rotation of the disk DS10. The control unit 39 adds observation information indicating that observation is necessary to at least one first image of the two or more first images. After the observation information is added to the at least one first image, the rotation control unit 35 outputs a control signal to the turning tool 4 that rotates the disk DS10 based on the control signal such that the insertion unit 2 captures, in the field of view, a blade that is visible in the at least one first image. After the turning tool 4 has rotated the disk DS10, the control unit 39 acquires at least one second image from the imaging device 22.

An inspection assistance method according to each aspect of the present invention includes first to fourth steps. The control unit 39 acquires two or more first images from the imaging device 22 in accordance with rotation of the disk DS10 in the first step (Step S102). The control unit 39 adds the observation information to at least one first image of the two or more first images in the second step (Step S106). After the observation information is added to the at least one first image, the rotation control unit 35 outputs a control signal to the turning tool 4 such that the insertion unit 2 captures, in the field of view, a blade that is visible in the at least one first image in the third step (Step S110). After the turning tool 4 has rotated the disk DS10, the control unit 39 acquires at least one second image from the imaging device 22 in the fourth step (Step S111).

A program according to each aspect of the present invention causes a computer to execute the above-described first to fourth steps.

Each aspect of the present invention may include the following modified example. The rotation control unit 35 outputs the control signal to the turning tool 4 before acquiring each of the two or more first images.

Each aspect of the present invention may include the following modified example. When the turning tool 4 rotates the disk DS10 (a rotor), the control unit 39 acquires rotation information indicating the amount of rotation of the disk DS10 from the turning tool 4. The control unit 39 adds the rotation information to each of the two or more first images. The rotation control unit 35 outputs the control signal generated based on the rotation information added to the at least one first image to the turning tool 4.

Each aspect of the present invention may include the following modified example. The control unit 39 adds state information indicating the state of a blade that is visible in the at least one second image to the at least one second image.

Each aspect of the present invention may include the following modified example. The control unit 39 adds state information indicating the state of a blade that is visible in the two or more first images to the two or more first images.

Each aspect of the present invention may include the following modified example. The imaging device 22 (an image sensor) is disposed in the distal end 20 of the insertion unit 2. The control unit 39 sets a first imaging condition before the imaging device 22 generates the two or more first images. The control unit 39 sets a second imaging condition different from the first imaging condition before the imaging device 22 generates the at least one second image. The first imaging condition and the second imaging condition are one or more of the following: the position of the imaging device 22; the orientation of the imaging device 22; the relative position of imaging device 22 with respect to a blade captured in the field of view of the insertion unit 2; the relative orientation of the imaging device 22 with respect to the blade captured in the field of view of the insertion unit 2; the imaging parameter of the imaging device 22; the state of illumination light emitted inside the turbine TB10 (a subject); the parameter of image processing performed on an image generated by the imaging device 22; and the state of the lens unit 21 disposed in the insertion unit 2.

Each aspect of the present invention may include the following modified example. Before the imaging device 22 (an image sensor) generates the at least one second image, the control unit 39 controls one or more of the following: the bending portion 23 included in the insertion unit 2; the insertion device that moves the insertion unit 2 in the longitudinal direction of the insertion unit 2 inside the turbine TB10 (a subject) or twists the insertion unit 2 inside the turbine TB10; the turning tool 4; the imaging device 22; the light source unit 33 that generates the illumination light; the image-processing unit 30 (an image-processing circuit) that executes the image processing; and the lens unit 21 such that the second imaging condition is different from the first imaging condition.

Each aspect of the present invention may include the following modified example. The control unit 39 acquires a reference image recorded in advance in the storage unit 37 (a recording medium). At least one blade is visible in the reference image. The rotation control unit 35 outputs the control signal to the turning tool 4 in accordance with the composition of the blade that is visible in the reference image.

Each aspect of the present invention may include the following modified example. The control unit 39 acquires a reference image recorded in advance in the storage unit 37 (a recording medium). An abnormality is visible in the reference image. The control unit 39 adds the observation information to the at least one first image based on a result of comparison between a first image included in the at least one first image and the reference image.

Each aspect of the present invention may include the following modified example. The control unit 39 acquires feature information recorded in advance in the storage unit 37 (a recording medium). The feature information is generated based on a feature of an image in which at least one blade of the two or more blades BL is visible. The control unit 39 adds the observation information to the at least one first image based on the feature information.

Each aspect of the present invention may include the following modified example. The control unit 39 adds the observation information to at least two first images of the two or more first images. The control unit 39 acquires at least two second images including the at least one second image described above from the imaging device 22 (the image sensor).

Each aspect of the present invention may include the following modified example. The two or more first images include at least two first images in which the same blade is visible.

Each aspect of the present invention may include the following modified example. The turning tool 4 stops the disk DS10 (the rotor) after having rotated the disk DS10. The control unit 39 acquires the at least one second image from the imaging device 22 (the image sensor) when the disk DS10 stops.

Each aspect of the present invention may include the following modified example. The control unit 39 displays the at least one first image and the observation information on the display unit 38 (a display).

Each aspect of the present invention may include the following modified example. The inspection assistance system 10 includes an imaging apparatus. The imaging apparatus includes the imaging device 22 (an image sensor), the control unit 39, and the rotation control unit 35.

In the first embodiment, the endoscope device 1 acquires two or more first images to perform screening and adds observation information to at least one first image of the two or more first images. The endoscope device 1 acquires a second image of a blade that is visible in the first image to which the observation information is added to perform detailed observation. Due to this, the endoscope device 1 can enhance inspection efficiency.

The endoscope device 1 can restrict the unevenness of inspection quality that occurs in accordance with the proficiency of a user. In addition, the endoscope device 1 can shorten an inspection time.

Second Embodiment

A second embodiment of the present invention will be described. In the second embodiment, the endoscope device 1 has a function of displaying a structure diagram of a specific stage of a turbine TB10 and has a function of associating a blade number and an image with the structure diagram. The endoscope device 1 assists with a user's operation of ascertaining the state of a blade by implementing these functions.

A user inputs the number of blades in a specific stage to the endoscope device 1 by operating the operation unit 36 or the touch panel 38A. For example, the user inputs the number of blades (Y) in an X-th stage of a high-pressure compressor section and the number of blades (Z) in an X-th stage of a high-pressure turbine section to the endoscope device 1.

The control unit 39 generates a structure diagram in accordance with the input number. The accurate size or shape of each blade is not necessarily reproduced in the structure diagram. The control unit 39 may generate a structure diagram based on computer-aided design (CAD) data that is design data of an engine. The control unit 39 may generate 3D data as a structure diagram by executing 3D reconstruction that uses an image or a video acquired in inspection performed in the past. The prior art called structure from motion may be applied to the 3D reconstruction. The control unit 39 stores the structure diagram in the storage unit 37.

In addition, in the second embodiment, the endoscope device 1 has a function of measuring the size of a specific region of a blade. In the second embodiment, the endoscope device 1 uses a monocular optical adaptor and a measurement optical adaptor. The monocular optical adaptor is used for normal observation of a subject. The measurement optical adaptor is used for measuring the size of a region of the subject. A stereo optical adaptor having two fields of view is used as the measurement optical adaptor.

Figure 10:
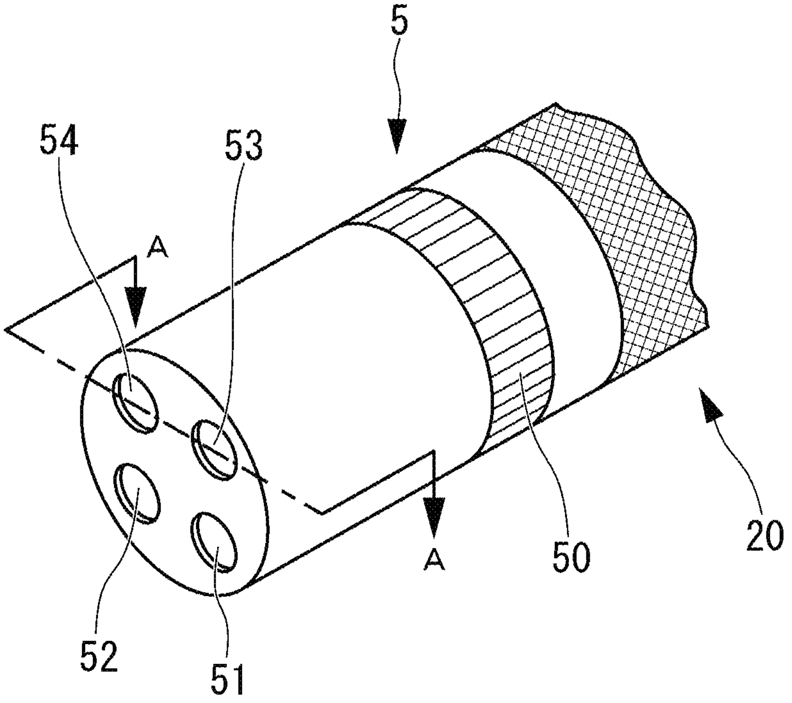
FIG. 10 is a perspective view of a distal end and a stereo optical adaptor of an insertion unit in an endoscope device according to a second embodiment of the present invention.
Figure 11:
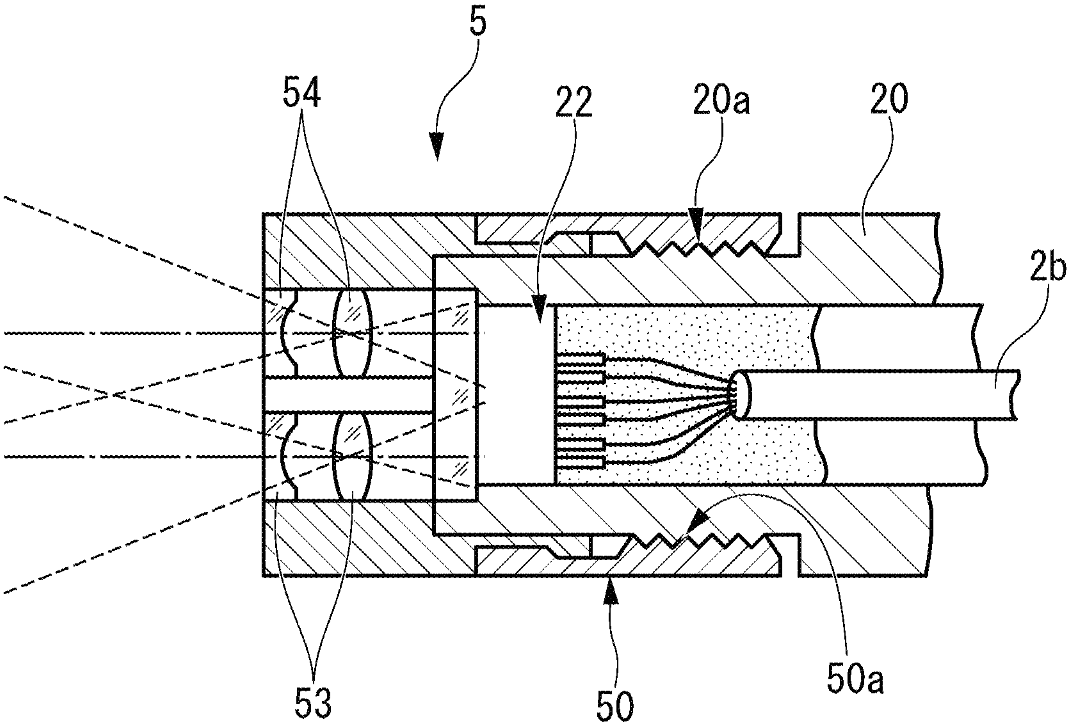
FIG. 11 is a sectional view of the distal end and the stereo optical adaptor of the insertion unit in the endoscope device according to the second embodiment of the present invention.

The endoscope device 1 uses a stereo optical adaptor 5 shown in FIGS. 10 and 11. FIGS. 10 and 11 show the configuration of the distal end 20 of the insertion unit 2 and the stereo optical adaptor 5. FIG. 10 shows an external appearance of the distal end 20 and the stereo optical adaptor 5. FIG. 11 shows a cross-section of the distal end 20 and the stereo optical adaptor 5. A first illumination optical system 51, a second illumination optical system 52, a first objective optical system 53, and a second objective optical system 54 are disposed in the distal end of the stereo optical adaptor 5. In FIG. 11, a cross-section passing through the first objective optical system 53 and the second objective optical system 54 is shown.

The stereo optical adaptor 5 is mounted on the distal end 20 of the insertion unit 2. The stereo optical adaptor 5 includes a fixing ring 50 on which a female thread 50*a* is formed. A male thread 20*a* is formed in the distal end 20 of the insertion unit 2. The stereo optical adaptor 5 is screwed to the male thread 20*a* by using the female thread 50*a* and is fixed on the distal end 20.

The imaging device 22 is disposed in the distal end 20. The first objective optical system 53 and the second objective optical system 54 form two optical images on the imaging device 22. The imaging device 22 converts the two optical images to an image. A signal line 2*b* is connected to the imaging device 22. The image generated by the imaging device 22 is output to the main body unit 3 via the signal line 2*b*.

The first objective optical system 53 forms a first optical image of a subject seen from a first viewpoint. The second objective optical system 54 forms a second optical image of the subject seen from a second viewpoint different from the first viewpoint. The imaging device 22 includes an effective region on which the first optical image and the second optical image are formed. For example, the first optical image is formed on the left region of the effective region, and the second optical image is formed on the right region of the effective region.

The imaging device 22 forms a stereo image corresponding to the first optical image and the second optical image. The stereo image includes a pair of two images. In other words, the stereo image includes an image of the subject seen from the first viewpoint and an image of the subject seen from the second viewpoint.

Figure 12:
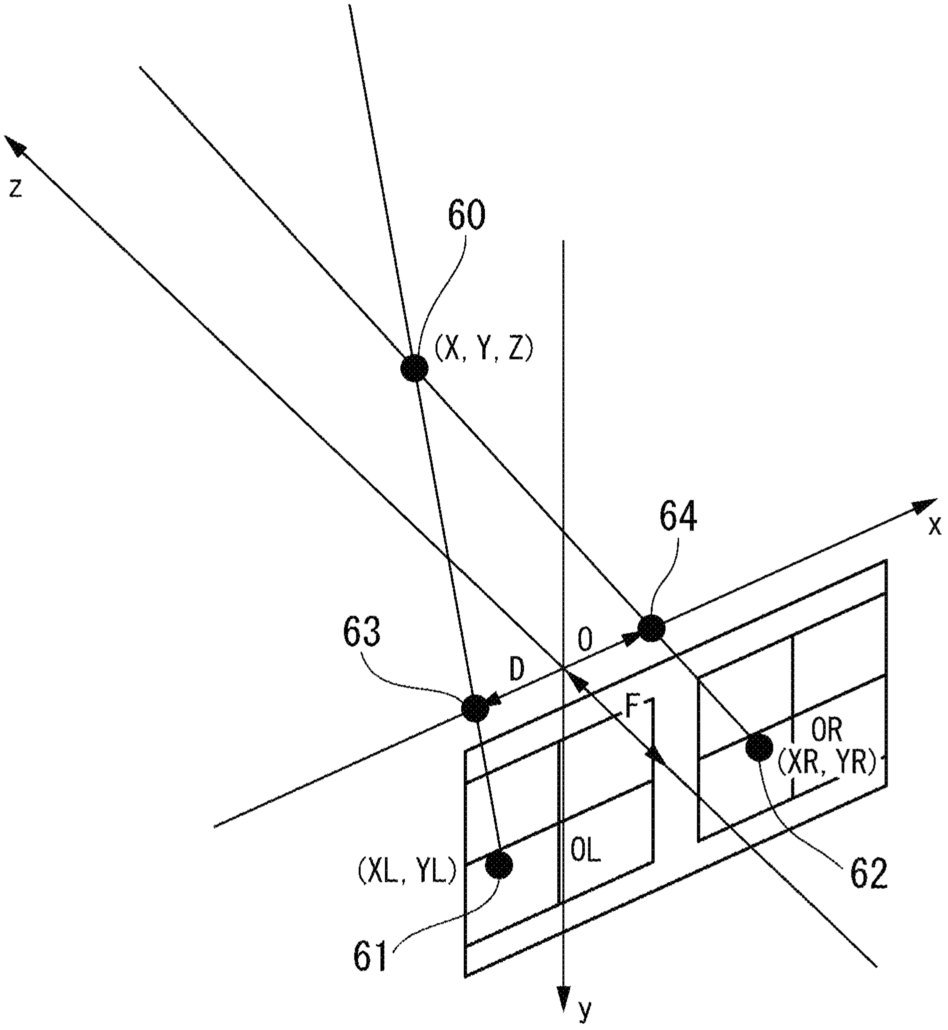
FIG. 12 is a diagram showing a method of calculating three-dimensional coordinates of a point of interest in the second embodiment of the present invention.

A method of calculating three-dimensional coordinates (3D coordinates) of a point of interest in stereo measurement will be described with reference to FIG. 12. The center of a line segment connecting a left optical center (a first optical center 63) and a right optical center (a second optical center 64) is defined as an origin O. In addition, an x-axis, a y-axis, and a z-axis shown in FIG. 12 are defined.

An image including a subject image is used. The subject image is acquired via a left optical system and a right optical system. As the following Expressions (1) to (3) show, the 3D coordinates (X, Y, Z) of a point of interest 60 are calculated by using a principle of triangulation. The two-dimensional coordinates (2D coordinates) of a point of interest 61 and the 2D coordinates of a point of interest 62 are (XL, YL) and (XR, YR), respectively. The point of interest 61 is located on a left image plane on which distortion correction has been performed. The point of interest 62 is located on a right image plane on which the distortion correction has been performed.

The origin of the point of interest 61 is an intersection point OL, and the origin of the point of interest 62 is an intersection point OR. The intersection point OL is located at a position at which the optical axis of the left optical system and the image plane intersect each other. The intersection point OR is located at a position at which an optical axis of the right optical system intersects the image plane. A distance between the first optical center 63 and the second optical center 64 is D. A parameter F indicates a focal length. A parameter t indicates D/(XR-XL).

$$X = t \times XR + D/2 \tag{1}$$

$$Y = -t \times YR \tag{2}$$

$$Z = t \times F \tag{3}$$

In a case in which the coordinates of each of the point of interest 61 and the point of interest 62 are determined as described above, the control unit 39 can calculate the 3D coordinates of the point of interest 60 by using the parameter D and the parameter F. The parameter D and the parameter F are calculated at the time of factory shipment of the stereo optical adaptor 5. Alternatively, the parameter D and the parameter F are calculated in a process such as setting-up of the endoscope device 1 before inspection is performed.

The control unit 39 can realize various measurement functions by calculating 3D coordinates of two or more points. For example, the control unit 39 can measure a distance between two points, the distance between a line and a point, the area of a region, the depth of a reference plane, and the like. The line connects two points. The region is surrounded by lines connecting a plurality of points.

A user can select an intended measurement function among various measurement functions. The control unit 39 can also calculate the distance (an object distance) from the first optical center 63 or the second optical center 64 to a subject. In order to execute the above-described stereo measurement, optical data is necessary. The optical data indicates characteristics of an optical system including the distal end 20 of the insertion unit 2 and the stereo optical adaptor 5.

In the second embodiment, the endoscope device 1 generates a first image by using a monocular optical adaptor having more excellent observation performance than that of the stereo optical adaptor 5 in order to perform the screening. Thereafter, the endoscope device 1 generates a second image by using the stereo optical adaptor 5 in order to perform detailed observation.

Figure 13:
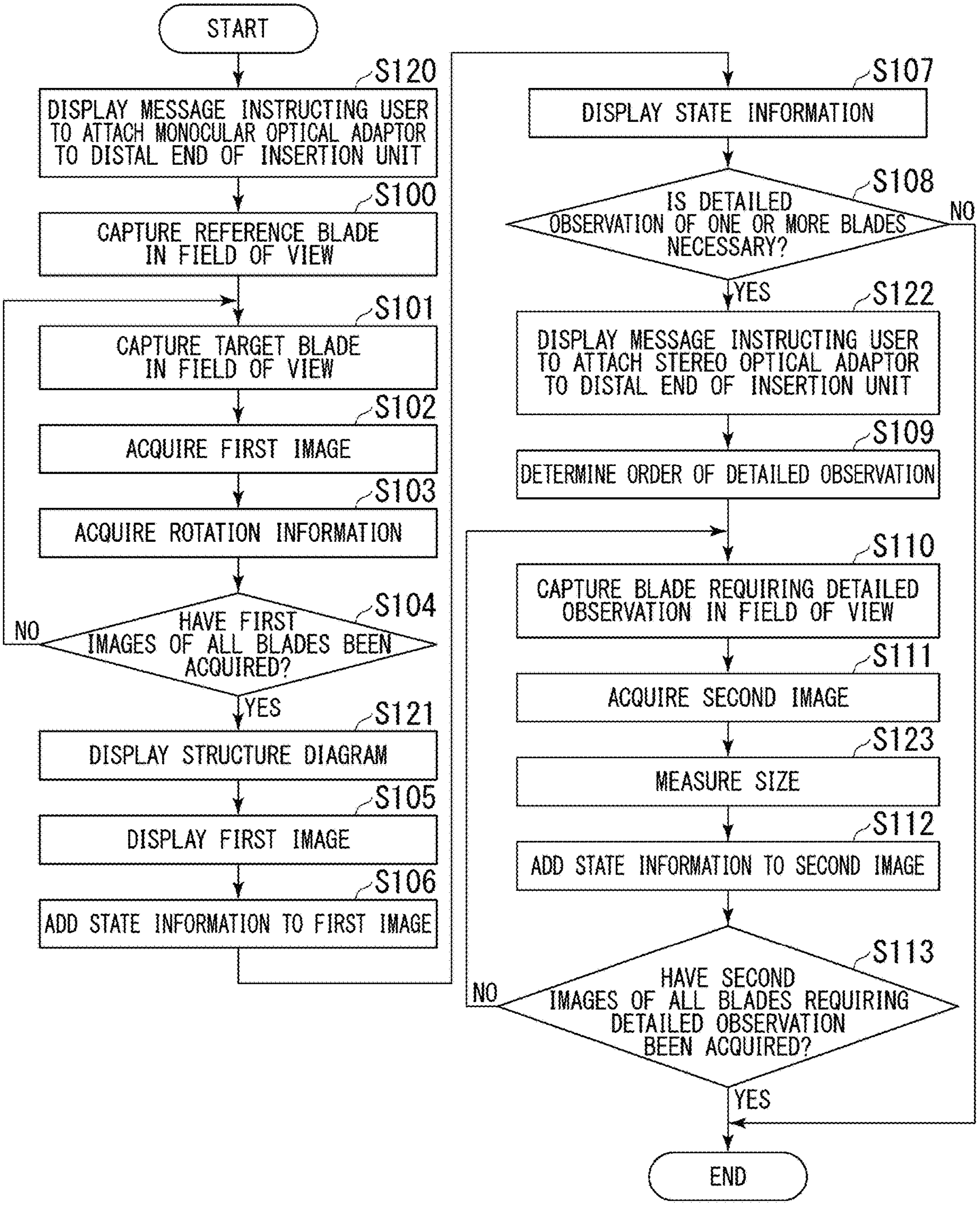
FIG. 13 is a flowchart showing a procedure of processing executed by the endoscope device according to the second embodiment of the present invention.

Processing executed by the endoscope device 1 will be described by using FIG. 13. FIG. 13 shows a procedure of processing executed by the endoscope device 1. Descriptions of the same processing as that shown in FIG. 4 will be omitted.

After the endoscope device 1 has started the processing shown in FIG. 13, the control unit 39 generates a message to instruct a user to mount a monocular optical adaptor on the distal end 20. The control unit 39 displays the message on the display unit 38 (Step S120).

The user mounts the monocular optical adaptor to the distal end 20 in accordance with the message displayed on the display unit 38. The user inserts the insertion unit 2 on which the monocular optical adaptor is mounted into the turbine TB10.

After the distal end 20 has reached a position at which an optical image of a blade can be acquired, the user inputs information indicating that observation is to be started to the endoscope device 1 by operating the operation unit 36 or the touch panel 38A. The control unit 39 executes Step S100 in accordance with the information. The control unit 39 may monitor the state of the distal end 20 and may detect that the monocular optical adaptor is mounted on the distal end 20.

When the control unit 39 has determined that the first images of all the blades have been acquired in Step S104, the control unit 39 acquires a structure diagram of a specific stage from the storage unit 37. For example, the user inputs information of the stage to the endoscope device 1 by operating the operation unit 36 or the touch panel 38A. The control unit 39 acquires the structure diagram of the stage indicated by the information from the storage unit 37. The control unit 39 displays the structure diagram on the display unit 38 (Step S121). After Step S121, Step S105 is executed.

Figure 14:
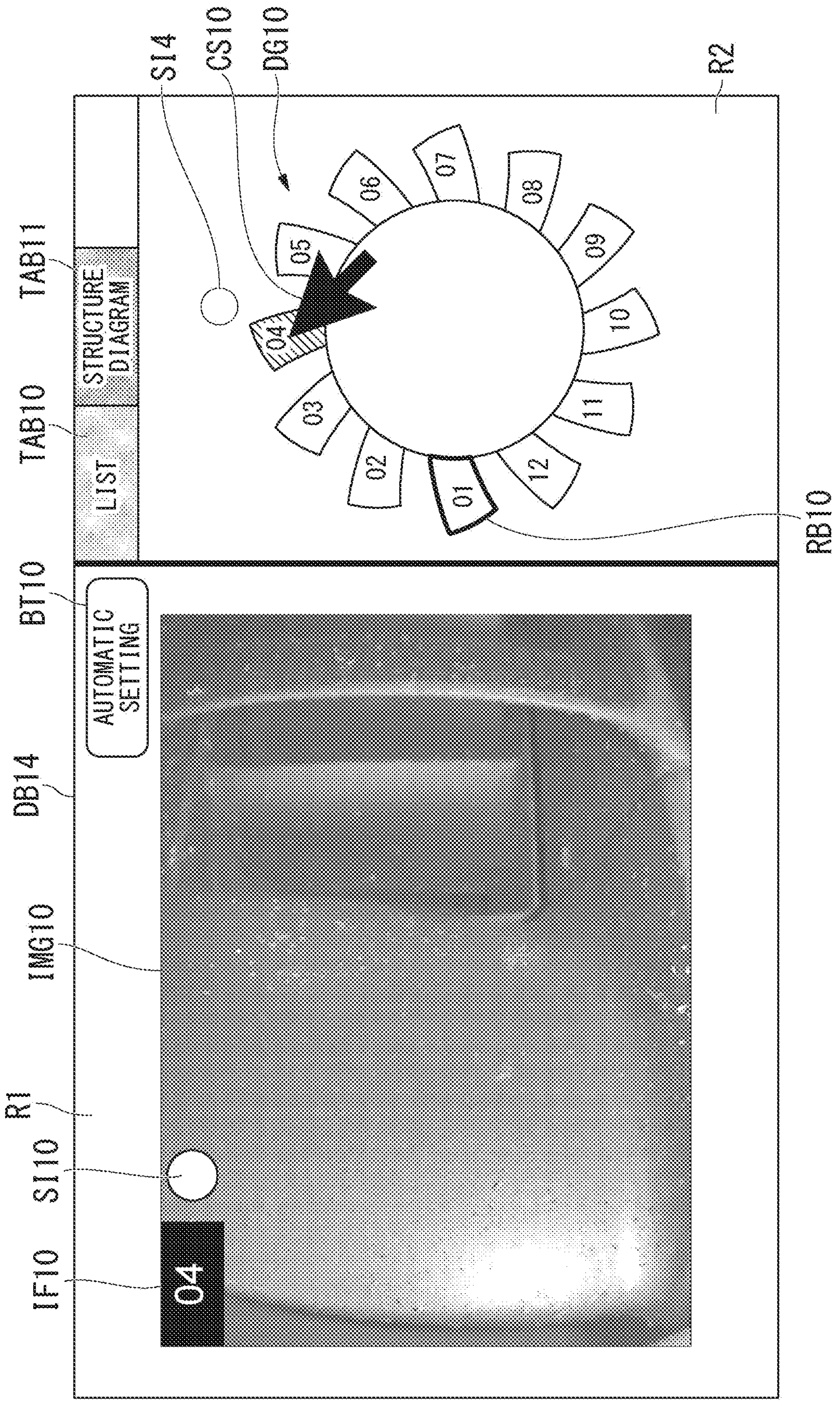
FIG. 14 is a diagram showing an example of information displayed on a display unit included in the endoscope device according to the second embodiment of the present invention.

FIG. 14 shows an example of information displayed on the display unit 38 in Step S121 and Steps S105 to S107. The control unit 39 displays a dialogue box DB14 shown in FIG.

14 on the display unit 38. Descriptions of the same parts as those shown in FIG. 6 will be omitted.

A tab TAB10 and a tab TAB11 are displayed in the dialogue box DB14. A user can set the tab TAB10 or the tab TAB11 to be enabled by operating the operation unit 36 or the touch panel 38A.

When the tab TAB10 is enabled, thumbnail images of two or more first images are displayed in the second region R2 similarly to the dialogue box DB11 shown in FIG. 6. Alternatively, a list of the two or more first images is displayed in the second region R2.

When the tab TAB11 is enabled, a structure diagram DG10 is displayed in the second region R2. Twelve blades and the blade numbers of the blades are shown in the structure diagram DG10. A reference blade RB10 has a blade number "01." The reference blade RB10 is highlighted.

A user inputs an instruction to select a specific blade to the endoscope device 1 by operating the operation unit 36 or the touch panel 38A. The control unit 39 selects the blade number of the blade indicated by the instruction.

FIG. 14 shows an example in which a user selects a blade with a blade number "04." A cursor CS10 is displayed in the dialogue box DB14. The user selects the blade by using the cursor CS10. The control unit 39 selects the blade number "04."

The control unit 39 acquires a first image of the blade with the blade number "04" from the storage unit 37. As described above, each first image and each blade number are associated with each other in the inspection management information stored in the storage unit 37. The control unit 39 acquires a first image associated with the blade number "04." In Step S105, the control unit 39 displays the acquired first image as the first image IMG10 in the first region R1. Additional information IF10 indicating the blade number "04" is displayed on the first image IMG10.

The user determines the state of the blade that is visible in the first image IMG10. The user inputs a result of the determination to the endoscope device 1 by operating the operation unit 36 or the touch panel 38A. The control unit 39 generates state information in accordance with the result of the determination. The control unit 39 adds the state information to the first image IMG10.

The state information added to the first image IMG10 is displayed as state information SI10 on the first image IMG10. The state information SI10 indicates that a blade that is visible in the first image IMG10 has no abnormalities. State information SI4 corresponding to the state information SI10 is displayed in the vicinity of the blade with the blade number "04" in the structure diagram DG10.

The user can add state information to all the first images of the twelve blades by repeating the above-described operations.

The state information in the second region R2 may be displayed as characters indicating the state of a blade. The state information may be displayed as a figure with a shape in accordance with the state of the blade. The blade or the blade number may be displayed in a color in accordance with the state of the blade. Any method may be used to display the state information as long as the user can recognize the state of the blade.

When the updated state information is added to the second image in Step S112, the state information may be displayed in the second region R2 of the dialogue box DB14.

When the control unit 39 has determined that the detailed observation is necessary in Step S108, the control unit 39 generates a message to instruct a user to mount the stereo optical adaptor 5 to the distal end 20. The control unit 39 displays the message on the display unit 38 (Step S122). After Step S122, Step S109 is executed.

The user returns the insertion unit 2 inserted into the turbine TB10 to the outside of the turbine TB10. The user replaces the monocular optical adaptor with the stereo optical adaptor 5 in accordance with the message displayed on the display unit 38. The user inserts the insertion unit 2 on which the stereo optical adaptor 5 is mounted into the turbine TB10.

After the distal end 20 has reached a position at which an optical image of a blade can be acquired, the user inputs information indicating that observation is to be started to the endoscope device 1 by operating the operation unit 36 or the touch panel 38A. The control unit 39 executes Step S109 in accordance with the information. The control unit 39 may monitor the state of the distal end 20 and may detect that the stereo optical adaptor 5 is mounted on the distal end 20.

The second image acquired in Step S111 is a stereo image. After Step S111, the control unit 39 measures the size of a region of the blade that is visible in the second image by using the second image (Step S123). After Step S123, Step S112 is performed.

Details of Step S123 will be described. For example, the user inputs an instruction to select two or more measurement positions in the region to the endoscope device 1 by operating the operation unit 36 or the touch panel 38A. Alternatively, the control unit 39 processes the second image and detects two or more measurement positions in the region.

The control unit 39 calculates 3D coordinates of each of the two or more measurement positions in accordance with the method described above and measures the size by using the calculated 3D coordinates. The control unit 39 may measure the distance between two measurement positions. The control unit 39 may measure the area of a region defined by three or more measurement positions. The control unit 39 may measure the distance between one measurement position and a straight line defined by two measurement positions. The control unit 39 may measure the distance between one measurement position and a plane defined by three measurement positions.

Figure 15:
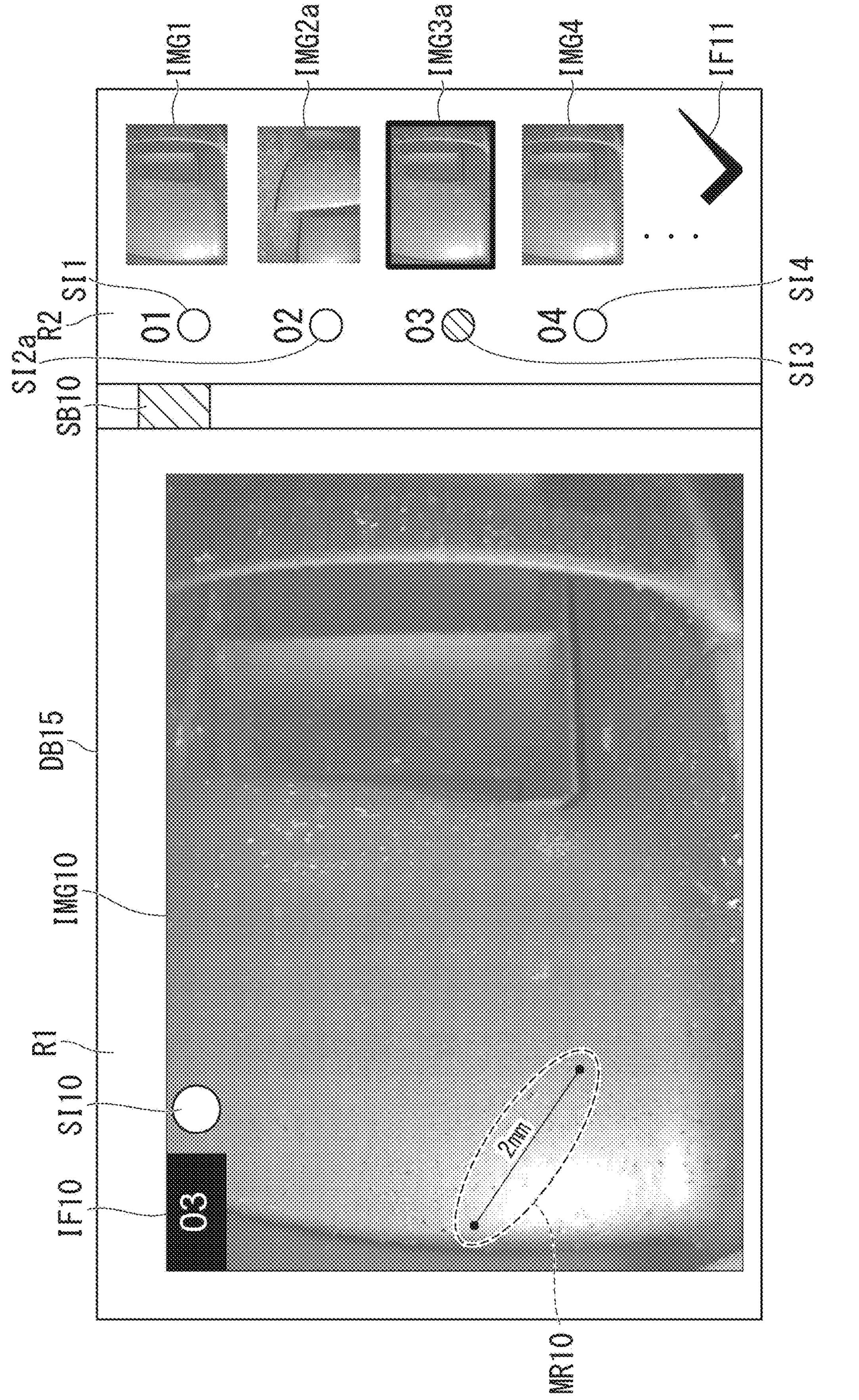
FIG. 15 is a diagram showing an example of information displayed on the display unit included in the endoscope device according to the second embodiment of the present invention.

FIG. 15 shows an example of information displayed on the display unit 38 after the second images of all the blades of which detailed observation is necessary have been acquired. The control unit 39 displays a dialogue box DB15 shown in FIG. 15 on the display unit 38. Descriptions of the same parts as those shown in FIG. 9 will be omitted. A measurement result MR10 is displayed on the first image IMG10. The measurement result MR10 includes information of two measurement positions and information of the distance between the two measurement positions.

The first image IMG3 shown in FIG. 6 is changed to a second image IMG3*a*. The first image IMG10 in the first region R1 corresponds to the second image IMG3*a* in the second region R2. The frame of the second image IMG3*a* is highlighted in order to notify a user that the first image IMG10 corresponds to the second image IMG3*a*.

The control unit 39 may reconstruct a three-dimensional shape (a 3D shape) of a blade by using two or more first images. The control unit 39 may reconstruct the 3D image of the blade by using one or more second images. The 3D shape instead of the first image IMG10 may be displayed in the first region R1. The first image IMG10 and the 3D shape may be switched in the first region R1 in accordance with an instruction from a user.

In the second embodiment, the endoscope device 1 displays a structure diagram and displays state information on the structure diagram. A user can easily understand the position of each blade and the state information of the blade.

In the second embodiment, the endoscope device 1 quantifies the size of an abnormality by measuring the size of a specific region of a blade. A user can easily determine the severity of the abnormality based on the measurement result. The user can accurately determine the state of a blade in a short period of time in detailed observation.

Modified Example of Second Embodiment

Figure 16:
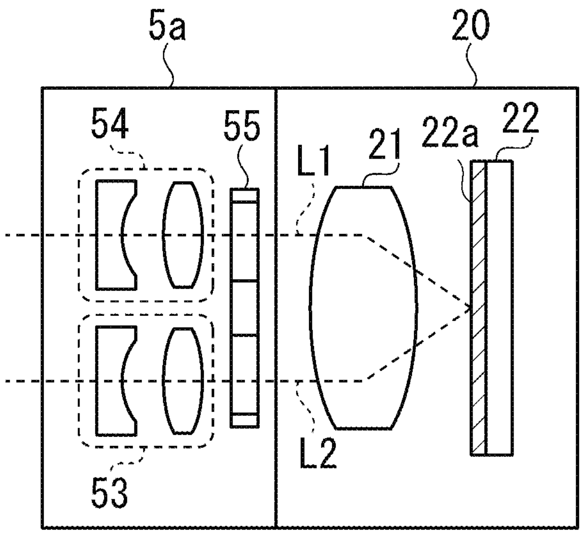
FIG. 16 is a sectional view of a distal end and a stereo optical adaptor of an insertion unit in the endoscope device according to a modified example of the second embodiment of the present invention.

A modified example of the second embodiment of the present invention will be described. In the modified example of the second embodiment, a stereo optical adaptor 5*a* shown in FIG. 16 is used. In the modified example of the second embodiment, there is no need to use a monocular optical adaptor.

In the above-described second embodiment, the first objective optical system 53 and the second objective optical system 54 simultaneously form two optical images on the effective region of the imaging device 22. On the other hand, in the modified example of the second embodiment, one of the first objective optical system 53 and the second objective optical system 54 forms an optical image in the whole effective region, and then the other of the first objective optical system 53 and the second objective optical system 54 forms an optical image in the entire effective region. In the modified example of the second embodiment, the endoscope device 1 acquires a left image and a right image in a time division manner.

FIG. 16 shows the configuration of the distal end 20 of the insertion unit 2 and the stereo optical adaptor 5*a*. The lens unit 21 and the imaging device 22 are disposed in the distal end 20. The imaging device 22 includes an effective region 22*a*. The stereo optical adaptor 5*a* includes a first objective optical system 53, a second objective optical system 54, and an optical path setting unit 55.

For example, the first objective optical system 53 and the second objective optical system 54 are a combination of a concave lens and a convex lens. The second objective optical system 54 is disposed to have parallax with respect to the first objective optical system 53. In other words, the first objective optical system 53 and the second objective optical system 54 are separate from each other in a parallax direction. The parallax direction is a direction of a straight line passing through the optical center of the first objective optical system 53 and the optical center of the second objective optical system 54. Light incident on the first objective optical system 53 passes through a first optical path L1. Light incident on the second objective optical system 54 passes through a second optical path L2 different from the first optical path L1. The first objective optical system 53 forms a first optical image of a subject, and the second objective optical system 54 forms a second optical image of the subject.

The optical path setting unit 55 switches an optical path between the first optical path L1 and the second optical path L2 such that either the first optical image or the second optical image is formed in the effective region 22*a* of the imaging device 22. By doing this, the optical path setting unit 55 sets either the first optical path L1 or the second optical path L2 as an imaging optical path. The optical path setting unit 55 is configured to transmit only light passing through one of the first optical path L1 and the second optical path L2 and is configured to block light passing through the other of the first optical path L1 and the second optical path L2.

For example, the optical path setting unit 55 includes a shutter to be inserted into either the first optical path L1 or the second optical path L2. When the optical path setting unit 55 transmits light of the first optical path L1, the shutter is inserted into the second optical path L2 and light of the second optical path L2 is blocked. When the optical path setting unit 55 transmits light of the second optical path L2, the shutter is inserted into the first optical path L1 and light of the first optical path L1 is blocked. The control unit 39 controls the operation of the optical path setting unit 55. The lens unit 21 forms a subject image on the effective region 22*a* of the imaging device 22 based on either light passing through the first optical path L1 or light passing through the second optical path L2.

The imaging device 22 includes the effective region 22*a* on which the first optical image of the light passing through the first optical path L1 and the second optical image of the light passing through the second optical path L2 are formed. The imaging device 22 converts the first optical image to a left image at a first timing and converts the second optical image to a right image at a second timing different from the first timing. The left image and the right image constitute a stereo image.

The endoscope device 1 executes similar processing to that shown in FIG. 13. Hereinafter, processing different from that shown in FIG. 13 will be described.

The control unit 39 generates a message to instruct a user to mount the stereo optical adaptor 5*a* to the distal end 20 in Step S120. The control unit 39 displays the message on the display unit 38.

After the stereo optical adaptor 5*a* is mounted on the distal end 20, the user need not replace the stereo optical adaptor 5*a* with another optical adaptor. Therefore, the control unit 39 need not execute Step S122.

The first image acquired in Step S102 is a stereo image. After Step S102, the control unit 39 may measure the size of a region of a blade that is visible in the first image by using the first image. The control unit 39 may execute size measurement of all the blades. Alternatively, the control unit 39 may select only a blade including a region in which that may be an abnormality and may execute the size measurement of the region.

The second imaging condition for generating a second image is expected to be more appropriate for measurement than the first imaging condition for generating a first image. The control unit 39 may measure the size of a region of a blade that is visible in the second image in Step S123 after executing the size measurement that uses the first image.

Third Embodiment

A third embodiment of the present invention will be described. In the third embodiment, inspection of a large blade is performed. Only part of the blade enters the field of view of the insertion unit 2. In this inspection, the position of the distal end 20 is changed, and imaging of blades is performed twice or more. The turning tool 4 rotates the disk DS10 twice or more.

Figure 17A:
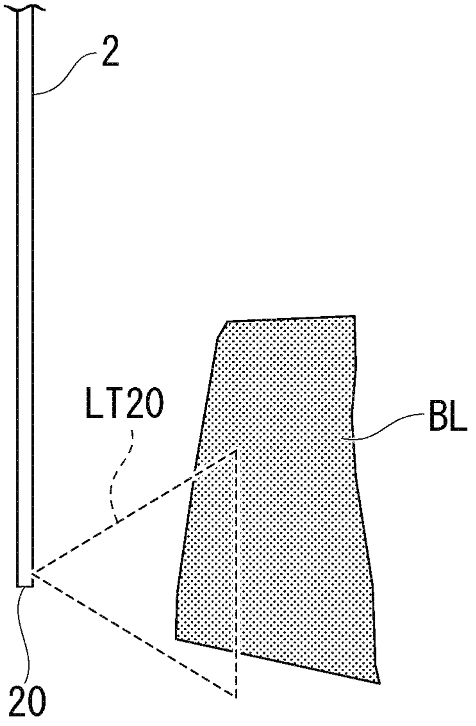
FIG. 17A is a diagram showing an observation position of a blade in a third embodiment of the present invention.
Figure 17B:
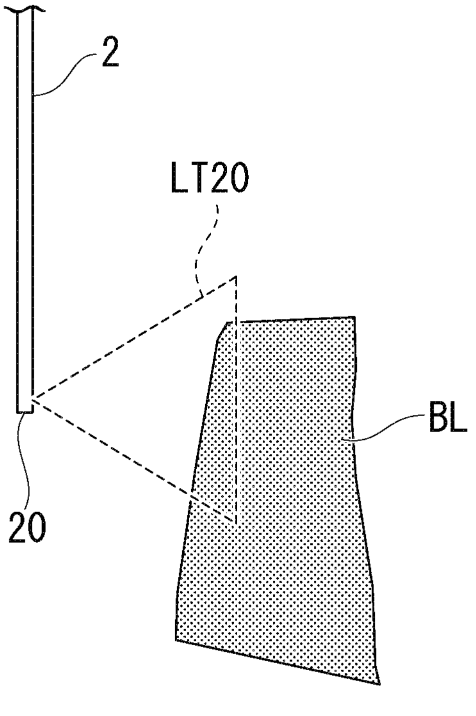
FIG. 17B is a diagram showing an observation position of a blade in the third embodiment of the present invention.

FIGS. 17A and 17B show an observation position of a blade BL. First, the distal end 20 is fixed to a position shown in FIG. 17A. At this time, illumination light LT20 is emitted to a region near the root of the blade BL. In this state, the disk DS10 rotates by one turn. At this time, the disk DS10 rotates by about 360 degrees.

After the disk DS10 has rotated by one turn, the turning tool 4 stops the rotation of the disk DS10. The position of the distal end 20 is changed, and the distal end 20 is fixed to a position shown in FIG. 17B. At this time, the illumination light LT20 is emitted to a region near the tip of the blade BL. In this state, the disk DS10 rotates by one turn.

Figure 18:
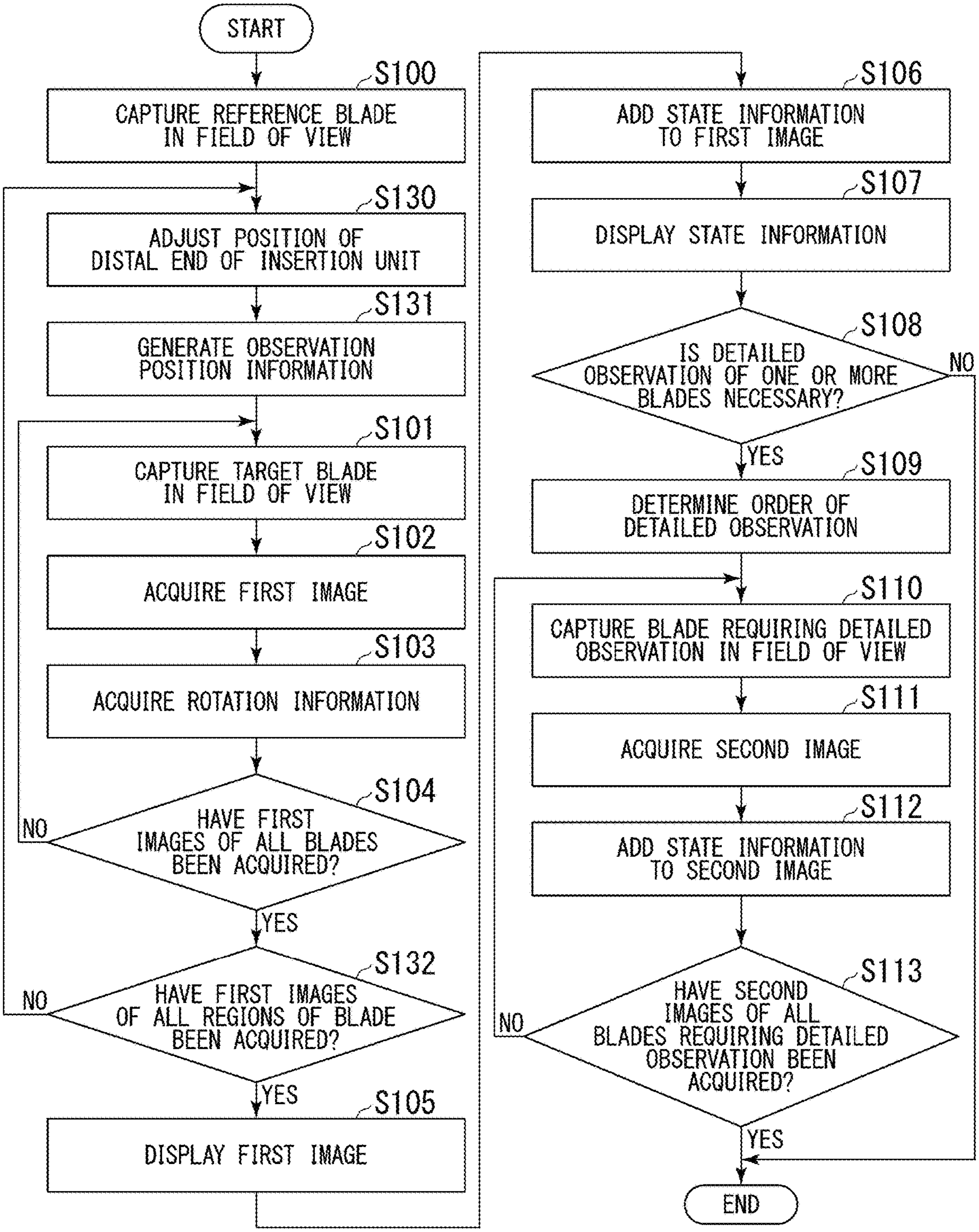
FIG. 18 is a flowchart showing a procedure of processing executed by an endoscope device according to the third embodiment of the present invention.

Processing executed by the endoscope device 1 will be described by using FIG. 18. FIG. 18 shows a procedure of the processing executed by the endoscope device 1. Descriptions of the same processing as that shown in FIG. 4 will be omitted.

Hereinafter, an example in which the insertion device is disposed at the access port AP10 will be described. After Step S100, the control unit 39 controls the insertion device and moves the distal end 20 to the position shown in FIG. 17A (Step S130). At this time, the insertion unit 2 acquires an optical image of a region near the root of the reference blade.

After Step S130, the control unit 39 generates observation position information indicating a relative position of the distal end 20 with respect to a blade. The control unit 39 adds the observation position information to the inspection management information (Step S131). The observation position information indicates that the distal end 20 is located at the position shown in FIG. 17A or 17B. After Step S131, Step S101 is executed.

For example, a user observes a live image displayed on the display unit 38 and determines the position of the distal end 20. The user inputs the observation position information to the endoscope device 1 by operating the operation unit 36 or the touch panel 38A. The control unit 39 may determine the position of the distal end 20 by analyzing a live image and may generate observation position information indicating the position.

An acceleration sensor or a gyro sensor may be disposed in the distal end 20. The control unit 39 may calculate the position of the distal end 20 based on information acquired by the acceleration sensor or the gyro sensor and may generate observation position information indicating the position.

The inspection assistance system 10 may include a sensor that calculates an insertion length indicating the length of a portion of the insertion unit 2 inserted into the turbine TB10. The control unit 39 may calculate the position of the distal end 20 based on the insertion length and may generate the observation position information indicating the position. Any method may be used to calculate the position of the distal end 20.

The control unit 39 determines whether first images of all the blades have been acquired in Step S104. Before the disk DS10 rotates by one turn, the control unit 39 acquires a first image of a region near the root in Step S102. Steps S101 to S104 are repeated until the control unit 39 has determined that the first images of all the blades have been acquired in Step S104.

When the control unit 39 has determined that the first images of all the blades have been acquired in Step S104, the control unit 39 determines whether first images of all the regions of the blades have been acquired (Step S132).

When the disk DS10 has rotated by one turn, acquisition of first images of regions near the root is completed. At this time, the control unit 39 has not acquired first images of regions near the tip of a blade yet. Therefore, the control unit 39 determines that first images of some regions of blades have not been acquired.

When the control unit 39 has determined that first images of some regions of blades have not been acquired in Step S132, the control unit 39 controls the insertion device in Step S130 and moves the distal end 20 to the position shown in FIG. 17B. At this time, the insertion unit 2 acquires an optical image of a region near the tip of a blade. The control unit 39 acquires a first image of the region in Step S102.

When the disk DS10 has rotated again by one turn, acquisition of first images of regions near the tip is completed. Therefore, the control unit 39 determines that first images of all the regions of the blades have been acquired in Step S132. In such a case, Step S105 is executed.

The control unit 39 may execute the following processing in Step S132. The control unit 39 analyzes a live image acquired by the imaging device 22 and calculates the amount of movement of a region in a direction (a radial direction) that is perpendicular to the circumference of the disk DS10. When the amount of movement is greater than a predetermined amount, the control unit 39 adds the currently calculated amount of movement to the previous calculated amount of movement. By doing this, the control unit 39 calculates the sum of the amounts of movement.

When the sum is less than or equal to the predetermined amount, the control unit 39 determines that first images of some regions of the blades have not been acquired. When the sum is greater than the predetermined amount, the control unit 39 determines that first images of all the regions of the blades have been acquired.

An encoder may be disposed at the access port AP10. The encoder calculates the amount of movement of the insertion unit 2 in the longitudinal direction (the axial direction) of the insertion unit 2. The control unit 39 may use the amount of movement instead of the above-described amount of movement.

In the above-described example, is the disk DS10 has rotated by two turns, first images of all the two or more blades BL are acquired. In a case in which blades are extremely large, the turning tool 4 may rotate the disk DS10 by three or more turns in order to acquire first images of all the blades.

A first range and a second range may overlap each other in order to avoid failure of acquisition of first images of some regions of the blades. The first range is a range of a blade that enters the field of view of the insertion unit 2 in the first rotation. The second range is a range of a blade that enters the field of view of the insertion unit 2 in the second rotation. Therefore, the turning tool 4 may rotate the disk DS10 by three or more turns in order to acquire first images of all the blades.

Figure 19:
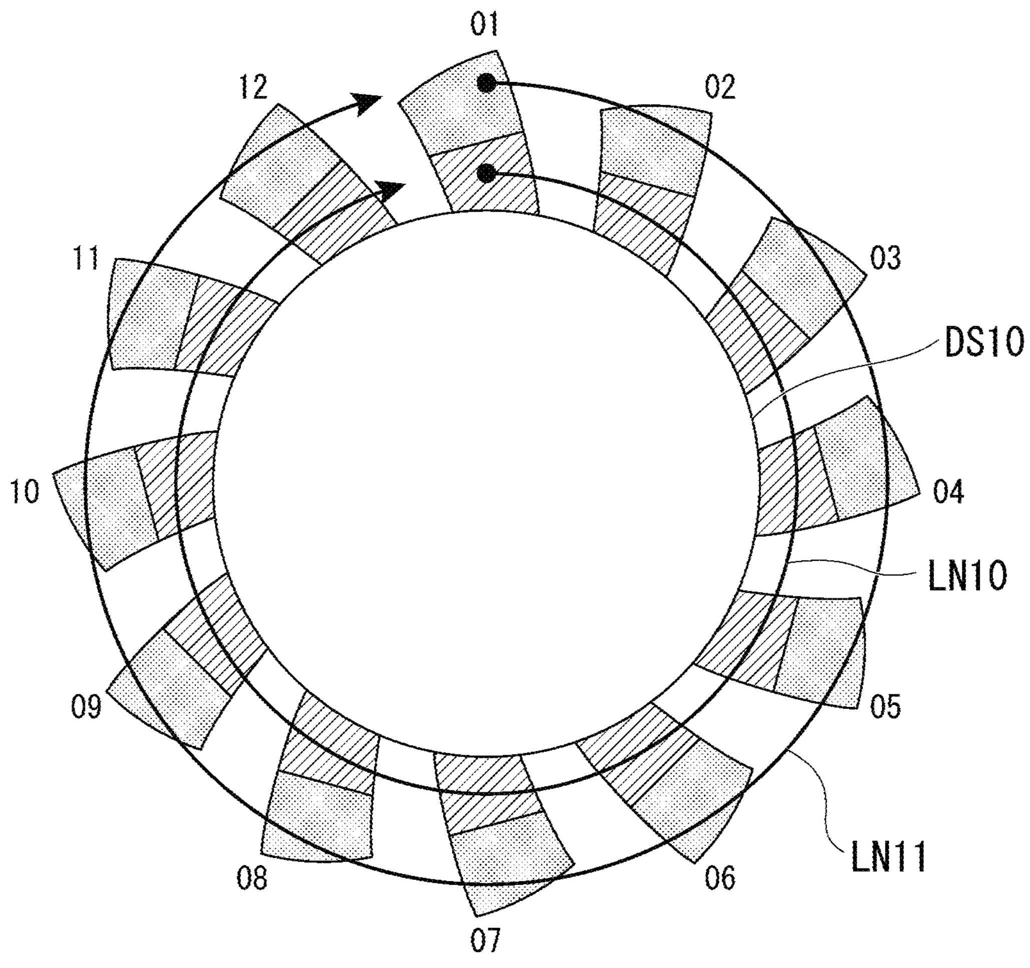
FIG. 19 is a diagram showing a change in position of a field of view of an insertion unit included in the endoscope device according to the third embodiment of the present invention.

A flow of inspection will be described by using FIG. 19. FIG. 19 shows a change of the position of the field of view of the insertion unit 2. Twelve blades are disposed on the disk DS10. A blade with a blade number “01” is a reference blade.

A line LN10 indicates a change of the position of the field of view of the insertion unit 2 in the first rotation. The insertion unit 2 acquires an optical image of a region near the root of each blade. A line LN11 indicates a change of the position of the field of view of the insertion unit 2 in the second rotation. The insertion unit 2 acquires an optical image of a region near the tip of each blade.

When the second rotation is completed, acquisition of first images of all the regions of all the blades is completed. The control unit 39 displays two or more first images stored in the storage unit 37 on the display unit 38 in Step S105.

Figure 20:
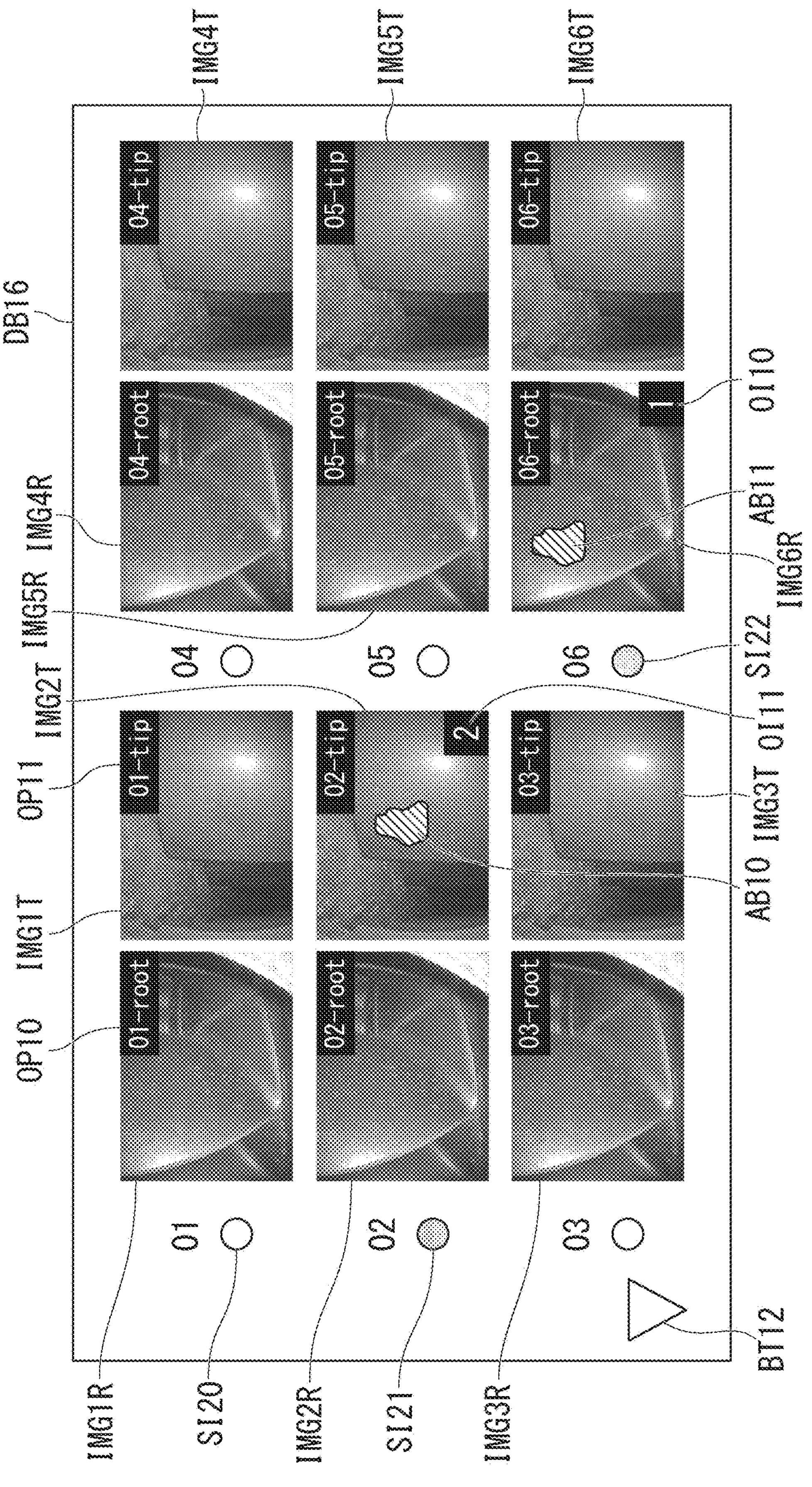
FIG. 20 is a diagram showing an example of information displayed on a display unit included in the endoscope device according to the third embodiment of the present invention.

FIG. 20 shows an example of information displayed on the display unit 38 in Steps S105 to S107. The control unit 39 displays a dialogue box DB16 shown in FIG. 20 on the display unit 38.

First images IMG1R to IMG6R and first images IMG1T to IMG6T are displayed in the dialogue box DB16. Each of these first images is a thumbnail image of the first image acquired in Step S102. A region near the root of each blade is visible in each of the first images IMG1R to IMG6R. A region near the tip of each blade is visible in each of the first images IMG1T to IMG6T. First images of a blade (a reference blade) with a blade number "01" to a blade with a blade number "06" are displayed in the dialogue box DB16.

Observation position information is displayed on each first image. For example, observation position information OP10 is displayed on the first image IMG1R, and observation position information OP11 is displayed on the first image IMG1T. The observation position information OP10 indicates that the insertion unit 2 captures a region near the root of each blade in the field of view. The observation position information OP11 indicates that the insertion unit 2 captures a region near the tip of each blade in the field of view.

Blade numbers and state information are displayed in the dialogue box DB16. For example, a blade that is visible in the first image IMG1R and the first image IMG1T has the blade number "01." State information SI20 is added to the first image IMG1R and the first image IMG1T.

A button BT12 is displayed in the dialogue box DB16. A user can press the button BT12 by operating the operation unit 36 or the touch panel 38A. When the user has pressed the button BT12, first images of a blade with a blade number "07" to a blade with a blade number "12" are displayed in the dialogue box DB16.

A blade that is visible in the first image IMG2T has an abnormal region AB10. The blade has the blade number "02." In addition, a blade that is visible in the first image IMG6R has an abnormal region AB11. The blade has the blade number "06."

A user determines that detailed observation of the blade with a blade number "02" and the blade with a blade number "06" is necessary. State information SI21 is added to the first image IMG2T, and state information SI22 is added to the first image IMG6R. The state information SI21 and the state information SI22 indicate that detailed observation of blades that are visible in the first image IMG2T and the first image IMG6R is necessary Order information OI10 is displayed on the first image IMG6R, and order information OI11 is displayed on the first image IMG2T. The order information OI10 and the order information OI11 indicate the order of detailed observation.

The control unit 39 selects a target blade and executes processing required for capturing the target blade in the field of view of the insertion unit 2 in Step S110. Similar processing to that described above is executed, and the rotation unit 40 rotates the disk DS10. Thereafter, the rotation unit 40 stops the rotation of the disk DS10. The insertion unit 2 captures the target blade in the field of view and acquires an optical image of the target blade. The insertion unit 2 acquires an optical image of the abnormal region AB10 or the abnormal region AB11.

The control unit 39 can control a rotational position of the disk DS10 by executing Step S110. In order for the insertion unit 2 to capture a predetermined region near the tip or the root of the target blade in the field of view, a user or the control unit 39 needs to adjust the position of the insertion unit 2 in the radial direction of the disk DS10.

A user may manually move the insertion unit 2 in the longitudinal direction (the axis direction) of the insertion unit 2. The user may input a bending instruction to the endoscope device 1 by operating the operation unit 36 or the touch panel 38A. The endoscope device 1 may adjust the position and the orientation of the distal end 20 in accordance with the bending instruction.

The control unit 39 may determine the position of a predetermined region in the target blade based on the observation position information added to a first image. The control unit 39 may control the insertion device so that the insertion unit 2 can capture the predetermined region in the field of view. Alternatively, the control unit 39 may adjust the position and the orientation of the distal end 20 so that the insertion unit 2 can capture the predetermined region in the field of view.

The control unit 39 may execute navigation processing to encourage a user to perform an operation of changing the position and the orientation of the distal end 20.

In the third embodiment, even when inspection of a large blade is performed, the endoscope device 1 can enhance inspection efficiency.

Fourth Embodiment

A fourth embodiment of the present invention will be described. Similarly to the second embodiment, the endoscope device 1 according to the fourth embodiment has a function of displaying a structure diagram of a specific stage of the turbine TB10 and has a function of associating a blade number and an image with the structure diagram. In the fourth embodiment, the stereo optical adaptor 5*a* shown in FIG. 16 is used.

In inspection of a turbine using an endoscope, it may be determined whether inspection of a detected abnormality passes or fails. An inspection result (PASS or FAIL) of a specific stage may be determined in accordance with the number of abnormalities that satisfy a specific condition. For example, when the number of abnormalities having a length less than X mm or having the area less than Y $mm^2$ is less than Z, the inspection result of the specific stage is determined to be PASS. In addition, a gap (a clearance) between a blade and a shroud may be measured. The shroud is a container in which blades are accommodated. In this case, a measurement function is used.

Figure 21:
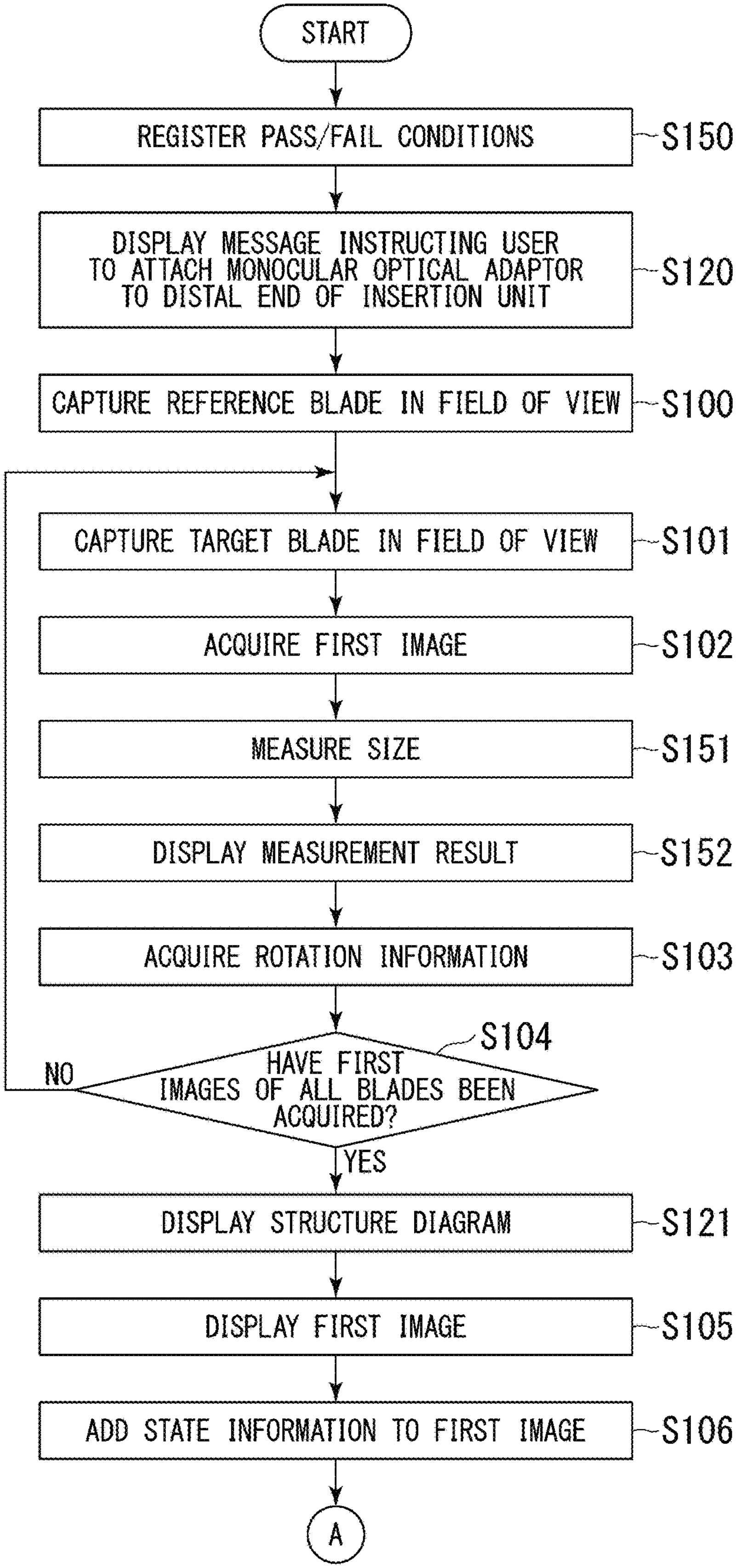
FIG. 21 is a flowchart showing a procedure of processing executed by an endoscope device according to a fourth embodiment of the present invention.
Figure 22:
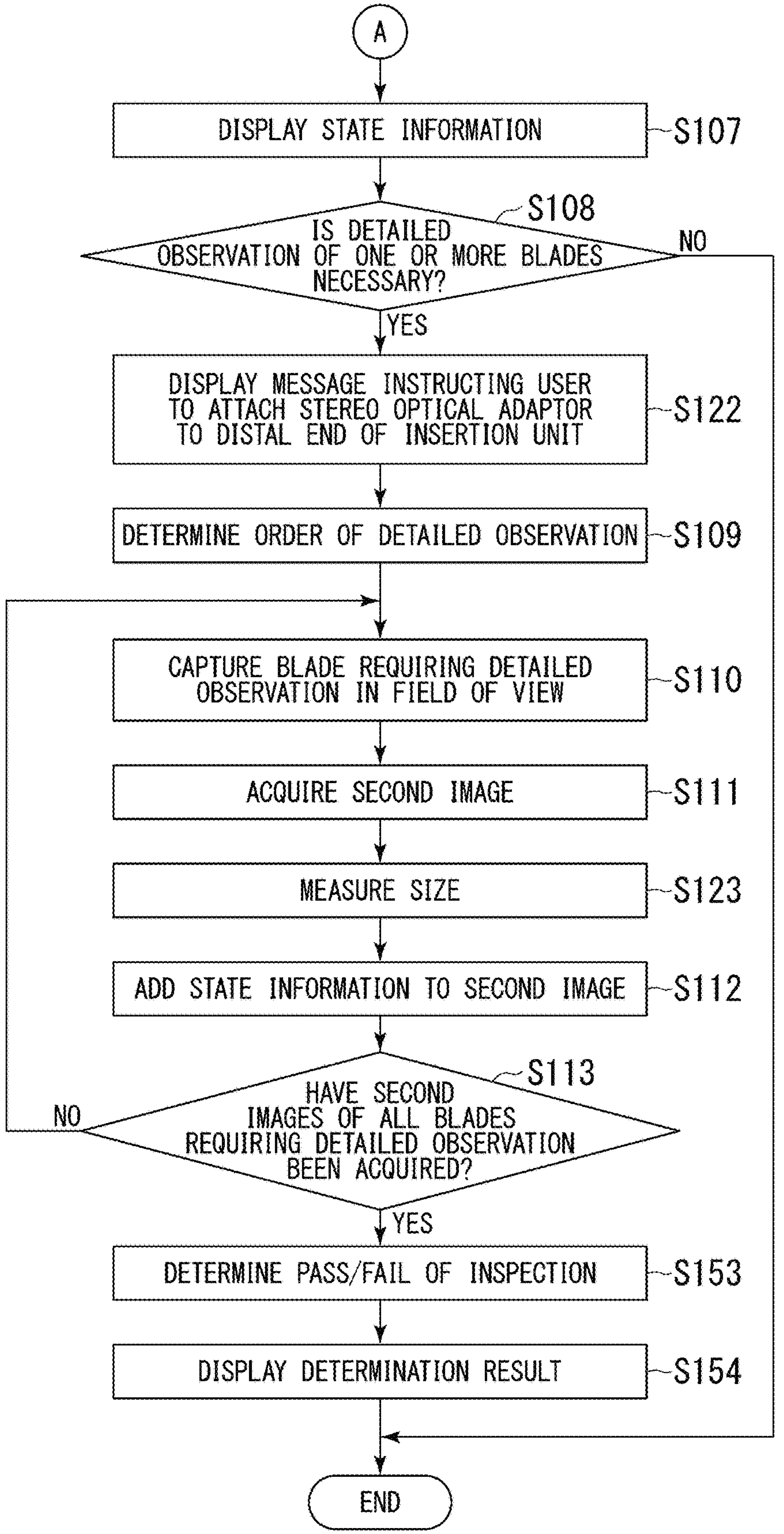
FIG. 22 is a flowchart showing a procedure of processing executed by the endoscope device according to the fourth embodiment of the present invention.

Processing executed by the endoscope device 1 will be described by using FIGS. 21 and 22. FIGS. 21 and 22 show a procedure of the processing executed by the endoscope device 1. Descriptions of the same processing as that shown in FIG. 13 will be omitted.

Immediately after inspection of a specific stage is started, a user ascertains pass/fail conditions set in the stage for which the inspection is performed with reference to an inspection manual of a turbine. The user inputs pass/fail conditions to the endoscope device 1 by operating the operation unit 36 or the touch panel 38A. The control unit 39 stores the pass/fail conditions in the storage unit 37 (Step S150). By doing this, the pass/fail conditions are registered. After Step S150, Step S120 is executed. Step S150 may be executed at any timing before Step S153 described later is executed.

After Step S102, the control unit 39 measures the size of a region of a blade that is visible in a first image by using the first image acquired in Step S102 (Step S151).

Details of Step S151 will be described. For example, the user inputs an instruction to select two or more measurement positions in the region to the endoscope device 1 by operating the operation unit 36 or the touch panel 38A. Alternatively, the control unit 39 processes the first image and detects two or more measurement positions in the region. The control unit 39 calculates 3D coordinates of the two or more measurement positions by using the above-described method and measures the size by using the calculated 3D coordinates. The control unit 39 adds a measurement result that is the measured size to the inspection management information. The measurement result, the blade number, and the first image are associated with each other in the inspection management information.

After Step S151, the control unit 39 displays the measurement result on the display unit 38 (Step S152). After Step S152, Step S103 is executed. Steps S151 and S152 are executed for all the blades disposed in a specific stage.

The control unit 39 displays state information on the display unit 38 in Step S107. As described above, the state information indicates that a blade that is visible in a specific first image has no abnormalities. Alternatively, as described above, the state information indicates that detailed observation of the blade that is visible in the specific first image is necessary. Alternatively, as described above, the state information indicates that the severity of the blade that is visible in the specific first image is high.

The state information may indicate a result of comprehensive determination in accordance with the reliability of measurement, closeness between the measurement result and the pass/fail conditions, and the like. For example, an image may be dark or an image may be very bright. Alternatively, a subject or the distal end 20 may move while acquiring an image. Alternatively, a subject may have few patterns or a subject may have no pattern. The reliability of measurement changes due to these various factors. The control unit 39 may generate one or more indices associated with the reliability of measurement in consideration of these various factors. The state information may include the one or more indices.

The control unit 39 may determine whether detailed observation is to be performed by using these indices. For example, when an image is dark, the reliability of measurement is likely to decrease. It is highly possible that correct measurement results are obtained by executing measurement using a bright image again. Therefore, the control unit 39 may determine that detailed observation is necessary.

The state information may include measurement results as observation information. The measurement results are included in the inspection management information. The control unit 39 may determine in Step S108 whether inspection passes or fails by comparing a measurement result of each blade with the pass/fail conditions registered in the storage unit 37. Due to an influence of a measurement error, there is a possibility that it is erroneously determined whether the measurement result is greater than a determination criterion (a threshold value) defined by the pass/fail conditions registered in the storage unit 37. Therefore, when a measurement result of a specific blade is close to the determination criterion, the control unit 39 may determine that detailed observation of the blade is necessary. When the measurement result of the specific blade is greater than the determination criterion, the control unit 39 may determine that the inspection result is FAIL and may complete the inspection. When the inspection result is FAIL, the control unit 39 may display the inspection result on the display unit 38.

As described above, the control unit 39 measures the size of a region of a blade that is visible in a second image by using the second image in Step S123. The control unit 39 adds the measurement result that is the measured size to the inspection management information. In the inspection management information, a result of measurement executed by using the first image, a result of measurement executed by using the second image, a blade number, and the first image are associated with each other. The inspection management information may include an image number of the second image in addition to an image number of the first image.

When the control unit 39 has determined that the second images of all the blades of which detailed observation is necessary have been acquired in Step S113, the control unit 39 compares the measurement result acquired in Step S123 with the pass/fail conditions registered in the storage unit 37 and determines whether the inspection passes or fails (Step S153). Step S153 is the same as the processing of determining whether inspection passes or fails based on the measurement result and the pass/fail conditions in Step S108.

After Step S153, the control unit 39 displays the result of determination in Step S153 on the display unit 38 (Step S154). When Step S154 is executed, the processing shown in FIGS. 21 and 22 is completed.

Figure 23:
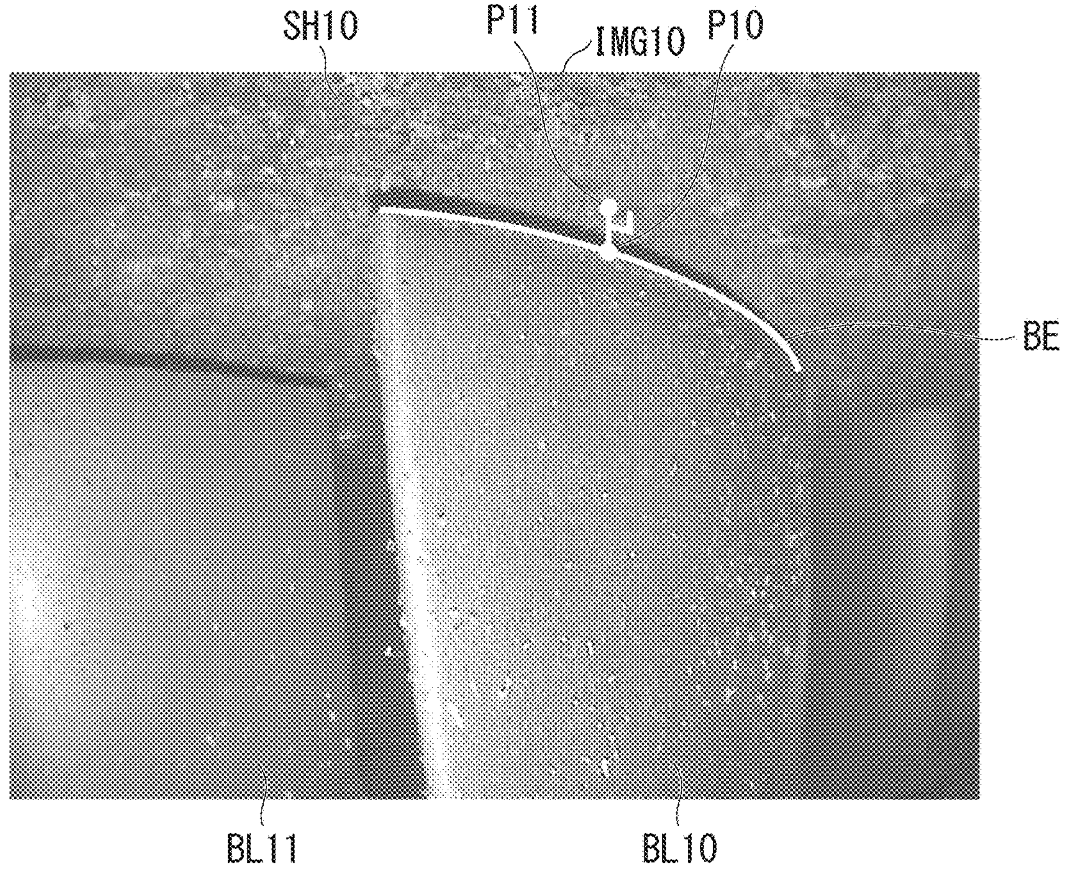
FIG. 23 is a diagram showing an image of a blade in the fourth embodiment of the present invention.

Measurement of a clearance between the tip of a blade and a shroud will be schematically described by using FIG. 23. A blade BL10, a blade BL11, and a shroud SH10 are visible in an image IMG10 shown in FIG. 23. A curve BE indicates the tip of the blade BL10. A first measurement point P10 is located on the curve BE. A second measurement point P11 is an intersection at which a straight line that is perpendicular to the surface of the shroud SH10 and passes through the first measurement point P10 intersects the shroud SH10.

In measurement of a clearance, the distance between the first measurement point P10 and the second measurement point P11 is measured. This measurement may be executed at two or more measurement points on the curve BE in some or all of the blades disposed in a specific stage. A statistic value (the minimum value, the maximum value, or the average value) of the distance between the first measurement point P10 and the second measurement point P11 may be calculated.

Figure 24:
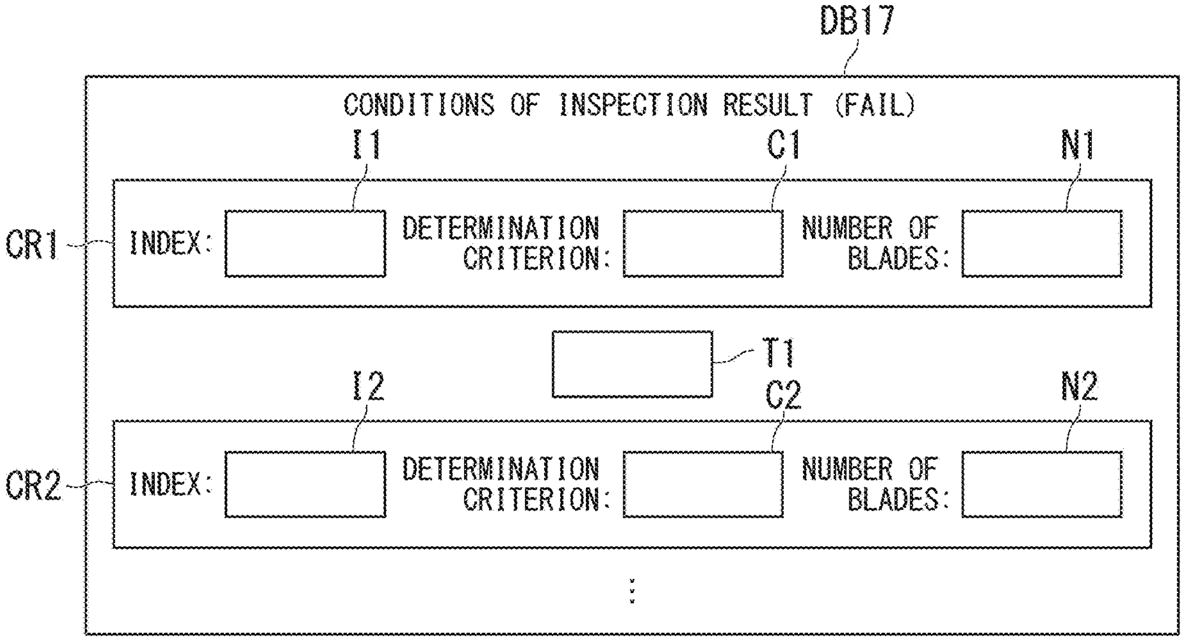
FIG. 24 is a diagram showing an example of information displayed on a display unit included in the endoscope device according to the fourth embodiment of the present invention.

An example of inspection will be described by using FIGS. 24 to 26. The control unit 39 displays a dialogue box DB17 shown in FIG. 24 on the display unit 38 in Step S150.

A condition-setting area CR1, a condition-setting area CR2, and an input box T1 are displayed in the dialogue box DB17. The condition-setting area CR1 includes an input box I1, an input box C1, and an input box N1. The condition-setting area CR2 includes an input box I2, an input box C2, and an input box N2. A user inputs information to the input boxes to set pass/fail conditions by operating the operation unit 36 or the touch panel 38A.

Evaluation indices such as the length or area are input to the input box I1 and the input box I2. Determination criteria (threshold values) such as X mm and Y $mm^2$ are input to the input box C1 and the input box C2. The number of blades of which an inspection result is to be determined to be PASS or FAIL is input to the input box N1 and the input box N2. For example, when blades more than or equal to the number input to the input box N1 include an abnormality greater than or equal to X mm, the inspection result is determined to be FAIL.

Information indicating a logical sum or a logical product is input to the input box T1. The control unit 39 acquires final pass/fail conditions by calculating a logical sum or a logical product of the pass/fail conditions set in the condition-setting area CR1 and the pass/fail conditions set in the condition-setting area CR2. Other conditions not shown in FIG. 24 may be set.

Since a turbine includes two or more stages, the control unit 39 may set the pass/fail conditions for each stage by using the dialogue box DB17. The control unit 39 may set the pass/fail conditions for each stage by using information in the form of a table.

The control unit 39 displays the dialogue box DB14 shown in FIG. 14 on the display unit 38 in Step S121. The measurement result MR10 shown in FIG. 25 is displayed in the tab TAB10 of the dialogue box DB14. The structure diagram DG10 shown in FIG. 14 may be changed to the measurement result MR10 shown in FIG. 25. Alternatively, the measurement result MR10 shown in FIG. 25 may be displayed in the tab TAB10 in addition to the structure diagram DG10 shown in FIG. 14.

The measurement result MR10 includes measurement results of clearances of seven blades. The measurement result MR10 includes a minimum value MRmin, a maximum value MRmax, and an average value MRave. The control unit 39 measures the clearance between the tip of a blade and the shroud one or more times in Step S151. Step S151 is executed for each blade. The minimum value MRmin indicates a minimum value of the clearances measured in the blades. The maximum value MRmax indicates a maximum value of the clearances measured in the blades. The average value MRave indicates an average value of the clearances measured in the blades. The measurement result MR10 may include measurement results at two or more different measurement positions.

The control unit 39 may extract measurement results that satisfy specific conditions by using a filtering function or a sorting function. The measurement result MR10 may include only the extracted measurement results. When the filtering function is used, a user interface that is the same as the dialogue box DB17 shown in FIG. 24 may be used. When the sorting function is used, the measurement results may be arranged in the ascending order or the descending order in accordance with the blade numbers, the measured values, or the like.

A tab different from the tab TAB10 and the tab TAB11 in the dialogue box DB14 may be displayed, and the measurement result MR10 may be displayed in the tab. The measurement result MR10 may be displayed at any position on the display screen of the display unit 38.

The control unit 39 determines a blade of which second inspection is necessary and determines the priority of the blade in Step S108. For example, when a measurement result indicated by the state information of one or more blades is greater than a determination criterion of the pass/fail conditions registered in the storage unit 37, the control unit 39 determines that the inspection result is FAIL. At this time, the inspection is completed. When the control unit 39 has determined that the inspection result is not FAIL but detailed observation of one or more blades is necessary, Step S122 is executed.

The measurement result MR10 may be updated with the measurement result in Step S123. Alternatively, the measurement result in Step S123 may be added to the measurement result MR10.

Figure 26:
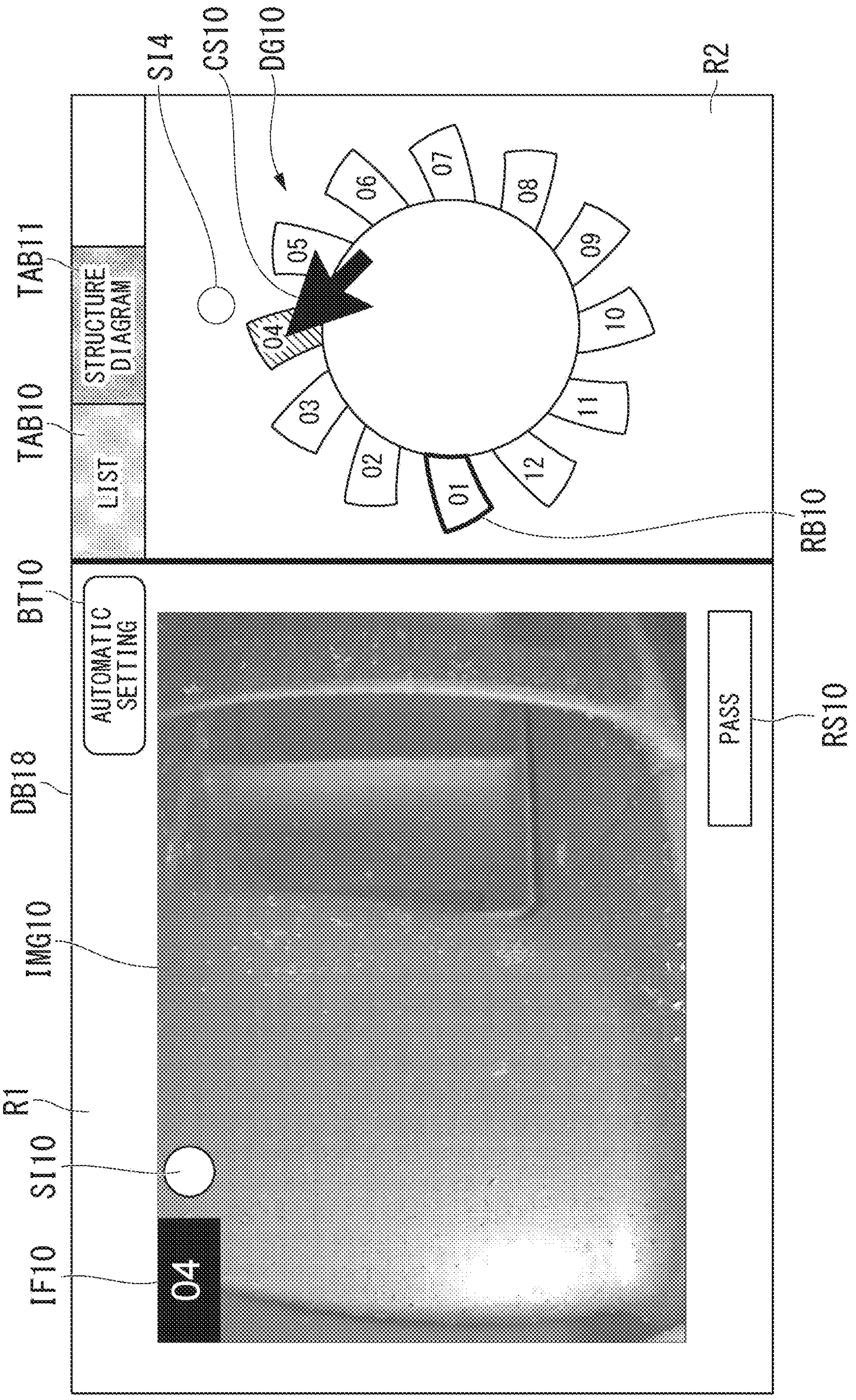
FIG. 26 is a diagram showing an example of information displayed on the display unit included in the endoscope device according to the fourth embodiment of the present invention.

The control unit 39 displays a dialogue box DB18 shown in FIG. 26 on the display unit 38 in Step S154. Descriptions of the same parts as those shown in FIG. 14 will be omitted.

A determination result RS10 is displayed in the dialogue box DB18. The determination result RS10 indicates whether inspection passes/fails. In the example shown in FIG. 26, the determination result RS10 indicates that the inspection result is PASS.

A position at which the determination result RS10 is displayed is not limited to the position shown in FIG. 26. A display state of the determination result RS10 is not limited to the display state shown in FIG. 26. For example, the determination result RS10 may be displayed in the tab TAB10. The determination result RS10 may be displayed as an icon instead of text information. The endoscope device 1 may output speech indicating the determination result indicating whether the inspection passes/fails instead of visually displaying the determination result.

The measurement type applied to the fourth embodiment is not limited to measurement of the clearance between the tip of a blade and the shroud. Measurement similar to the clearance measurement may be applied to the fourth embodiment.

Each aspect of the present invention may include the following modified example. The inspection assistance system 10 further includes a storage medium (the storage unit 37) storing inspection management information associated with two or more objects.

Each aspect of the present invention may include the following modified example. The control unit 39 compares the inspection management information with a preset determination criterion and outputs a result of comparison between the inspection management information and the determination criterion.

Each aspect of the present invention may include the following modified example. The control unit 39 measures the size of an object that is visible in at least one first image by using the at least one first image. Alternatively, the control unit 39 measures the size of an object that is visible in at last one second image by using the at least one second image. The inspection management information includes a measurement result of the size. The determination criterion is related to the size.

In the fourth embodiment, the endoscope device 1 can greatly shorten the inspection time.

Fifth Embodiment

A fifth embodiment of the present invention will be described. In the fifth embodiment, an external device other than the endoscope device 1 is used. The external device acquires a first image and a second image from the endoscope device 1 and controls the turning tool 4.

Figure 27:
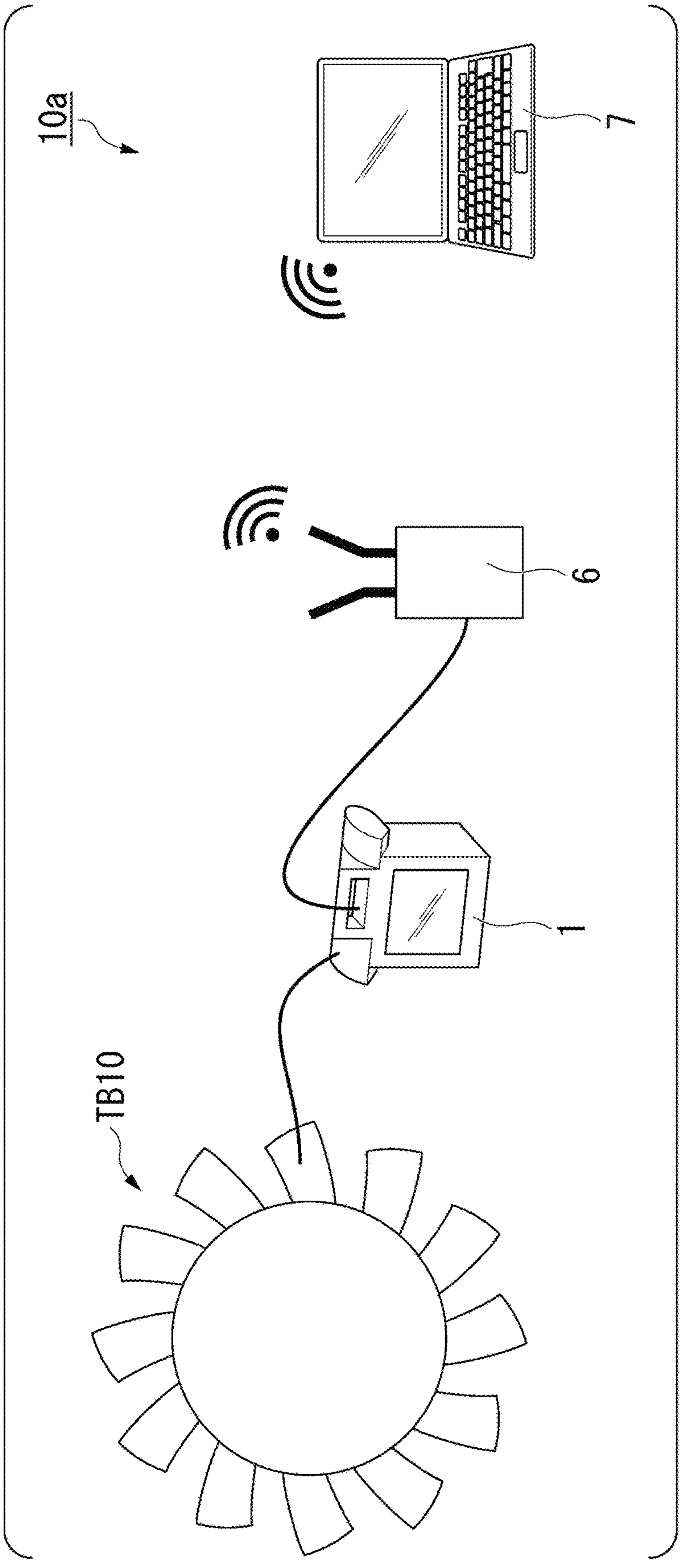
FIG. 27 is a diagram showing the configuration of an inspection assistance system according to a fifth embodiment of the present invention.

FIG. 27 shows the configuration of an inspection assistance system 10*a* in the fifth embodiment. The inspection assistance system 10*a* includes an endoscope device 1, a turning tool 4, a communication device 6, and an external device 7. The turning tool 4 is not shown in FIG. 27.

The endoscope device 1 is the same as that shown in FIG. 1 except that a communication unit that executes communication with the external device 7 is included. The turning tool 4 is the same as that shown in FIG. 1.

For example, the communication device 6 is connected to the endoscope device 1 by a cable. The endoscope device 1 outputs a first image and a second image to the communication device 6. The communication device 6 executes wireless communication with the external device 7 and transmits the first image and the second image to the external device 7.

For example, the external device 7 is a personal computer (PC). The external device 7 may be disposed away from a site in which inspection is performed. The external device 7 executes wireless communication with the communication device 6 and receives the first image and the second image from the communication device 6. In addition, the external device 7 executes wireless communication with the turning tool 4 and transmits rotation control information used for rotating the disk DS10 to the turning tool 4.

The endoscope device 1 and the communication device 6 may execute wireless communication with each other. The external device 7 may be connected to the communication device 6 by a cable.

The standards for the communication between the endoscope device 1 and the communication device 6 and the standards for the communication between the communication device 6 and the external device 7 are not limited. For example, universal serial bus (USB) may be used in wired communication. Communication standards defined in IEEE 802.11 or the like may be used in the wireless communication.

For example, a first user and a second user perform inspection. The first user holds the insertion unit 2 of the endoscope device 1, and the second user operates the external device 7. The second user can ascertain the status of the inspection by observing a screen of the external device 7. In addition, the second user can instruct the first user to change imaging conditions.

Figure 28:
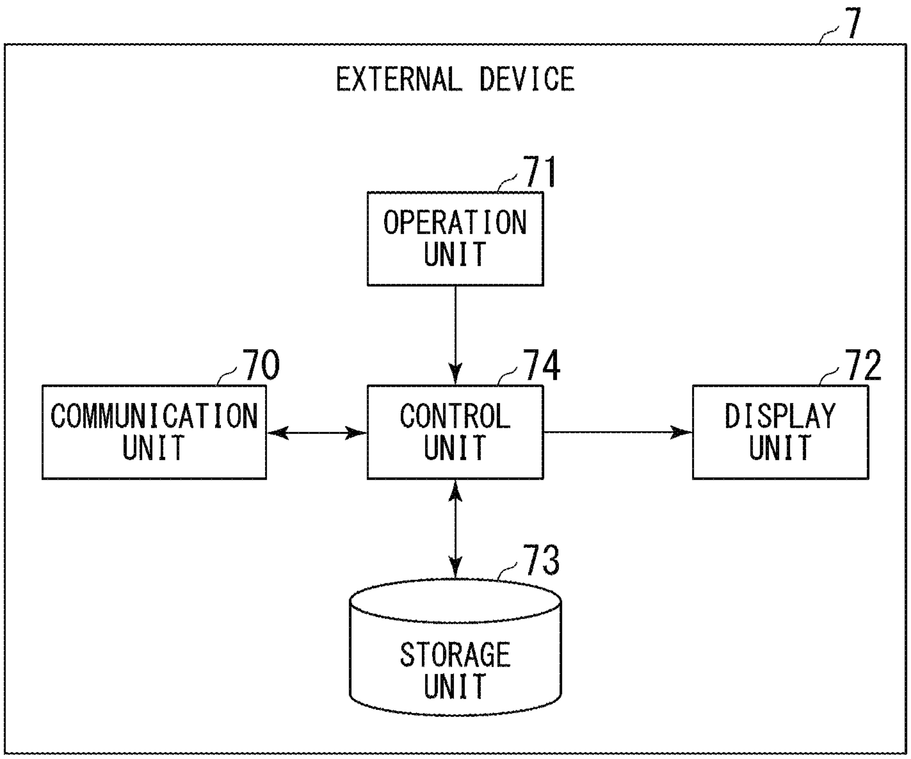
FIG. 28 is a block diagram showing the configuration of an external device according to the fifth embodiment of the present invention.

FIG. 28 shows the configuration of the external device 7. The external device 7 includes a communication unit 70, an operation unit 71, a display unit 72, a storage unit 73, and a control unit 74.

The communication unit 70 executes wireless communication with the communication device 6. The operation unit 71 is a user interface. The operation unit 71 is a button and the like. The operation unit 71 receives a user's operation for the external device 7. The user can input various kinds of information to the external device 7 by operating the operation unit 71.

The display unit 72 is a monitor (a display) such as an LCD. The display unit 72 includes a display screen and displays an image, an operation menu, and the like on the display screen. The display unit 72 may be a touch panel.

The storage unit 73 is a volatile or nonvolatile recording medium. For example, the storage unit 73 is at least one of a RAM, a DRAM, an SRAM, a ROM, an EPROM, an EEPROM, a flash memory, an HDD, and an SSD. The storage unit 73 stores an image, inspection management information, and the like.

The control unit 74 controls operations of the external device 7 based on a program built in the external device 7. The control unit 74 may be constituted by at least one of a processor and a logic circuit. The control unit 74 may include one or more processors. The control unit 74 may include one or more logic circuits.

Figure 29:
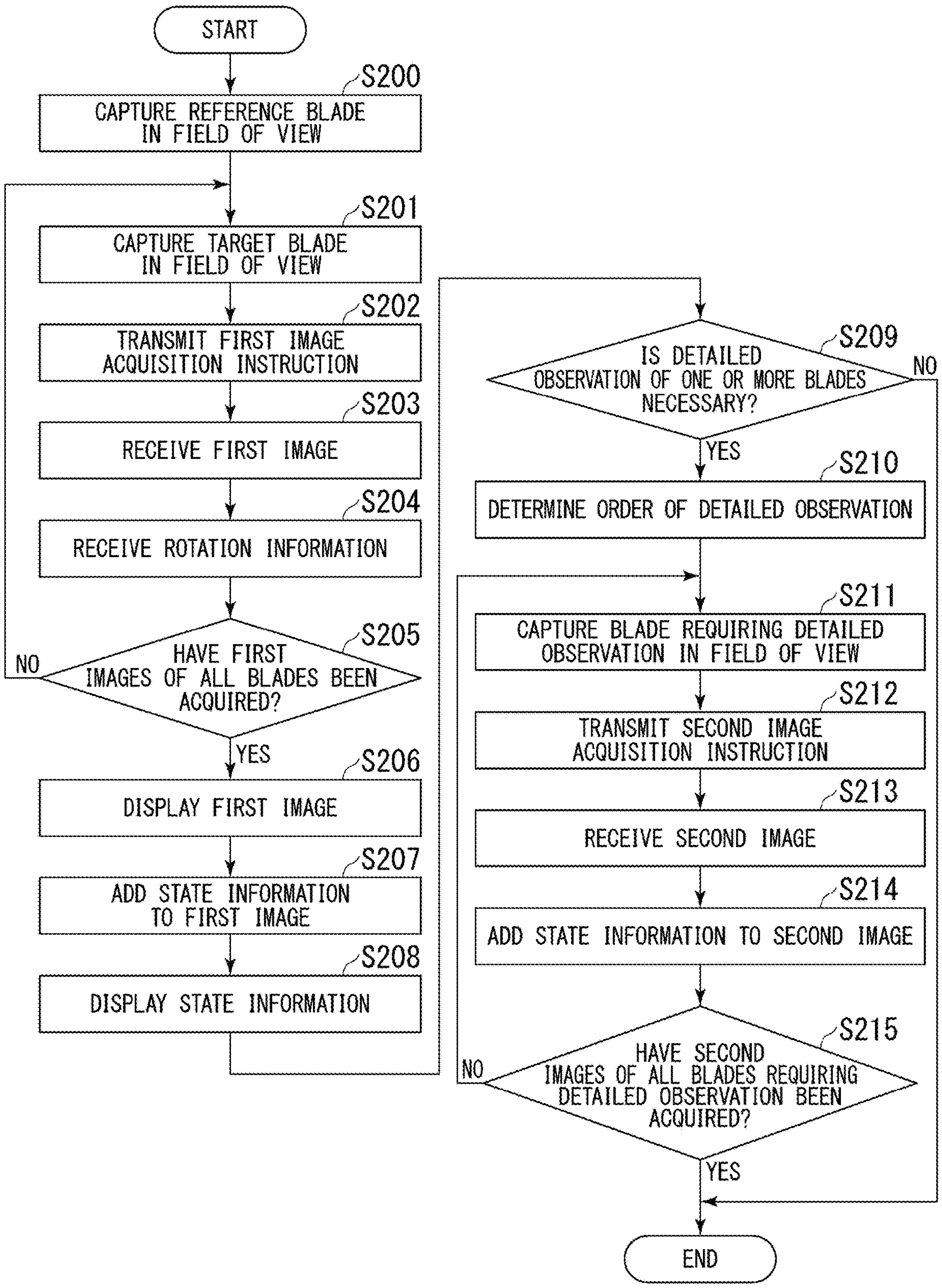
FIG. 29 is a flowchart showing a procedure of processing executed by the external device according to the fifth embodiment of the present invention.

Processing executed by the external device 7 will be described by using FIG. 29. FIG. 29 shows a procedure of the processing executed by the external device 7.

After the external device 7 has started the processing shown in FIG. 29, the control unit 74 executes the following processing in order to capture a reference blade in the field of view of the insertion unit 2 (Step S200).

The control unit 74 outputs rotation control information used for rotating the disk DS10 to the communication unit 70. The communication unit 70 transmits the rotation control information to the turning tool 4. The communication unit 42 of the turning tool 4 receives the rotation control information from the external device 7. The drive control unit 41 controls the rotation unit 40 in accordance with the rotation control information. The rotation unit 40 rotates the disk DS10.

After the insertion unit 2 has captured the reference blade in the field of view, the rotation unit 40 stops the rotation of the disk DS10. The disk DS10 stops. For example, the reference blade is located at the center of the field of view.

After Step S200, the control unit 74 executes the following processing in order to capture a target blade that is an observation target in the field of view of the insertion unit 2 (Step S201).

The communication unit 70 receives the subject information transmitted from the turning tool 4 and outputs the subject information to the control unit 74. The subject information includes the number of blades disposed on the disk DS10. The control unit 74 calculates an angle between two adjacent blades based on the number of blades. The control unit 74 outputs the rotation control information used for rotating the disk DS10 by the angle to the communication unit 70. Similar processing to that described above is executed, and the drive control unit 41 controls the rotation unit 40 in accordance with the rotation control information. The rotation unit 40 rotates the disk DS10 by the angle.

After the disk DS10 has rotated by the angle between two adjacent blades, the rotation unit 40 stops the rotation of the disk DS10. The disk DS10 stops. The insertion unit 2 captures the target blade in the field of view and acquires an optical image of the target blade. For example, the target blade is located at the center of the field of view. Immediately after Step S200 is executed, the target blade is the reference blade, and Step S201 is not executed. Therefore, the insertion unit 2 acquires an optical image of the reference blade.

After Step S201, the control unit 74 outputs a first image acquisition instruction to instruct the endoscope device 1 to acquire a first image to the communication unit 70. The communication unit 70 transmits the first image acquisition instruction to the endoscope device 1 (Step S202).

After Step S202, the communication unit 70 receives a first image from the endoscope device 1 and outputs the first image to the control unit 74. The control unit 74 stores the first image in the storage unit 73. In addition, the control unit 74 adds the number (a file name) of the first image to the inspection management information (Step S203).

After Step S203, the communication unit 70 receives rotation information from the turning tool 4 and outputs the rotation information to the control unit 74 (Step S204). The rotation information indicates the amount of rotation (a rotation angle) of the disk DS10.

After Step S201 is executed, Step S204 may be executed. After Step S204 is executed, Step S202 may be executed.

After Step S204, the control unit 74 determines whether the first images of all the blades have been acquired (Step S205). Since Step S205 is similar to Step S104 shown in FIG. 4, detailed descriptions of Step S205 will be omitted.

When the control unit 74 has determined that the first images of some of the blades disposed on the disk DS10 have not been acquired in Step S205, Step S201 is executed. When the control unit 74 has determined that the first images of all the blades have been acquired in Step S205, the control unit 74 displays the two or more first images stored in the storage unit 73 on the display unit 72 (Step S206).

A user observes the two or more first images displayed on the display unit 72. The user determines the state of a blade that is visible in each first image. The user inputs a result of the determination to the external device 7 by operating the operation unit 71. The control unit 74 generates state information in accordance with the result of the determination. The state information indicates the state of the blade that is visible in each first image. The state information includes observation information indicating whether detailed observation of each blade is necessary. The control unit 74 adds the state information to the first image (Step S207). The control unit 74 may process the first image and may determine the state of a blade.

After Step S207, the control unit 74 displays the state information on the display unit 72 (Step S208).

After Step S208, the control unit 74 determines whether detailed observation of one or more blades is necessary (Step S209). Since Step S209 is similar to Step S108 shown in FIG. 4, detailed descriptions of Step S209 will be omitted.

When the control unit 74 has determined that detailed observation is unnecessary in Step S209, the processing shown in FIG. 29 is completed. When the control unit 74 has determined that the detailed observation is necessary in Step S209, the control unit 74 selects all the first images to which the observation information indicating the necessity of the detailed observation is added and determines the order of the detailed observation of blades that are visible in the first images (Step S210). Since Step S210 is similar to Step S109 shown in FIG. 4, detailed descriptions of Step S210 will be omitted.

After Step S210, the control unit 74 executes the following processing in order to capture a blade of which detailed observation is necessary in the field of view of the insertion unit 2 (Step S211).

The control unit 74 selects a target blade in accordance with the order determined in Step S210. The control unit 74 acquires rotation information added to the first image in which the selected target blade is visible from the storage unit 73.

The control unit 74 calculates the amount of rotation (a rotation angle) of the disk DS10 required for capturing the target blade in the field of view of the insertion unit 2. The control unit 74 outputs rotation control information used for rotating the disk DS10 by the angle to the communication unit 70. Similar processing to that described above is executed, and the drive control unit 41 controls the rotation unit 40 in accordance with the rotation control information. The rotation unit 40 rotates the disk DS10 by the angle. After the disk DS10 has rotated by the angle, the rotation unit 40 stops the rotation of the disk DS10. The disk DS10 stops. The insertion unit 2 captures the target blade in the field of view and acquires an optical image of the target blade.

After Step S211, the control unit 74 outputs a second image acquisition instruction to instruct the endoscope device 1 to acquire a second image to the communication unit 70. The communication unit 70 transmits the second image acquisition instruction to the endoscope device 1 (Step S212).

After Step S212, the communication unit 70 receives a second image from the endoscope device 1 and outputs the second image to the control unit 74. The control unit 74 stores the second image in the storage unit 73. In addition, the control unit 74 displays the second image on the display unit 72 (Step S213).

A user observes the second image displayed on the display unit 72. The user determines the state of a blade that is visible in the second image. The user inputs a result of the determination to the external device 7 by operating the operation unit 71. The control unit 74 generates state information in accordance with the result of the determination. The state information indicates the state of the blade that is visible in the second image. The state information indicates that the blade is OK or NG. The control unit 74 adds the state information to the second image (Step S214). The control unit 74 may process the second image and may determine the state of a blade.

After Step S214, the control unit 74 determines whether the second images of all the blades of which detailed observation is necessary have been acquired (Step S215).

When the control unit 74 has determined that second images of some of the blades of which detailed observation is necessary have not been acquired in Step S215, Step S211 is executed. When the control unit 74 has determined that second images of all the blades of which detailed observation is necessary have been acquired in Step S215, the processing shown in FIG. 29 is completed.

Figure 30:
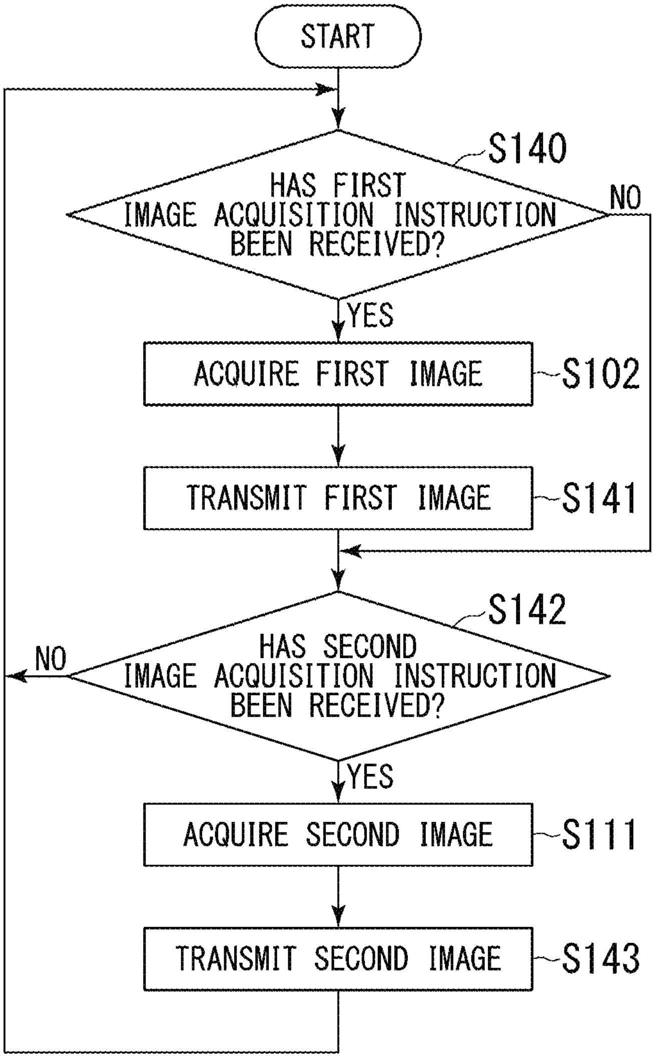
FIG. 30 is a flowchart showing a procedure of processing executed by an endoscope device according to the fifth embodiment of the present invention.

Processing executed by the endoscope device 1 will be described by using FIG. 30. FIG. 30 shows a procedure of the processing executed by the endoscope device 1. Descriptions of the same processing as that shown in FIG. 4 will be omitted.

After the endoscope device 1 has started the processing shown in FIG. 30, the control unit 39 determines whether the first image acquisition instruction has been received (Step S140).

When the control unit 39 has determined that the first image acquisition instruction has not been received in Step S140, Step S142 described later is executed. When the communication unit of the endoscope device 1 has received the first image acquisition instruction, the communication unit outputs the first image acquisition instruction to the control unit 39. When the control unit 39 has determined that the first image acquisition instruction has been received in Step S140, Step S102 is executed.

After Step S102, the control unit 39 outputs the first image acquired in Step S102 to the communication unit. The communication unit transmits the first image to the external device 7 (Step S141). The external device 7 receives the first image in Step S203 shown in FIG. 29.

After Step S141, the control unit 39 determines whether the second image acquisition instruction has been received (Step S142).

When the control unit 39 has determined that the second image acquisition instruction has not been received in Step S142, Step S140 is executed. When the communication unit has received the second image acquisition instruction, the communication unit outputs the second image acquisition instruction to the control unit 39. When the control unit 39 has determined that the second image acquisition instruction has been received in Step S142, Step S111 is executed.

After Step S111, the control unit 39 outputs the second image acquired in Step S111 to the communication unit. The communication unit transmits the second image to the external device 7 (Step S143). The external device 7 receives the second image in Step S213 shown in FIG. 29. After Step S143, Step S140 is executed.

Each aspect of the present invention may include the following modified example. The imaging apparatus includes the imaging device 22 (the image sensor). The control unit 74 is included in the external device 7 other than the imaging apparatus.

In the fifth embodiment, two or more users separated from each other can efficiently perform inspection.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An inspection assistance system configured to assist with inspection of a subject including therein a rotor in which two or more objects are disposed, the inspection assistance system comprising:

an image sensor configured to generate an image based on an optical image of an object captured in a field of view of an insertion unit inserted into the subject; and a processor configured to:

acquire two or more first images from the image sensor in accordance with rotation of the rotor;

add observation information indicating that observation is necessary to at least one first image of the two or more first images;

output a control signal to a turning tool configured to rotate the rotor based on the control signal such that the insertion unit captures, in the field of view, an object that is visible in the at least one first image after the observation information is added to the at least one first image; and acquire at least one second image from the image sensor after the turning tool has rotated the rotor.

2. The inspection assistance system according to claim 1, wherein the processor is configured to output the control signal to the turning tool before acquiring each of the two or more first images.

3. The inspection assistance system according to claim 2, wherein the processor is configured to:

acquire rotation information indicating an amount of rotation of the rotor from the turning tool when the turning tool rotates the rotor;

add the rotation information to each of the two or more first images; and output the control signal generated based on the rotation information added to the at least one first image to the turning tool.

4. The inspection assistance system according to claim 1, wherein the processor is configured to add state information indicating a state of an object that is visible in the at least one second image to the at least one second image.

5. The inspection assistance system according to claim 1, wherein the processor is configured to add state information indicating a state of an object that is visible in the two or more first images to the two or more first images.

6. The inspection assistance system according to claim 1, wherein the image sensor is disposed in a distal end of the insertion unit, wherein the processor is configured to:

set a first imaging condition before the image sensor generates the two or more first images; and set a second imaging condition different from the first imaging condition before the image sensor generates the at least one second image, and wherein the first imaging condition and the second imaging condition are one or more of the following: a position of the image sensor; an orientation of the image sensor; a relative position of the image sensor with respect to an object captured in the field of view; a relative orientation of the image sensor with respect to the object captured in the field of view; an imaging parameter of the image sensor; a state of illumination light emitted inside the subject; a parameter of image processing performed on an image generated by the image sensor; and a state of a lens disposed in the insertion unit.

7. The inspection assistance system according to claim 6, wherein, before the image sensor generates the at least one second image, the processor is configured to control one or more of the following: a bending portion included in the insertion unit; an insertion device configured to move the insertion unit in a longitudinal direction of the insertion unit inside the subject or twist the insertion unit inside the subject; the turning tool; the image sensor; a light source configured to generate the illumination light; an image-processing circuit configured to execute the image processing; and the lens such that the second imaging condition is different from the first imaging condition.

8. The inspection assistance system according to claim 1, wherein the processor is configured to:

acquire a reference image recorded in advance in a recording medium, wherein at least one object of the two or more objects is visible in the reference image; and output the control signal to the turning tool in accordance with a composition of an object that is visible in the reference image.

9. The inspection assistance system according to claim 1, wherein the processor is configured to:

acquire a reference image recorded in advance in a recording medium, wherein an abnormality is visible in the reference image; and add the observation information to the at least one first image based on a result of comparison between a first image included in the at least one first image and the reference image.

10. The inspection assistance system according to claim 1, wherein the processor is configured to:

acquire feature information recorded in advance in a recording medium, wherein the feature information is generated based on a feature of an image in which at least one object of the two or more objects is visible; and add the observation information to the at least one first image based on the feature information.

11. The inspection assistance system according to claim 1, wherein the processor is configured to:

add the observation information to at least two first images of the two or more first images; and acquire at least two second images including the at least one second image from the image sensor.

12. The inspection assistance system according to claim 1, wherein the two or more first images include at least two first images in which the same object is visible.

13. The inspection assistance system according to claim 1, wherein the turning tool is configured to stop the rotor after having rotated the rotor, and wherein the processor is configured to acquire the at least one second image from the image sensor when the rotor stops.

14. The inspection assistance system according to claim 1, wherein the processor is configured to display the at least one first image and the observation information on a display.

15. The inspection assistance system according to claim 1, further comprising an imaging apparatus including:

the image sensor; and the processor.

16. The inspection assistance system according to claim 1, further comprising an imaging apparatus including the image sensor, wherein the processor is included in a device other than the imaging apparatus.

17. The inspection assistance system according to claim 1, wherein the subject is a turbine, and the two or more objects are blades.

18. The inspection assistance system according to claim 1, further comprising a storage medium storing inspection management information associated with each of the two or more objects.

19. The inspection assistance system according to claim 18, wherein the processor is configured to:

compare the inspection management information with a preset determination criterion; and output a result of comparison between the inspection management information and the determination criterion.

20. The inspection assistance system according to claim 19, wherein the processor is configured to measure a size of an object that is visible in the at least one first image by using the at least one first image, wherein the inspection management information includes a measurement result of the size, and wherein the determination criterion is related to with the size.

21. The inspection assistance system according to claim 19, wherein the processor is configured to measure a size of an object that is visible in the at least one second image by using the at least one second image, wherein the inspection management information includes a measurement result of the size, and wherein the determination criterion is related to with the size.

22. An inspection assistance method of assisting with inspection of a subject including therein a rotor in which two or more objects are disposed, the inspection assistance method comprising:

causing a processor to acquire two or more first images from an image sensor configured to generate an image based on an optical image of an object captured in a field of view of an insertion unit inserted into the subject in accordance with rotation of the rotor;

causing the processor to add observation information indicating that observation is necessary to at least one first image of the two or more first images;

causing the processor to output a control signal to a turning tool configured to rotate the rotor based on the control signal such that the insertion unit captures, in the field of view, an object that is visible in the at least one first image after the observation information is added to the at least one first image; and causing the processor to acquire at least one second image from the image sensor after the turning tool has rotated the rotor.

23. A non-transitory computer-readable recording medium saving a program causing a computer to execute:

acquiring two or more first images from an image sensor configured to generate an image based on an optical image of an object captured in a field of view of an insertion unit inserted into a subject including therein a rotor in which two or more objects are disposed in accordance with rotation of the rotor;

adding observation information indicating that observation is necessary to at least one first image of the two or more first images;

outputting a control signal to a turning tool configured to rotate the rotor based on the control signal such that the insertion unit captures, in the field of view, an object that is visible in the at least one first image after the observation information is added to the at least one first image; and acquiring at least one second image from the image sensor after the turning tool has rotated the rotor.

* * * * *